(12) United States Patent
Ducray et al.

(10) Patent No.: US 12,448,391 B2
(45) Date of Patent: Oct. 21, 2025

(54) BICYCLIC DERIVATIVES FOR TREATING ENDOPARASITES

(71) Applicant: Elanco Tiergesundheit AG, Basel (CH)

(72) Inventors: Pierre Ducray, Village-Neuf (FR);
Francois Pautrat, Mulhouse (FR);
Denise Rageot, Saint-Louis (FR);
Chouaib Tahtaoui, Rixheim (FR)

(73) Assignee: Elanco Tiergesundheit AG, Basel (CH)

( * ) Notice: Subject to any disclaimer, the term of this patent is extended or adjusted under 35 U.S.C. 154(b) by 845 days.

(21) Appl. No.: 17/616,436

(22) PCT Filed: Jun. 5, 2020

(86) PCT No.: PCT/US2020/036322
§ 371 (c)(1),
(2) Date: Dec. 3, 2021

(87) PCT Pub. No.: WO2020/247747
PCT Pub. Date: Dec. 10, 2020

(65) Prior Publication Data
US 2022/0242857 A1    Aug. 4, 2022

Related U.S. Application Data

(60) Provisional application No. 62/947,852, filed on Dec. 13, 2019, provisional application No. 62/858,465, filed on Jun. 7, 2019.

(51) Int. Cl.
| | | |
|---|---|---|
| C07D 491/107 | (2006.01) | |
| A61P 33/10 | (2006.01) | |
| C07D 265/36 | (2006.01) | |
| C07D 413/12 | (2006.01) | |
| C07D 413/14 | (2006.01) | |
| C07D 417/14 | (2006.01) | |
| C07D 471/04 | (2006.01) | |

(52) U.S. Cl.
CPC .......... *C07D 491/107* (2013.01); *A61P 33/10* (2018.01); *C07D 265/36* (2013.01); *C07D 413/12* (2013.01); *C07D 413/14* (2013.01); *C07D 417/14* (2013.01); *C07D 471/04* (2013.01)

(58) Field of Classification Search
CPC ........................ C07D 491/107; C07D 265/36; C07D 413/12; C07D 413/14; C07D 417/14; C07D 471/04; A61P 33/10
See application file for complete search history.

(56) References Cited

U.S. PATENT DOCUMENTS

| | | |
|---|---|---|
| 7,056,911 B1 | 6/2006 | Rosowsky |
| 10,604,525 B2 | 3/2020 | Köhler et al. |
| 10,889,573 B2 | 1/2021 | Hübsch et al. |
| 10,934,301 B2 | 3/2021 | Görgens et al. |
| 11,001,590 B2 | 5/2021 | Schwarz et al. |
| 11,130,768 B2 | 9/2021 | Griebenow et al. |
| 2020/0131175 A1 | 4/2020 | Griebenow et al. |
| 2020/0377486 A1 | 12/2020 | Griebenow et al. |
| 2021/0115026 A1 | 4/2021 | Hübsch et al. |

FOREIGN PATENT DOCUMENTS

| | | |
|---|---|---|
| CN | 1599725 A | 3/2005 |
| CN | 103619818 A | 3/2014 |
| CN | 101675056 A | 5/2015 |
| CN | 104603139 A | 5/2015 |
| CN | 105164124 A | 12/2015 |
| CN | 106061965 A | 10/2016 |
| CN | 106470683 A | 3/2017 |
| DE | 4440193 A1 | 5/1996 |
| RU | 2114832 C1 | 7/1998 |
| WO | 9730054 A1 | 8/1997 |
| WO | 99/29318 A1 | 6/1999 |
| WO | 2010027002 A1 | 3/2010 |
| WO | 2017/178416 A1 | 10/2017 |
| WO | 2018/087036 A1 | 5/2018 |
| WO | 2018/197401 A1 | 11/2018 |
| WO | 2019/002132 A1 | 1/2019 |
| WO | 2019/025341 A1 | 2/2019 |
| WO | 2020014068 A1 | 1/2020 |
| WO | 2020083971 A2 | 4/2020 |
| WO | 2020/131629 A1 | 6/2020 |
| WO | 2020/131631 A1 | 6/2020 |
| WO | 2020249760 A1 | 12/2020 |
| WO | 2021018839 A1 | 2/2021 |
| WO | 2022106469 A2 | 5/2022 |
| WO | 2022117783 A1 | 6/2022 |

OTHER PUBLICATIONS

International Search Report of International Application No. PCT/US2020/036322, mailed Sep. 11, 2020.
(Continued)

*Primary Examiner* — Joseph K McKane
*Assistant Examiner* — Jalisa Holmes Ferguson
(74) *Attorney, Agent, or Firm* — McBee Moore & Vanik, IP, LLC

(57) ABSTRACT

The present invention provides compounds of formula (I):

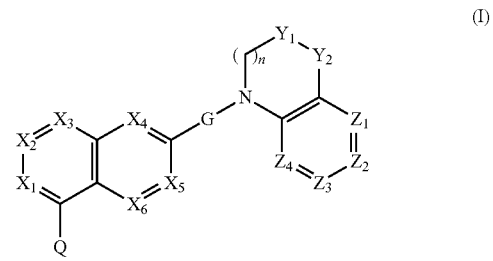

which are useful in the control of endoparasites, for example heartworms, in warm-blooded animals.

28 Claims, No Drawings

(56) References Cited

OTHER PUBLICATIONS

Mingxia Xu, "Medicinal Chemistry", National Licensed Pharmacist Qualification Examination Training Textbook, China Medical Science and Technology Press, 1998, p. 219.
Berge et al., "Pharmaceutical salts", Journal of Pharmaceutical Science, vol. 66, 1977, pp. 2-19.
T.W. Greeneep. G. M. Wuts: 'Protective Groups in Organic Chemistry', 1991, John Wiley and Sons (Preview).

BICYCLIC DERIVATIVES FOR TREATING ENDOPARASITES

CROSS-REFERENCE TO RELATED APPLICATIONS

This application is the National Stage entry of International Application No. PCT/US2020/036322, filed 5 Jun. 2020, which claims priority to U.S. Patent Application No. 62/858,465, filed 7 Jun. 2019 and U.S. Patent Application No. 62/947,852, filed 13 Dec. 2019.

BACKGROUND

Field

The present invention relates to medicinal chemistry, pharmacology, and veterinary and human medicine. More particularly, the present invention relates to compounds of formula (I) and their use in the control of endoparasites, for example heartworms, in warm-blooded animals.

Description of Related Art

Heartworm (*Dirofilaria immitis*) is a parasitic roundworm that is spread from host to host through the bites of mosquitoes. The lifecycle starts when a female mosquito takes a blood meal from an infected host. The mosquito ingests immature heartworms which then molt to the infective larvae stage and travel to the mosquitoes' mouth parts. The mosquito then feeds on a susceptible host, such as a dog or cat, depositing the infective larvae. The larvae then molt to the next larval stage in the new host and then migrate through the body, eventually ending up in the blood vessels. As the larvae migrate through the tissues they molt into juvenile adults. The juvenile adults eventually move into the blood vessels of the lungs where they mature into sexually active adults. The adult heartworms then breed and release immature heartworms completing the cycle. Heartworm infection may result in serious disease for the host.

Adult heartworm infections may be treated with arsenic-based compounds; the treatment is time consuming, cumbersome, and often only partly successful. Accordingly, treatment is focused on the control of heartworm infection. Heartworm control is currently performed exclusively by year round periodical administration of drugs. Typical treatments include macrocyclic lactones such as ivermectin, moxidectin, and milbemycin oxime. Unfortunately, developing resistance of *Dirofilaria immitis* to macrocyclic lactones has been observed. Accordingly, there is a need for new compounds which effectively control heartworm infections either by way of prophylaxis or by directly killing heartworms. Certain treatments of endoparasites are described in WO 2017/178416, WO 2018/087036, WO 2018/197401, WO 2019/025341, and WO 2019/002132.

SUMMARY

The present invention provides compounds of formula (I) which effectively treat and/or control endoparasites (e.g., heartworm) in warm-blooded animals.

In one embodiment, the present invention provides compounds of formula (I):

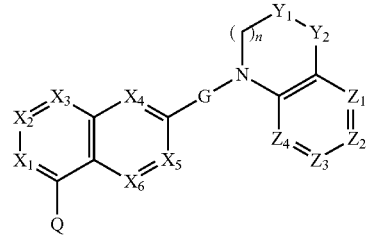

wherein
n is 0 or 1;
$X_1$ is selected from the group consisting of N and $CR_1$;
$X_2$ is selected from the group consisting of N and $CR_2$;
$X_3$ is selected from the group consisting of N and $CR_3$;
$X_4$ is selected from the group consisting of N and $CR_4$;
$X_5$ is selected from the group consisting of N and $CR_5$;
$X_6$ is selected from the group consisting of N and $CR_6$;
G is selected from the group consisting of

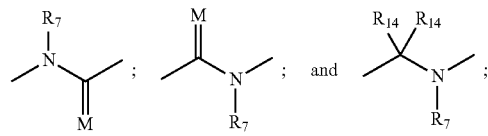

M is selected from the group consisting of N—$R_{13}$, O, and S;
$Y_1$ is selected from the group consisting of $CR_8R_9$, O, S, and $NR_{10}$;
$Y_z$ is selected from the group consisting of $CR_8R_9$, O, S, and $NR_{10}$;
  wherein at least one of the groups $Y_1$ or $Y_2$ is $CR_8R_9$;
$Z_1$ is selected from the group consisting of N, O, S, and $CR_{11}$;
$Z_2$ is selected from the group consisting of nil, N, and $CR_{11}$;
$Z_3$ is selected from the group consisting of nil, N and $CR_{11}$;
$Z_4$ is selected from the group consisting of N, O, S, and $CR_{11}$;
  wherein no more than 2 of $Z_1$, $Z_2$, $Z_3$, and $Z_4$ are N and wherein only one of $Z_1$ and $Z_4$ is O or S, $Z_2$ is nil only when $Z_1$ is O or S, and $Z_3$ is nil only when $Z_4$ is O or S;
$R_1$ is selected from the group consisting of hydrogen, halogen, hydroxyl, —SH, —S$C_1$-$C_4$ alkyl, —S(O)($C_1$-$C_4$ alkyl), —S(O)$_2$($C_1$-$C_4$ alkyl), cyano, $C_1$-$C_4$ alkyl, $C_1$-$C_4$ halogenoalkyl, $C_1$-$C_4$-alkoxy, —B(O$R_{15}$)(O$R_{16}$) wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —NH$_2$, —NH($C_1$-$C_4$ alkyl), and —N($C_1$-$C_4$ alkyl)$_2$;
$R_2$ is selected from the group consisting of hydrogen, halogen, hydroxyl, —SH, —S$C_1$-$C_4$ alkyl, —S(O)($C_1$-$C_4$ alkyl), —S(O)$_2$($C_1$-$C_4$ alkyl), cyano, $C_1$-$C_4$ alkyl, $C_1$-$C_4$ halogenoalkyl, $C_1$-$C_4$-alkoxy, —B(O$R_{15}$)(O$R_{16}$) wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —$NH(C_1$-$C_4$ alkyl), and —$N(C_1$-$C_4$ alkyl$)_2$;

$R_3$ is selected from the group consisting of hydrogen, halogen, hydroxyl, —SH, —$SC_1$-$C_4$ alkyl, —$S(O)(C_1$-$C_4$ alkyl), —$S(O)_2(C_1$-$C_4$ alkyl), cyano, $C_1$-$C_4$ alkyl, $C_1$-$C_4$ halogenoalkyl, $C_1$-$C_4$-alkoxy, —$B(OR_{15})(OR_{16})$ wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —$NH(C_1$-$C_4$ alkyl), and —$N(C_1$-$C_4$ alkyl$)_2$;

$R_4$ is selected from the group consisting of halogen, cyano, —CHO, hydroxyl, $C_1$-$C_4$alkyl, $C_2$-$C_4$ alkenyl, $C_2$-$C_4$ alkynyl, $C_3$-$C_6$ cycloalkyl, $C_1$-$C_4$ halogenoalkyl, $C_1$-$C_4$-alkoxy substituted-$C_1$-$C_4$ alkyl, benzyl optionally substituted with 1 to 5 halogen atoms, $C_1$-$C_4$ alkoxy, —$NH_2$, —$NH(C_1$-$C_4$ alkyl), —$N(C_1$-$C_4$ alkyl$)_2$, —$NH(C_3$-$C_6$ cycloalkyl), —$N(C_1$-$C_4$alkyl)($C_3$-$C_6$-cycloalkyl), —$N(C_1$-$C_4$ alkyl)(4- to 7-membered heterocycloalkyl), —NH (4- to 7-membered heterocycloalkyl), —$N(C_1$-$C_4$ alkyl)($C_1$-$C_4$ alkoxy), —$C(O)NH(C_1$-$C_4$ alkyl), —$C(O)N(C_1$-$C_4$ alkyl$)_2$, —$C(O)N(C_1$-$C_4$ alkyl)(4- to 7-membered heterocycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$B(OR_{15})(OR_{16})$ wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; 6- or 10 membered aryl; a monocyclic heterocycle selected from the group of 4- to 7-membered heterocycloalkyl, 5-membered heteroaryl having at least one nitrogen atom via which the 5-membered heteroaryl ring is connected to the rest of the molecule, and 6-membered heteroaryl having at least one nitrogen atom; each of the aryl, heterocycloalkyl, and heteroaryl rings in $R_4$ is optionally substituted with 1, 2 or 3 substituents independently selected from the group consisting of halogen, cyano, nitro, hydroxy, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), —$N(C_1$-$C_4$ alkyl$)_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl; wherein the $C_3$-$C_6$ cycloalkyl and the heterocycloalkyl rings in $R_4$ are optionally substituted with a spiro group, wherein said spiro group is a 3- to 6-membered cycloalkyl or 4- to 6-membered heterocycloalkyl containing 1, 2, or 3 heteroatoms independently selected from N, S or O, wherein said spiro group is optionally substituted with 1, 2 or 3 substituents independently selected from the group consisting of halogen, cyano, nitro, hydroxy, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), —$N(C_1$-$C_4$ alkyl$)_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl; and wherein each $C_1$-$C_4$ alkyl, $C_3$-$C_6$ cycloalkyl and $C_1$-$C_4$ alkoxy in $R_4$ may be optionally substituted with 1, 2 or 3 substituents independently selected from the group consisting of halogen, hydroxy, —$NH_2$, —$NH(C_1$-$C_4$ alkyl), —$N(C_1$-$C_4$alkyl$)_2$, cyano, carboxy, carbamoyl, $C_1$-$C_4$ alkoxycarbonyl, —$C(O)NH(C_1$-$C_4$ alkyl), —$C(O)N(C_1$-$C_4$ alkyl$)_2$, and $C_1$-$C_4$ alkoxy;

$R_5$ is selected from the group consisting of hydrogen, halogen, hydroxyl, —SH, —$SC_1$-$C_4$ alkyl, —$S(O)(C_1$-$C_4$ alkyl), —$S(O)_2(C_1$-$C_4$ alkyl), cyano, $C_1$-$C_4$ alkyl, $C_1$-$C_4$ halogenoalkyl, $C_1$-$C_4$-alkoxy, —$B(OR_{15})(OR_{16})$ wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —$NH(C_1$-$C_4$ alkyl), and —$N(C_1$-$C_4$ alkyl$)_2$;

$R_6$ is selected from the group consisting of hydrogen, halogen, hydroxyl, —SH, —$SC_1$-$C_4$ alkyl, —$S(O)(C_1$-$C_4$ alkyl), —$S(O)_2(C_1$-$C_4$ alkyl), cyano, $C_1$-$C_4$ alkyl, $C_1$-$C_4$ halogenoalkyl, $C_1$-$C_4$-alkoxy, —$B(OR_{15})(OR_{16})$ wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —$NH(C_1$-$C_4$ alkyl), and —$N(C_1$-$C_4$ alkyl$)_2$;

$R_7$ is selected from the group consisting of hydrogen, $C_1$-$C_4$ alkyl, and $C_3$-$C_6$ cycloalkyl optionally substituted with 1 to 5 halogen atoms, —C(H)O, $C_2$-$C_4$ alkenyl, $C_2$-$C_4$ alkynyl, $C_1$-$C_4$ halogenoalkyl, and $C_1$-$C_4$-alkoxy;

$R_8$ is, each time selected, independently selected from the group consisting of hydrogen, fluoro, and $C_1$-$C_4$ alkyl;

$R_9$ is, each time selected, independently selected from the group consisting of hydrogen, fluoro, and $C_1$-$C_4$ alkyl;

$R_{10}$ is selected from the group consisting of hydrogen and $C_1$-$C_4$ alkyl;

$R_{11}$ is, each time selected, independently selected from the group consisting of hydrogen, halogen, hydroxyl, cyano, $C_1$-$C_4$ alkyl, $C_1$-$C_4$ halogenoalkyl, $C_1$-$C_4$-alkoxy, $C_3$-$C_6$ cycloalkyl, —$NH_2$, —$NH(C_1$-$C_4$ alkyl), and —$N(C_1$-$C_4$ alkyl$)_2$; and Q is selected from the group consisting of (i) 6- or 10 membered aryl optionally substituted with 1, 2, 3, 4, or 5 substituents independently selected from the group consisting of halogen, cyano, nitro, hydroxyl, $C_1$-$C_4$ alkyl, $C_1$-$C_4$ halogenoalkyl, $C_1$-$C_4$ alkoxy, $C_3$-$C_6$ cycloalkyl, —$NH_2$, —$NH(C_1$-$C_4$ alkyl), —$N(C_1$-$C_4$ alkyl$)_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl, wherein the 6- or 10 membered aryl is optionally fused with a 4- to 7-membered heterocycloalkyl having 1 or 2 heteroatoms selected from the group O, S, and N and wherein the carbons of the heterocycloalkyl are optionally substituted with 1, 2 or 3 substituents independently selected from the group halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), and —$N(C_1$-$C_4$ alkyl)$_2$ and any N in the heterocycloalkyl is, valency permitting, substituted with a substituent selected from the group consisting of hydrogen, $C_1$-$C_4$ alkyl, and $C_3$-$C_6$ cycloalkyl;

(ii) 5- to 10-membered heteroaryl having 1, 2, or 3 heteroatoms independently selected from the group O, S, and N and wherein the carbons of the 5- to 10-membered heteroaryl are optionally substituted with 1, 2, 3, 4, or 5 substituents independently selected from the group consisting of halogen, cyano, nitro, hydroxyl, $C_1$-$C_4$ alkyl, $C_3$-$C_6$ cycloalkyl, $C_1$-$C_4$ halogenoalkyl, $C_1$-$C_4$ alkoxy, benzyloxy, —$NH_2$, —$NH(C_1$-$C_4$ alkyl), —$N(C_1$-$C_4$ alkyl)$_2$, —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl, and any N in the heteroaryl, valency permitting, is optionally substituted with a substituent selected from the group consisting of hydrogen, $C_1$-$C_4$ alkyl, and $C_3$-$C_6$ cycloalkyl;

(iii) 4- to 7-membered heterocycloalkyl having 1, 2, or 3 heteroatoms independently selected from the group O, S, N, wherein the heterocycloalkyl is optionally benzo-fused, wherein the carbons of the 4- to 7-membered heterocycloalkyl or optionally benzo-fused 4- to 7-membered heterocycloalkyl are optionally substituted with 1, 2, 3, or 4 substituents independently selected from the group consisting of halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), and —$N(C_1$-$C_4$ alkyl)$_2$ and any N in the heterocycloalkyl is optionally substituted with a substituent selected from the group consisting of hydrogen, $C_1$-$C_4$ alkyl, and $C_3$-$C_6$ cycloalkyl;

(iv) 6- or 10 membered aryloxy optionally substituted with 1, 2 or 3 substituents independently selected from the group consisting of halogen, cyano, nitro, hydroxyl, $C_1$-$C_4$alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), —$N(C_1$-$C_4$ alkyl)$_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl;

(v) 6- or 10 membered arylthio-oxy optionally substituted with 1, 2 or 3 substituents independently selected from the group consisting of halogen, cyano, nitro, hydroxyl, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), —$N(C_1$-$C_4$ alkyl)$_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl; and (vi) 5- to 10-membered heteroaryloxy optionally substituted with 1, 2 or 3 substituents independently selected from the group consisting of halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), —$N(C_1$-$C_4$ alkyl)$_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl;

$R_{13}$ is selected from the group consisting of hydroxy, $C_1$-$C_4$ alkoxy, and —$NH_2$; and $R_{14}$ is, each time selected, independently selected from the group consisting of hydrogen, halogen, cyano, nitro, hydroxyl, $C_1$-$C_4$ alkyl, $C_3$-$C_6$ cycloalkyl, $C_1$-$C_4$ halogenoalkyl, $C_1$-$C_4$ alkoxy, $C_1$-$C_4$ halogenalkoxy, —$NH_2$, —$NH(C_1$-$C_4$ alkyl), and —$N(C_1$-$C_4$ alkyl)$_2$;

or a salt thereof.

In one embodiment, the present invention also provides compositions, comprising: a compound of formula (I) or a salt thereof and an acceptable excipient, the composition optionally further comprising at least one additional active compound.

In one embodiment, the present invention also provides a method for treating parasites, comprising: administering to a subject in need thereof an effective amount of a compound of formula (I) or a salt thereof, the method optionally further comprising an effective amount of at least one additional active compound.

In one embodiment, the present invention also provides a method for controlling parasites, comprising: administering to a subject in need thereof an effective amount of a compound of formula (I) or a salt thereof, the method optionally further comprising an effective amount of at least one additional active compound.

In one embodiment, the present invention also provides a method for treating or controlling parasites, comprising: contacting a subject's environment with an effective amount of a compound of formula (I) or a salt thereof, the method optionally further comprising an effective amount of at least one additional active compound.

Thus, the invention provides for the use of the compounds of the invention as a medicament, including for the manufacture of a medicament. In one embodiment, the invention provides the manufacture of a medicament comprising a compound of formula (I) or a salt thereof for treating parasites. In one embodiment, the invention provides the manufacture of a medicament comprising a compound of formula (I) or a salt thereof for controlling parasites.

The present invention also provides processes from making compounds of the invention and intermediates thereof.

DETAILED DESCRIPTION

The term "$C_1$-$C_4$ alkyl" refers to a straight or branched alkyl chain having from one to four carbon atoms and includes methyl, ethyl, propyl, isopropyl, butyl, and the like.

The term "$C_1$-$C_4$ halogenoalkyl" refers to a straight or branched alkyl chain having from one to four carbon atoms and 1 to 5 halogen and includes fluoromethyl, difluoromethyl, 30 trifluoromethyl, 2,2,2-trifluoroethyl, 1,2,2-trifluoroethyl, 3,3,3-trifluoropropyl, and the like.

The term "$C_2$-$C_4$ alkenyl" refers to a straight or branched alkenyl chain having from two to four carbon atoms and one carbon-carbon double bond, and includes ethylene, propylene, iso-propylene, butylene, iso-butylene, sec-butylene, and the like.

The term "$C_2$-$C_4$ alkynyl" refers to a straight or branched alkynyl chain having from two to four carbon atoms and one carbon-carbon triple bond, and includes acetylene, propargyl, and the like.

The term "$C_1$-$C_4$ alkoxy" refers to a $C_1$-$C_4$ alkyl attached through an oxygen atom and includes methoxy, ethoxy, propoxy, isopropoxy, butoxy, and the like.

The term "$C_3$-$C_6$ cycloalkyl" refers to an alkyl ring of three to six carbon atoms, and includes cyclopropyl, cyclobutyl, cyclopentyl, and cyclohexyl.

The terms "halogen" and "halogeno" refers to a chloro, fluoro, bromo or iodo atom.

The term "$C_6$- or $C_{10}$-membered aryl" refers to phenyl or naphthyl.

The term "$C_6$- or $C_{10}$-membered aryloxy" refers to phenyl or naphthyl attached through an oxygen atom and includes phenoxy and naphtyloxy.

The term "$C_6$- or $C_{10}$-membered arylthio-oxy" refers to phenyl or naphthyl attached through an sulfur atom and includes phenthio-oxy and naphtylthio-oxy. Further it is understood that the term "$C_6$- or $C_{10}$-membered arylthio-oxy" also encompasses in which the sulfur is the —$SO_2$— and —S(O)—.

The term "4- to 7-membered heterocycloalkyl" refers to a 4 to 7 membered monocyclic saturated or partially (but not fully) unsaturated ring having one or more heteroatoms, preferably one, two, or three heteroatoms, selected from the group consisting of nitrogen, oxygen, and sulfur and the ring optionally includes a carbonyl to form a lactam or lactone. It is understood that where sulfur is included that the sulfur may be either —S—, —SO—, or —$SO_2$—. For example, but not limiting, the term includes azetidinyl, pyrrolidinyl, piperidinyl, piperazinyl, morpholinyl, thiomorpholinyl, oxetanyl, dioxolanyl, tetrahydropyranyl, tetrahydrothiopyranyl, tetrahydrofuryl, hexahydropyrimidinyl, tetrahydropyrimidinyl, dihydroimidazolyl, and the like.

The term "5-membered heteroaryl" refers to a five membered, monocyclic, fully unsaturated, ring with one to four carbon atoms and one to four heteroatoms selected from the group consisting of nitrogen, oxygen, and sulfur. For example, but not limiting, the term includes furyl, thienyl, pyrrolyl, imidazolyl, isothiazolyl, isoxazolyl, oxadiazolyl, oxazolyl, thiazolyl, thiadiazolyl, triazolyl, tetrazolyl, and the like. It is understood that a 5-membered heteroaryl can be attached as a substituent through a ring carbon or a ring nitrogen atom where such an attachment mode is available, for example for a pyrrolyl, imidazolyl, pyrazolyl, triazolyl, and the like.

The term "6-membered heteroaryl" refers to a six membered, monocyclic, fully unsaturated ring with one to five carbon atoms and one or more, typically one to four, heteroatoms selected from the group consisting of nitrogen, oxygen, and sulfur. For example, but not limiting, the term includes pyrazinyl, pyrazolyl, pyridazinyl, pyridyl, pyrimidyl, and the like. It is understood that a 6-membered heteroaryl can be attached as a substituent through a ring carbon or a ring nitrogen atom where such an attachment mode is available.

The term "5- to 10-membered heteroaryl" refers to a five to ten membered, monocyclic or polycyclic fully unsaturated, ring or ring system with one to nine carbon atoms and one or more heteroatoms, preferably one, two, or three heteroatoms, selected from the group consisting of nitrogen, oxygen, and sulfur. For example, but not limiting, the term includes furyl, thienyl, pyrrolyl, imidazolyl, isothiazolyl, isoxazolyl, oxadiazolyl, oxazolyl, thiazolyl, pyrazinyl, pyrazolyl, pyridazinyl, pyridyl, pyrimidyl, azepinyl, diazepinyl, benzofuryl, benzothienyl, indolyl, isoindolyl, benzimidazolyl, benzisothiazolyl, benzisoxazolyl, benzoxazolyl, benzopyrazinyl, benzopyrazolyl, quinazolyl, thienopyridyl, quinolyl, isoquinolyl benzothiazolyl, and the like. It is understood that a 5- to 10-membered heteroaryl having 1, 2, or 3 heteroatoms selected from the group O, S, and N can be attached as a substituent through a ring carbon or a ring nitrogen atom where such an attachment mode is available.

The term "5- to 10-membered heteroaryloxy" refers to a 5- to 10-membered heteroaryl having one or more heteroatoms, preferably 1, 2, or 3 heteroatoms, selected from the group O, S, and N, attached through an oxygen atom and includes imidazolyloxy, pyrazolyloxy, pyridyloxy, pyrimidyloxy, quinolyloxy, and the like.

The term "oxo" refers to an oxygen atom doubly bonded to the carbon to which it is attached to form the carbonyl of a ketone or aldehyde. For example, a pryidone radical is contemplated as an oxo substituted 6-membered heteroaryl.

The term "carboxyl" refers to the group below:

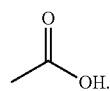

The term "carbamoyl" refers the group below:

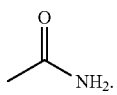

The term "$C_1$-$C_4$ alkoxy carbonyl" refers the group below:

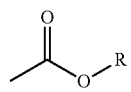

wherein R is a $C_1$-$C_4$ alkyl.

The term "nil" as used herein with reference to a group, substituent, moiety, or the like, indicates that that group, substituent, or moiety is not present. Wherein a group, substituent, or moiety is ordinarily bonded to two or more other groups, substituents, or moieties, the others are bonded together in lieu of the group, substituent, or moiety which is nil. For example, with a compound having the structure A-B-C; wherein B is nil, then A is directly bonded to C and the compound is A-C. As another example, with a compound having the structure A-B-C; wherein C is nil, then the compound is A-B.

The term "salt" refers to salts of veterinary or pharmaceutically acceptable organic acids and bases or inorganic acids and bases. Such salts are well known in the art and include those described in Journal of Pharmaceutical Science, 66, 2-19 (1977). An example is the hydrochloride salt.

The term "substituted," including when used in "optionally substituted" refers to one or more hydrogen radicals of a group being replaced with non-hydrogen radicals (substituent(s)). It is understood that the substituents may be either the same or different at every substituted position. Combinations of groups and substituents envisioned by this invention are those that are stable or chemically feasible. For compounds described herein, groups and substituents thereof may be selected in accordance with permitted valence of the atoms and the substituents, such that the selections and substitutions result in a stable compound, e.g., which does not spontaneously undergo transformation such as by rearrangement, cyclization, elimination, etc.

It is understood that when a cycloalkyl or heterocycloalkyl ring is substituted with a spiro group, the spiro group can be attached, valency permitting, to any position of the cycloalkyl or heterocycloalkyl, forming an additional ring such that the spiro group is attached to the cycloalkyl or heterocycloalkyl ring through a common atom. Examples of such spiro substituted rings include 2-oxa-6-azaspiro[3.3]heptane, 2-azaspiro[3.3]heptane, 2-azaspiro[3.4]octane, 6-oxa-2-azaspiro[3.4]octane, and the like.

The term "stable" refers to compounds that are not substantially altered when subjected to conditions to allow for their production. In a non-limiting example, a stable compound or chemically feasible compound is one that is not substantially altered when kept at a temperature of 40° C. or less, in the absence of moisture or other chemically reactive conditions, for about a week.

It is understood that, where the terms defined herein mention a number of carbon atoms, that the mentioned number refers to the mentioned group and does not include any carbons that may be present in any optional substituent(s) thereon or any carbons that may be present as part of a fused ring, including a benzo-fused ring.

The skilled artisan will appreciate that certain of the compounds of the present invention exist as isomers. All stereoisomers of the compounds of the invention, including geometric isomers, enantiomers, and diastereomers, in any ratio, are contemplated to be within the scope of the present invention.

The skilled artisan will also appreciate that certain of the compounds of the present invention exist as tautomers. All tautomeric forms the compounds of the invention are contemplated to be within the scope of the present invention.

Compounds of the invention also include all isotopic variations, in which at least one atom of the predominant atom mass is replaced by an atom having the same atomic number, but an atomic mass different from the predominant atomic mass. Use of isotopic variations (e.g., deuterium, $^2H$) may afford greater metabolic stability. Additionally, certain isotopic variations of the compounds of the invention may incorporate a radioactive isotope (e.g., tritium, $^3H$, or $^{14}C$), which may be useful in drug and/or substrate tissue distribution studies. Substitution with positron emitting isotopes, such as $^{11}C$, $^{18}F$, $^{15}O$ and $^{13}N$, may be useful in Positron Emission Topography (PET) studies.

The terms "compounds of the invention" and "a compound of the invention" and "compounds of the present invention" and a like include the embodiment of formula (I) and the other more particular embodiments encompassed by formula (I) described herein and the exemplified compounds described herein and a salt of each of these embodiments.

The compound of formula (I) with G as defined has the formulae:

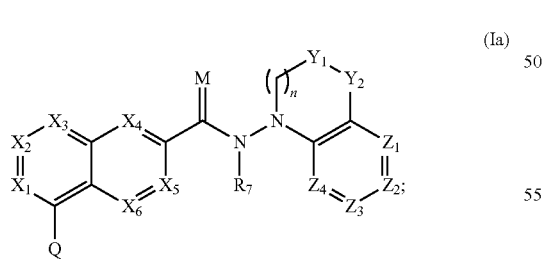

(Ia)

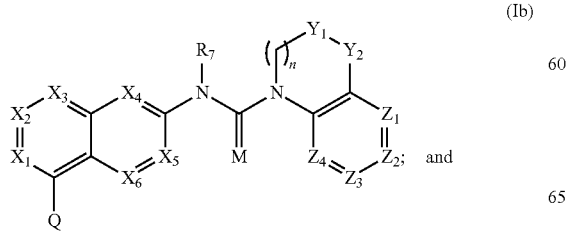

(Ib)

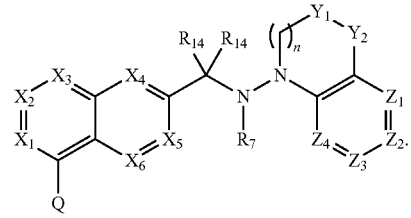

(Ic)

Further embodiments of compounds of the invention are provided below:
(a) One embodiment relates to a compound of formula (Ia).
(b) One embodiment relates to a compound of formula (Ib).
(1) One embodiment relates to a compound of formula (Ic).
(2) One embodiment relates to a compound of formula (I), embodiments (a), embodiment (b), and (1) wherein at least one of $X_1$, $X_2$, $X_3$, and $X_5$ is N.
(c) One embodiment relates to compounds of formula (I), formula (Ia), formula (Ib), or formula (Ic) wherein $X_1$ is $CR_1$; $X_2$ is $CR_2$; $X_3$ is $CR_3$; $X_4$ is $CR_4$; $X_5$ is $CR_5$; and $X_6$ is N; or a salt thereof.
(d) One embodiment relates to compounds of formula (I), formula (Ia), formula (Ib), or formula (Ic) wherein $X_1$ is $CR_1$; $X_2$ is $CR_2$; $X_3$ is $CR_3$; $X_4$ is $CR_4$; $X_5$ is N; and $X_6$ is N; or a salt thereof.
(e) One embodiment relates to compounds of formula (I), formula (Ia), or formula (Ib)) wherein $X_1$ is $CR_1$; $X_2$ is $CR_2$; $X_3$ is $CR_3$; $X_4$ is $CR_4$; $X_5$ is N; and $X_6$ is $CR_6$; or a salt thereof.
(f) One embodiment relates to compounds of formula (I), formula (Ia), formula (Ib), or formula (Ic) wherein $X_1$ is $CR_1$; $X_2$ is $CR_2$; $X_3$ is $CR_3$; $X_4$ is N; $X_5$ is N; and $X_6$ is N; or a salt thereof.
(g) One embodiment relates to a compound of formula (I) and embodiments (a), (b), (1), (2), (c), (d), (e) and (f) wherein Q is a 6- or 10 membered aryl optionally substituted with 1, 2 or 3 substituents independently selected from the group consisting of halogen, cyano, nitro, hydroxyl, $C_1$-$C_4$ alkyl, $C_1$-$C_4$ halogenoalkyl, $C_1$-$C_4$ alkoxy, $C_3$-$C_6$ cycloalkyl, —$NH_2$, —$NH(C_1$-$C_4$ alkyl), —$N(C_1$-$C_4$ alkyl)$_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl; or a salt thereof.
(h) One embodiment relates to a compound of formula (I) and embodiments (a), (b), (1), (2), (c), (d), (e) and (f) wherein Q is 6-membered aryl optionally substituted with 1, 2 or 3 substituents independently selected from the group consisting of halogen, cyano, nitro, hydroxyl, $C_1$-$C_4$ alkyl, $C_1$-$C_4$ halogenoalkyl, $C_1$-$C_4$ alkoxy, $C_3$-$C_6$ cycloalkyl, —$NH_2$, —$NH(C_1$-$C_4$ alkyl), —$N(C_1$-$C_4$ alkyl)$_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl, wherein the 6-membered aryl is fused with a 4- to 7-membered heterocycloalkyl having 1 or 2 heteroatoms selected from the group O, S, and N and wherein the carbons of the heterocycloalkyl are optionally substituted with 1, 2 or 3 substituents independently selected from the group consisting of halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), and —$N(C_1$-$C_4$ alkyl)$_2$ and any N in the heterocycloalkyl is substituted with a substituent selected from the group consisting of hydrogen, $C_1$-$C_4$ alkyl, and $C_3$-$C_6$ cycloalkyl; or a salt thereof.

(i) One embodiment relates to a compound of formula (I) and embodiments (a), (b), (1), (2), (c), (d), (e) and (f) wherein Q is a 5- to 10-membered heteroaryl having 1 or 2 heteroatoms selected from the group O, S, and N and wherein the carbons of the heteroaryl are optionally substituted with 1, 2 or 3 substituents independently selected from the group consisting of halogen, cyano, nitro, —OH, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), and —$N(C_1$-$C_4$ alkyl)$_2$ and any N in the heteroaryl is optionally substituted with a substituent selected from the group consisting of hydrogen, $C_1$-$C_4$ alkyl, and $C_3$-$C_6$ cycloalkyl; or a salt thereof.

(j) One embodiment relates to a compound of formula (I) and embodiments (a), (b), (1), (2), (c), (d), (e) and (f) wherein Q is a 4- to 7-membered heterocycloalkyl having 1 or 2 heteroatoms selected from the group O, S, N, wherein the heterocycloalkyl is optionally benzo-fused, wherein the carbons of the heterocycloalkyl or optionally benzo-fused heterocycloalkyl are optionally substituted with 1, 2, 3, or 4 substituents independently selected from the group consisting of halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), and —$N(C_1$-$C_4$ alkyl)$_2$ and any N in the heterocycloalkyl is optionally substituted with a substituent selected from the group consisting of hydrogen, $C_1$-$C_4$ alkyl, and $C_3$-$C_6$ cycloalkyl; or a salt thereof.

(k) One embodiment relates to a compound of formula (I) and embodiments (a), (b), (1), (2), (c), (d), (e) and (f) wherein Q is a 6- or 10 membered aryloxy optionally substituted with 1, 2 or 3 substituents independently selected from the group consisting of halogen, cyano, nitro, hydroxyl, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), —$N(C_1$-$C_4$ alkyl)$_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl; or a salt thereof.

(l) One embodiment relates to a compound of formula (I) and embodiments (1), (2), (a), (b), (c), (d), (e) and (f) wherein Q is a and 5- to 10-membered heteroaryloxy optionally substituted with 1, 2 or 3 substituents independently selected from the group consisting of halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), —$N(C_1$-$C_4$ alkyl)$_2$, —$NH$ ($C_3$-$C_6$ cycloalkyl), —$N(C_1$-$C_4$alkyl)($C_3$-$C_6$-cycloalkyl), —$NHSO_2(C_1$-$C_4$ alkyl), —$SC_1$-$C_4$ alkyl, —$S(O)$ $C_1$-$C_4$ alkyl, —$SO_2C_1$-$C_4$ alkyl, —$S(O)C_1$-$C_4$-halogenoalkyl and —$SO_2C_1$-$C_4$ halogenoalkyl; or a salt thereof.

(m) One embodiment relates to a compound of formula (I) and embodiments (a), (b), (1), (2), (c), (d), (e) (f), (g), (h), (i), (j), (k), and (l) wherein n is 1; or a salt thereof.

(n) One embodiment relates to a compound of formula (I) and embodiments (a), (b), (1), (2), (c), (d), (e) and (f), (g), (h), (i), (j), (k), (l), and (m) wherein $Y_1$ is $CR_8R_9$ and $Y_2$ is O; or a salt thereof;

(o) One embodiment relates to a compound of formula (I) and embodiments (a), (b), (1), (2), (c), (d), (e) (f), (g), (h), (i), (j), (k), (l), (m), and (n) wherein $R_4$ is selected from the group consisting of $C_1$-$C_4$ alkyl, $C_3$-$C_6$ cycloalkyl, —$N(C_1$-$C_4$ alkyl)$_2$, and 4- to 7-membered heterocycloalkyl; or a salt thereof.

(p) One embodiment relates to a compound of formula (I) and embodiments (a), (b), (1), (2), (c), (d), (e), (f), (1), (2), (g), (h), (i), (j), (k), (l), (m), and (n) wherein $R_4$ is —$N(C_1$-$C_4$ alkyl)$_2$; or a salt thereof.

(q) One embodiment relates to a compound of formula (I) and embodiments (a), (b), (1), (2), (c), (d), (e), (f), (g), (h), (i), (j), (k), (l), (m), (n), (o), and (p) wherein M is O; or a salt thereof.

(r) One embodiment relates to a compound of formula (I) and embodiments (a), (b), (1), (2), (c), (d), (e), (f), (g), (h), (i), (j), (k), (l), (m), (n), (o), and (p) wherein M is $NR_{13}$; or a salt thereof.

(s) One embodiment relates to a compound of formula (I) and embodiments (a), (b), (1), (2), (c), (d), (e), (f), (g), (h), (i), (j), (k), (l), (m), (n), (o), and (p) wherein M is S; or a salt thereof.

(t) One embodiment relates to a compound of formula (I) and embodiments (a), (b), (1), (2), (c), (d), (e), (f), (g), (h), (i), (j), (k), (l), (m), (n), (o), (p), (q), (r), and (s) wherein $Z_1$ is $CR_{11}$, $Z_2$ is $CR_{11}$, $Z_3$ is nil, and $Z_4$ is S; or a salt thereof.

(u) Another embodiment relates to a salt of each of the exemplified compounds.

Another embodiment provides compounds of formulae:

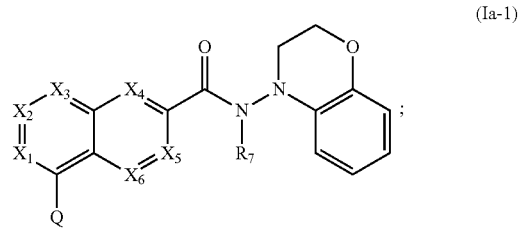

(Ia-1)

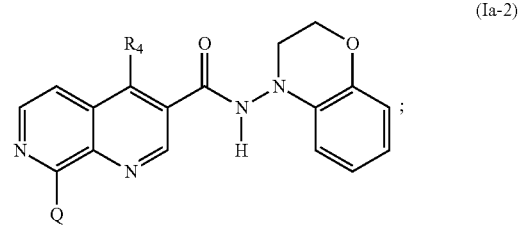

(Ia-2)

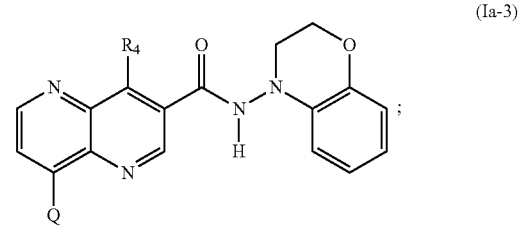

(Ia-3)

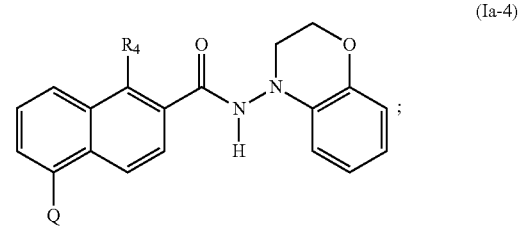

(Ia-4)

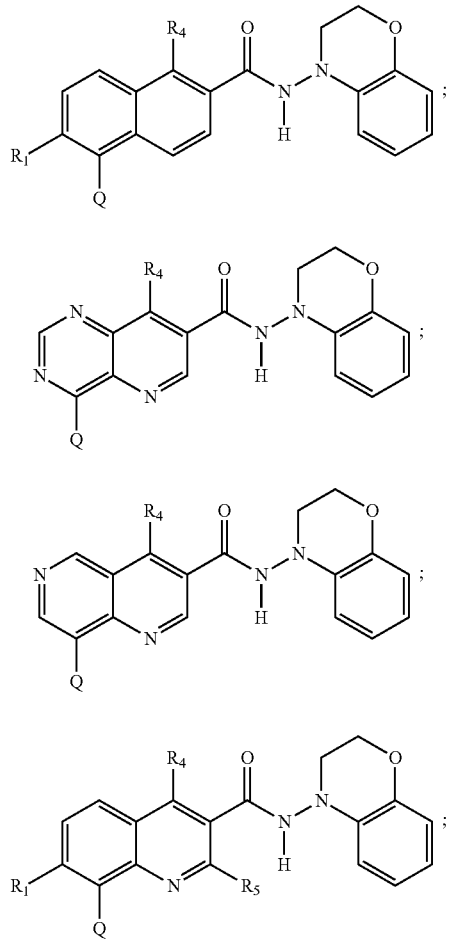
(Ia-5);
(Ia-6);
(Ia-7);
(Ia-8);
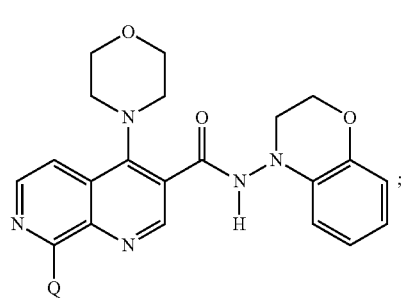
(Ia-1a);
(Ia-2a);
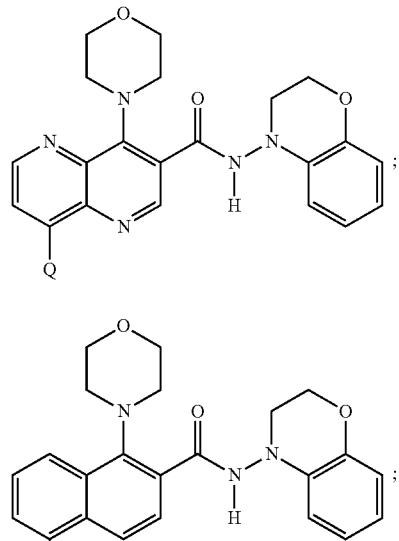
(Ia-3a);
(Ia-4a);
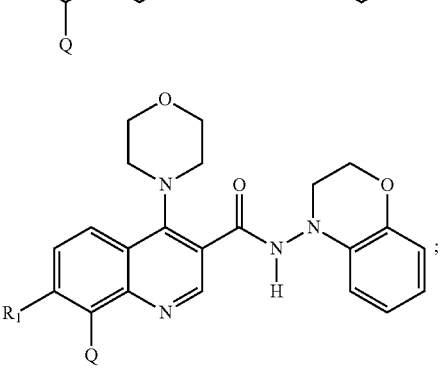
(Ia-5a);
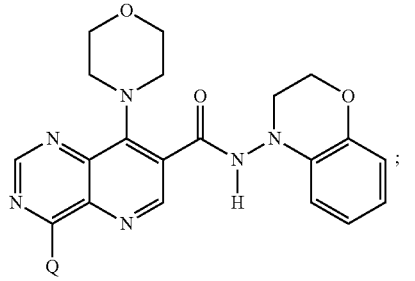
(Ia-6a);
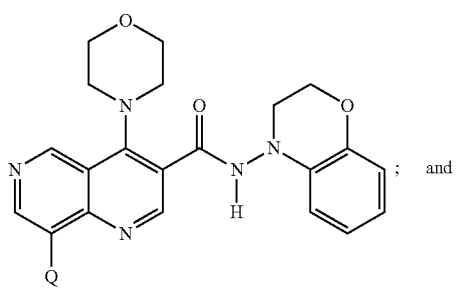
(Ia-7a); and -continued (Ia-8a)

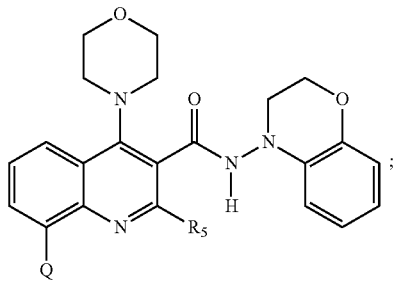

or a salt of any of the foregoing;

wherein $X_1$, $X_2$, $X_3$, $X_4$, $X_5$, $X_6$, $R_1$, $R_4$, $R_5$, $R_7$, and Q are as defined in the Summary.

In another embodiment for formula (Ia-1) through (Ia-8a) [i.e., formulae (Ia-1), (Ia-2), (Ia-3), (Ia-4), (Ia-5), (Ia-6), (Ia-7), (Ia-8), (Ia-1a), (Ia-2a), (Ia-3a), (Ia-4a), (Ia-5a), (Ia-6a), (Ia-7a), and (Ia-8a)], $R_1$, when present [i.e., when specifically depicted in the formula], is selected from hydrogen, halogen, and cyano. In another embodiment for formula (Ia-1) through (Ia-8a), $R_1$, when present, is selected from hydrogen, fluoro, and cyano. In another embodiment for formula (Ia-1) through (Ia-8a), $R_1$, when present, is hydrogen or fluoro. In another embodiment for formula (Ia-1) through (Ia-8a), $R_1$, when present, is hydrogen. In another embodiment for formula (Ia-1) through (Ia-8a), $R_1$, when present, is fluoro.

In another embodiment for formula (Ia-1) through (Ia-8a), $R_4$, when present, is selected from:

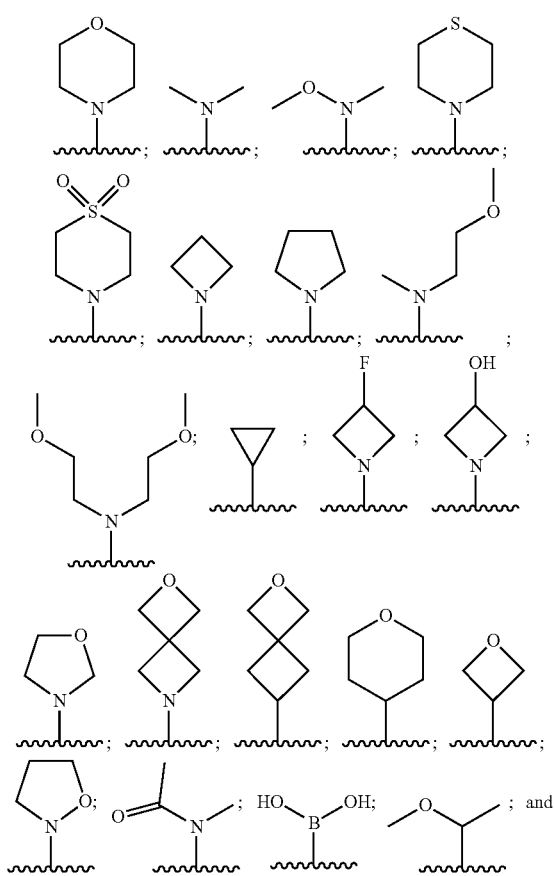

In another embodiment for formula (Ia-1) through (Ia-8a), $R_4$, when present, is selected from:

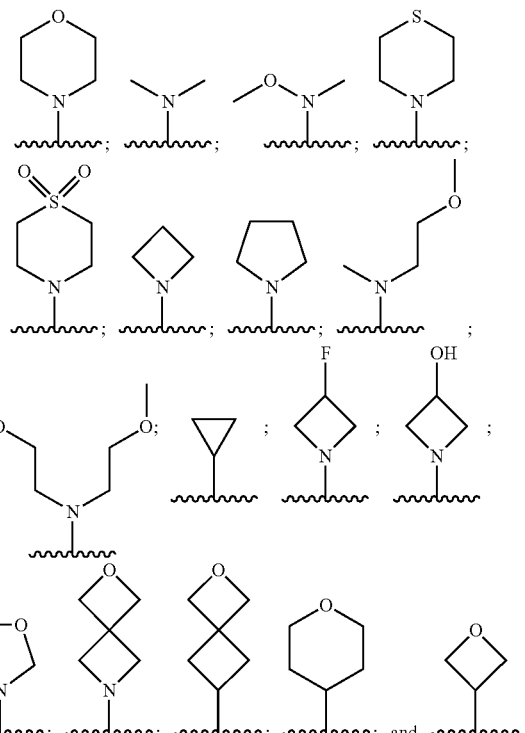

In another embodiment for formula (Ia-1) through (Ia-8a), $R_4$, when present, is selected from:

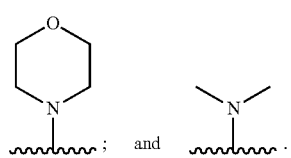

In another embodiment for formula (Ia-1) through (Ia-8a), $R_5$, when present, is hydrogen, halogen, $C_1$-$C_4$ alkyl, or $C_1$-$C_4$ halogenoalkyl. In another embodiment for formula (Ia-1) through (Ia-8a), $R_5$, when present, is hydrogen, $C_1$-$C_4$ alkyl, or $C_1$-$C_4$ halogenoalkyl. In another embodiment for formula (Ia-1) through (Ia-8a), $R_5$, when present, is hydrogen, methyl, or trifluoromethyl.

In another embodiment for formula (Ia-1) through (Ia-8a), $R_7$, when present, is hydrogen.

In another embodiment for formula (Ia-1) through (Ia-8a), Q is selected from a 6-membered aryl and a 5- or 6-membered heteroaryl having 1, 2, or 3 heteroatoms independently selected from N, O, and S, wherein the aryl and heteroaryl are optionally substituted by 1, 2, 3, 4, or 5 substituents independently selected from halogen, $C_1$-$C_4$ halogenoalkyl, and $C_1$-$C_4$ alkoxy. In another embodiment for formula (Ia-1)

through (Ia-8a), Q is selected from a 6-membered aryl optionally substituted by 1, 2, 3, 4, or 5 substituents independently selected from halogen.
In another embodiment for formula (Ia-1) through (Ia-8a), Q is selected from:
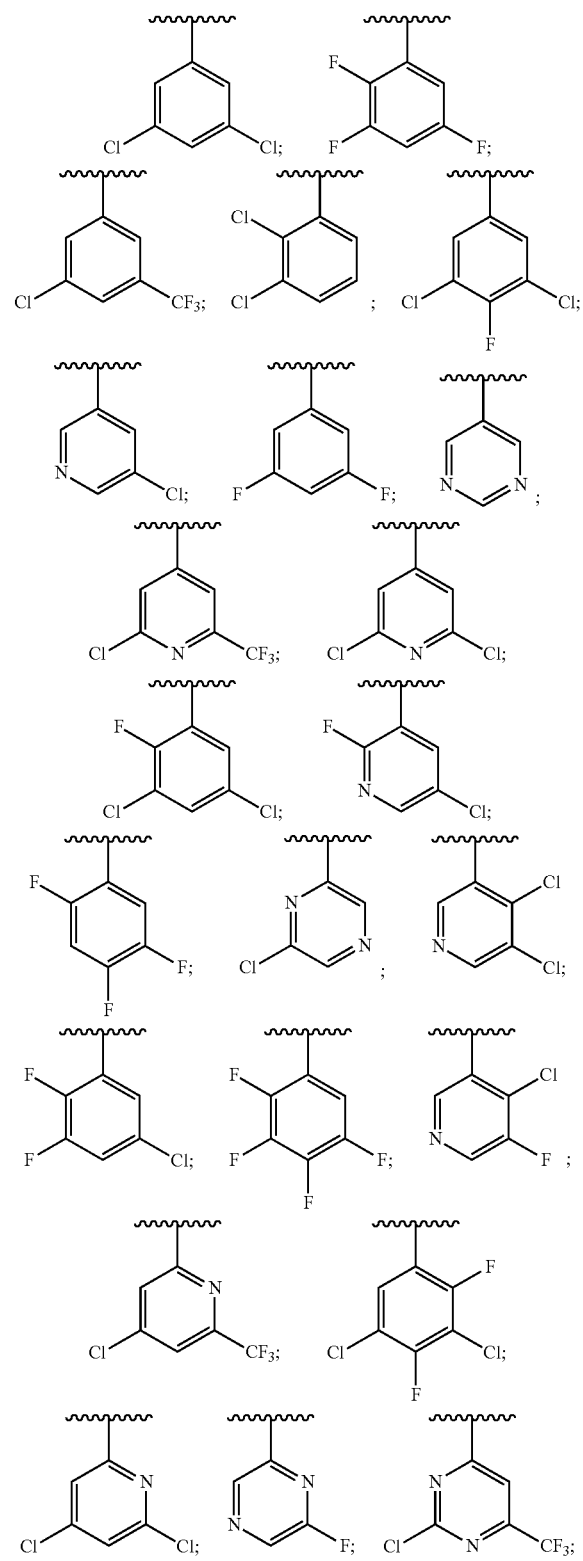
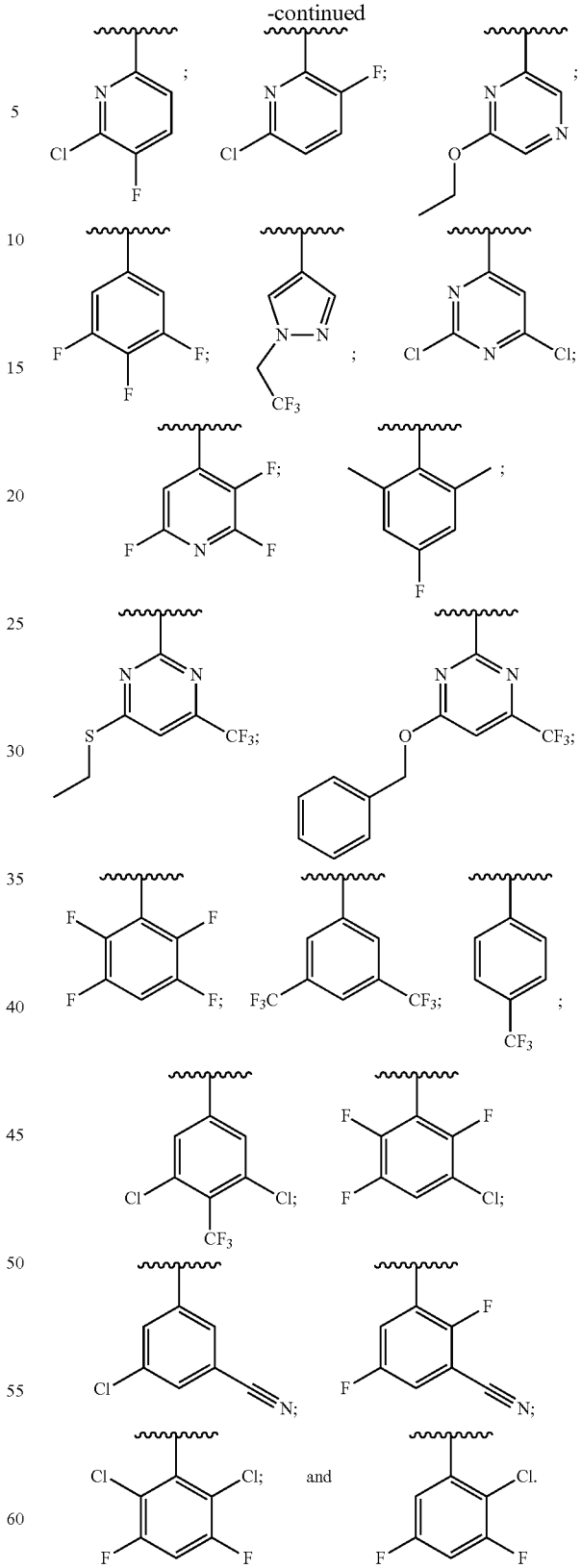
In another embodiment for formula (Ia-1) through (Ia-8a), Q is selected from:

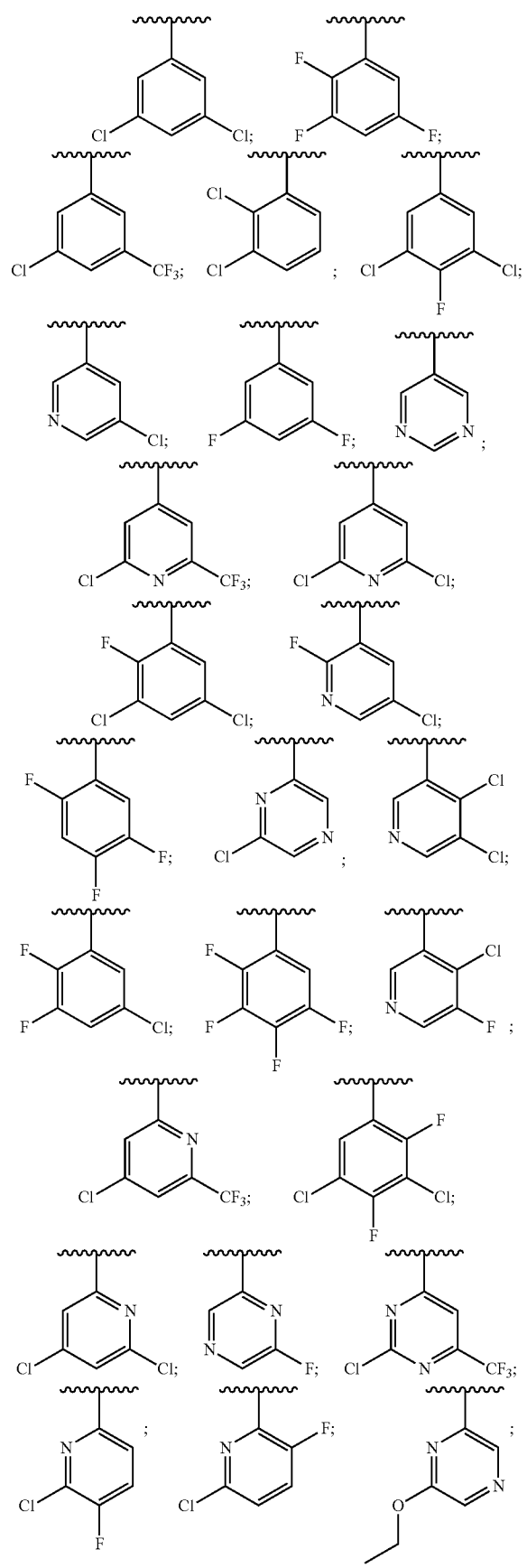
-continued
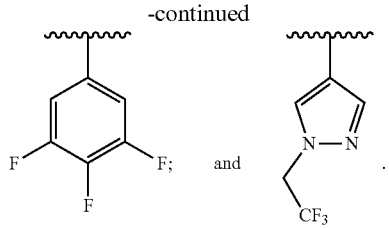
In another embodiment for formula (Ia-1) through (Ia-8a),
$X_1, X_2, X_3, X_4, X_5, X_6$, when present, are as defined in the Summary;
$R_1$, when present, is selected from hydrogen, halogen, and cyano;
$R_4$, when present, is selected from:
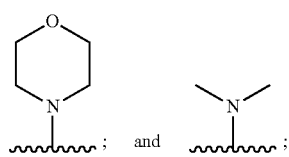
$R_5$, when present, is selected from hydrogen, methyl, and trifluoromethyl;
$R_7$, when present, is hydrogen; and
Q is selected from:
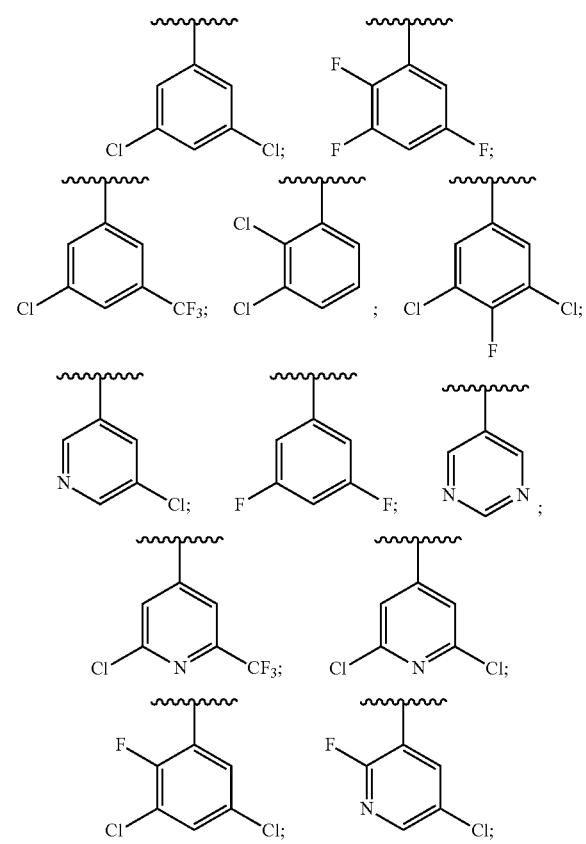

-continued
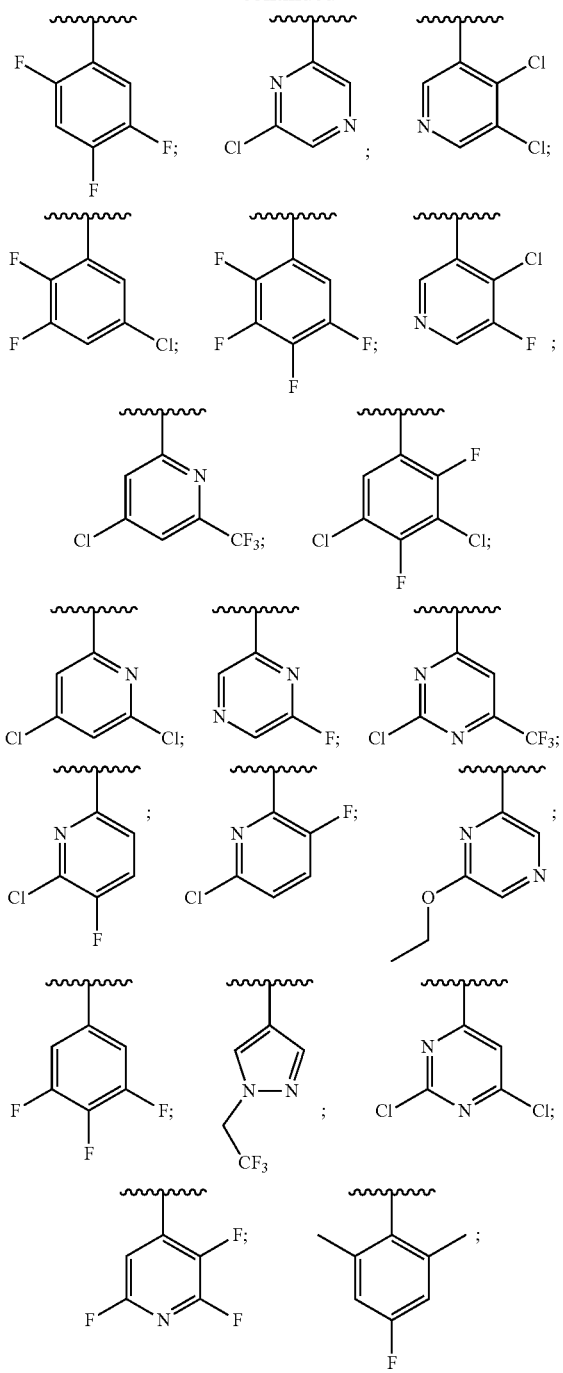
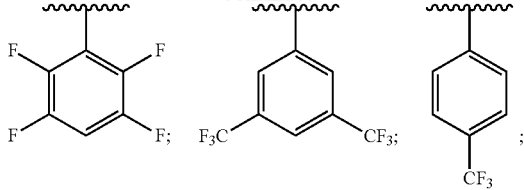
or a salt thereof.
In another embodiment for formula (Ia-1) through (Ia-8a),
$X_1, X_2, X_3, X_4, X_5, X_6$, when present, are as defined in the Summary;
$R_1$, when present, is selected from hydrogen, halogen, and cyano;
$R_4$, when present, is selected from:
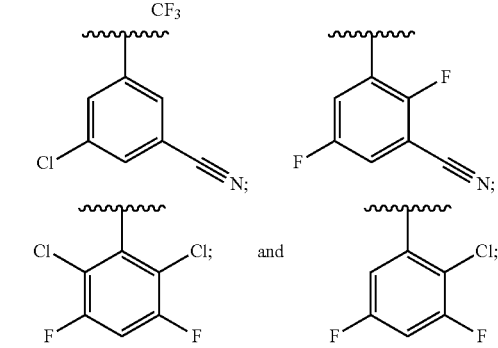
$R_5$, when present, is selected from hydrogen;
$R_7$, when present, is hydrogen; and
Q is selected from:
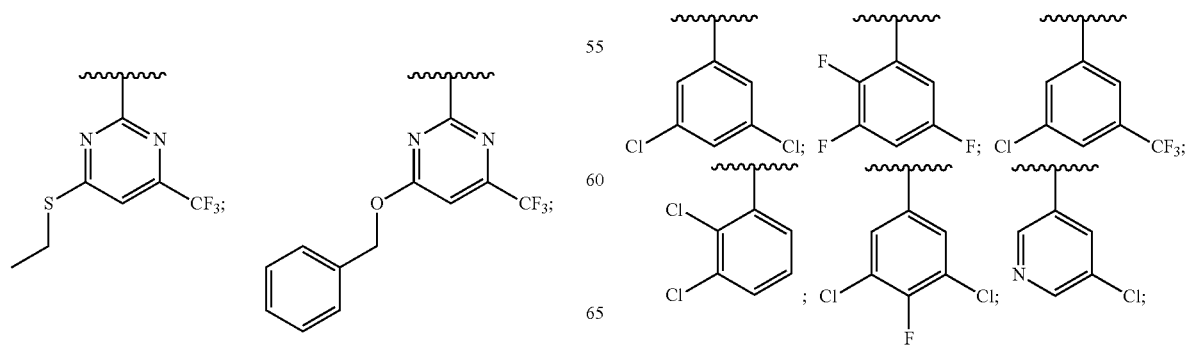

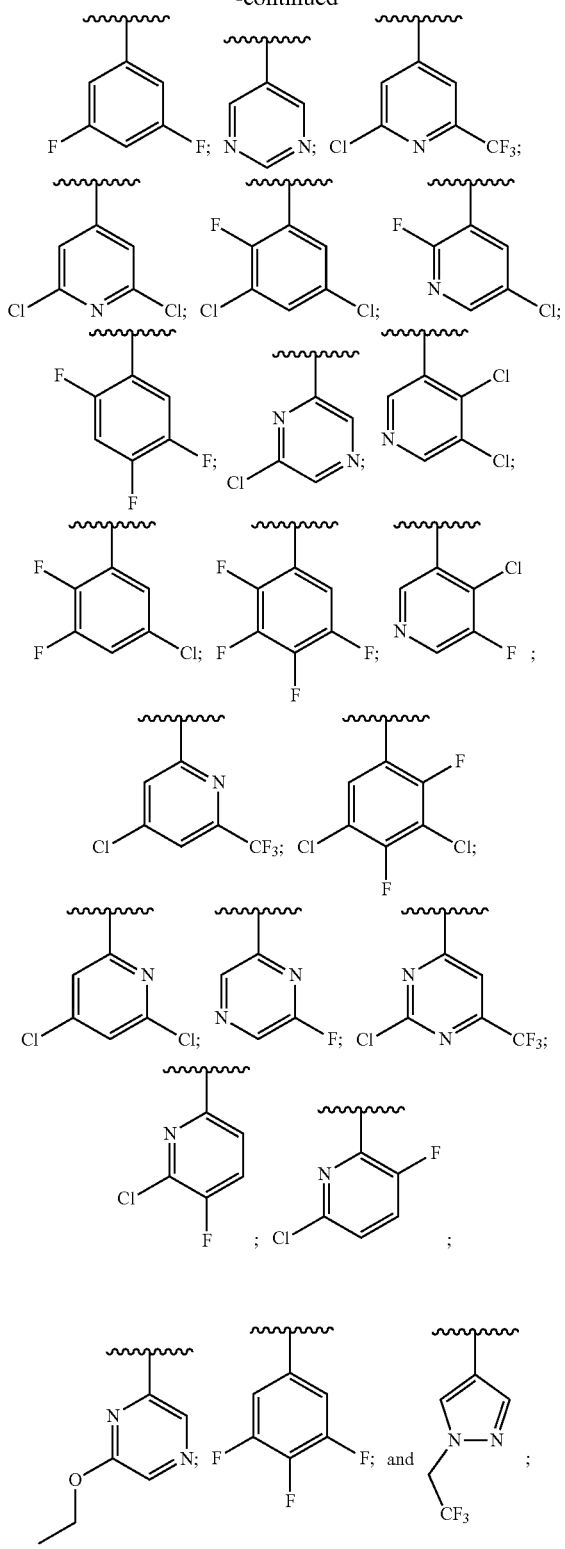

or a salt thereof.

In another embodiment, the compound of formula (I), or a salt thereof, has formula (Ia-5),

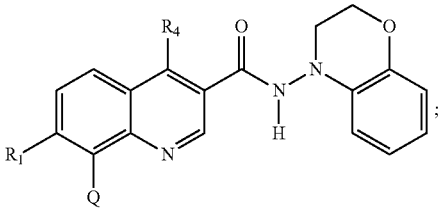

wherein $R_1$, $R_4$, and Q are as defined in the Summary. Preferably, $R_1$ is hydrogen, halogen, or cyano. More preferably, $R_1$ is hydrogen or fluoro. Preferably, $R_4$ is 4-morpholino or dimethylamino. Preferably, Q is a 6-membered aryl optionally substituted with 1, 2, 3, 4, or 5 substituents independently selected from the group consisting of halogen, cyano, nitro, hydroxyl, $C_1$-$C_4$ alkyl, $C_1$-$C_4$ halogenoalkyl, $C_1$-$C_4$ alkoxy, $C_3$-$C_6$ cycloalkyl, —$NH_2$, —$NH(C_1$-$C_4$ alkyl), —$N(C_1$-$C_4$ alkyl$)_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl, wherein the 6- or 10 membered aryl is optionally fused with a 4- to 7-membered heterocycloalkyl having 1 or 2 heteroatoms selected from the group O, S, and N and wherein the carbons of the heterocycloalkyl are optionally substituted with 1, 2 or 3 substituents independently selected from the group halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), and —$N(C_1$-$C_4$ alkyl$)_2$ and any N in the heterocycloalkyl is, valency permitting, substituted with a substituent selected from the group consisting of hydrogen, $C_1$-$C_4$ alkyl, and $C_3$-$C_6$ cycloalkyl. Preferably, Q is 6-membered aryl substituted by 1, 2, 3, 4, or 5 substituents independently selected from halogen, $C_1$-$C_4$ alkyl, $C_1$-$C_4$ halogenoalkyl, and cyano. Preferably, Q is selected from:

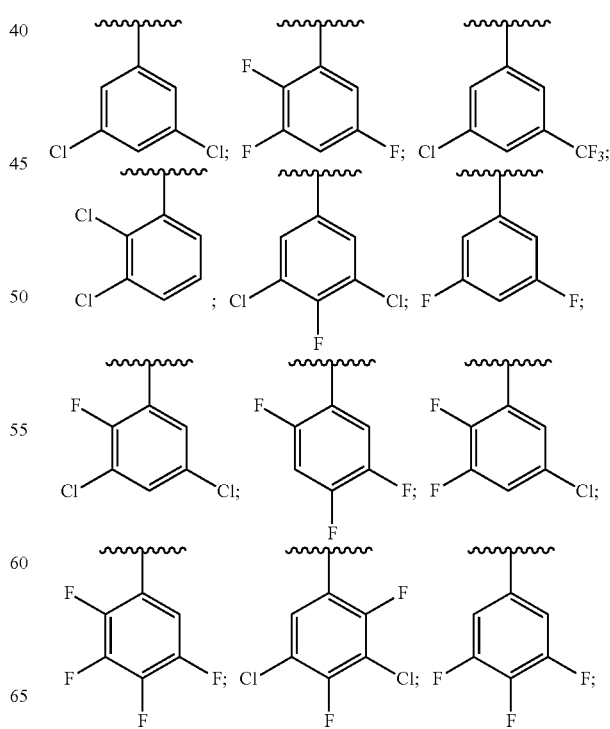

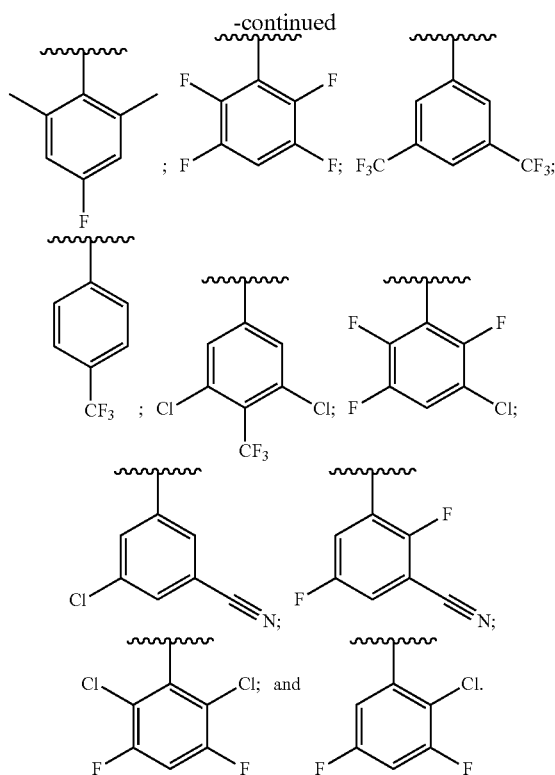

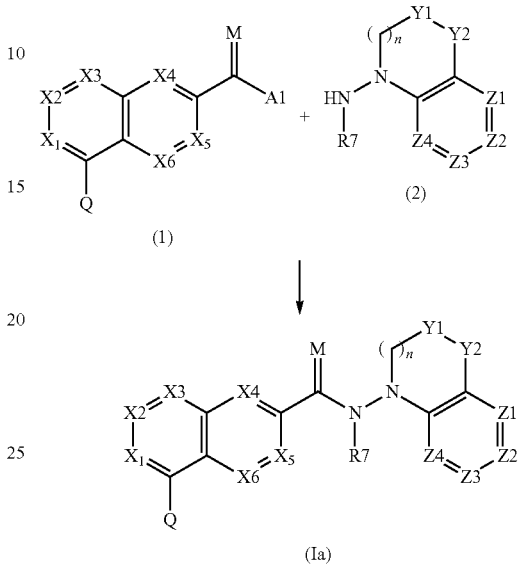

Scheme A (1)

(2)

(Ia)

The compounds of the invention can be prepared by a variety of procedures, some of which are described below. All substituents, unless otherwise indicated, are as previously defined.

The products of each step can be recovered by conventional methods including extraction, evaporation, precipitation, chromatography, filtration, trituration, crystallization, and the like. The procedures may require protection of certain groups, for example hydroxyl, thiol, amino, or carboxyl groups to minimize unwanted reactions. The selection, use, and removal of protecting groups are well known and appreciated as standard practice, for example T. W. Greene and P. G. M. Wuts in Protective Groups in Organic Chemistry (John Wiley and Sons, 1991).

As used herein: AcOH refers to acetic acid; aq. refers to aqueous, br refers to broad, $CH_3CN$ refers to acetonitrile, $CH_2Cl_2$ refers to methylene chloride, d refers to doublet, dd refers to doublet of doublet, DIPEA refers to N-diisopropylethylamine, DMA refers to N,N-dimethylacetamide, DMF refers to N,N-dimethylformamide, DMSO refers to dimethylsulfoxide, ee: refers to enantiomeric excess, eq. refers to equivalent, ES refers to electrospray ionization, EtOAc refers to EtOAc, EtOH refers to EtOH, HATU refers to 1-[Bis(dimethylamino)methylene]-1H-1,2,3-triazolo[4,5-b]pyridinium 3-oxid hexafluorophosphate, HPLC refers to high performance liquid chromatography, iPrOH refers to isopropanol, J refers to coupling constant, KOAc refers to potassium acetate, $K_2CO_3$ refers to potassium carbonate, LCMS refers to liquid chromatography-mass spectrometry, m/z: refers to mass-to-charge ratio, M refers to molarity, m refers to multiplet, MeOH refers to mEtOH, min. refers to minutes, $NaHCO_3$ refers to sodium bicarbonate, $Na_2CO_3$ refers to sodium carbonate, $NEt_3$ refers to triethylamine, NMR refers to nuclear magnetic resonance, NMP refers to N-methylpyrrolidone, PEG refers to polethyleneglycol, q refers to quartet, quint refers to quintet, rt refers to rt, $R_t$ refers to retention time, s refers to singlet, sat. refers to saturated, T refers to temperature, t refers to triplet, td refers to triplet of doublets, THF refers to THF, wt refers to weight, and δ refers to chemical shift.

Scheme A depicts the reaction of a compound of formula (1) and a compound of formula (2) to give a compound of formula (Ia). The depicted compound of formula (1) is one in which the group $A_1$ is a hydroxyl group, or an activating groups as is discussed below, and Q, M, $X_1$, $X_2$, $X_3$, $X_4$, $X_5$, and $X_6$ are as desired in the final compound of formula (Ia) or a group that gives rise to Q, M, $X_1$, $X_2$, $X_3$, $X_4$, $X_5$, and $X_6$ as desired in the final compound of formula (Ia). For example, a compound of formula (1) can be one in which the depicted group "Q" is a halogen which is further elaborated, in a subsequent step, not shown, to give a compound in which Q is as defined in formula (Ia). Also, for example, a compound in which M is O can be further elaborated to compound in M is S or in which M is $NR_{13}$. The preparation of such compounds of formula (1) is readily appreciated in the art. A compound of formula (2) is one in which $R_7$, n, $Y_1$, $Y_2$, $Z_1$, $Z_2$, $Z_3$, and $Z_4$ are as desired in the final product of formula (Ia) or a group that gives rise to $R_7$, $Y_1$, $Y_2$, $Z_1$, $Z_2$, $Z_3$, and $Z_4$ as desired in the final product of formula (Ia). The preparation of such compounds of formula (2) is readily appreciated in the art.

As mentioned above, Scheme A depicts the reaction of a compound of formula (1) using a compound of formula (2) to give a compound of formula (Ia). Typical groups $A_1$ are hydroxyl or a leaving group, such as chloro, bromo, or imidazolyl, an activating moiety, a mixed anhydride of another carboxylic acid, such as formic acid, acetic acid, or represents the other part of a symmetrical anhydride formed from two compounds of formula (1). For example, standard amide forming conditions can be used, such as those using coupling agents, including those used in peptide couplings, such as 2-(1H-7-azabenzotriazol-1-yl)-1,1,3,3-tetramethyl uronium hexafluorophosphate methanaminium (HATU), dicyclohexylcarbodiimide (DCC), and 1-(3-dimethylaminopropyl)-3-ethylcarbodiimide HCl. If necessary or desired, an additive such as 4-(dimethylamino)pyridine, 1-hydroxybenzotriazole, and the like may be used to facilitate the reaction. Such reactions are generally carried out using a base, such as N-methylmorpholine or $NEt_3$, in a wide variety of suitable solvents such as $CH_2Cl_2$, DMF, NMP, DMA, THF, and the like. Such reactions are well understood and appreciated in the art.

It will be recognized by one of ordinary skill in the art that a compound of formula (Ia) can be elaborated in a variety of ways to give other compounds of formula (Ia). Such reactions include hydrolysis, oxidation, reduction, alkylation, arylation (including heteroaryl groups) amidations, sulfonations, and the like.

Also, in an optional step, not shown, the compounds of formula (Ia) can be converted to salts by methods well known and appreciated in the art.

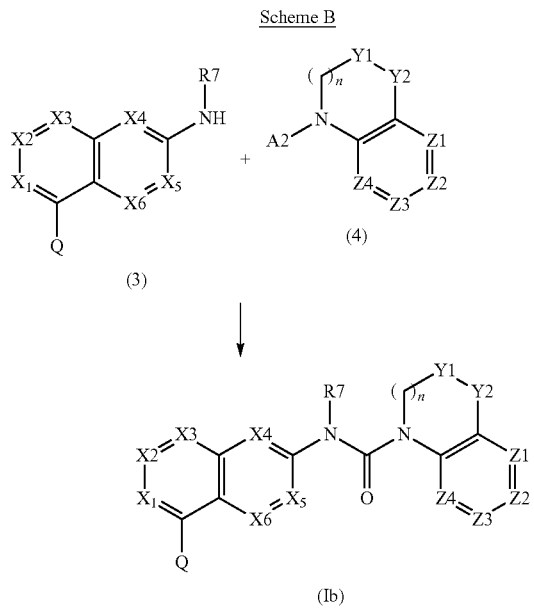

Scheme B depicts the reaction of a compound of formula (3) and a compound of formula (4) to give a compound of formula (Ib). The depicted compound of formula (3) Q, $R_7$, $X_1$, $X_2$, $X_3$, $X_4$, $X_5$, and $X_6$ are as desired in the final compound of formula (I) or a group that gives rise to Q, $R_7$, $X_1$, $X_2$, $X_3$, $X_4$, $X_5$, and $X_6$ as desired in the final compound of formula (Ib). For example, a compound of formula (3) can be one in which the depicted group "Q" is a halogen which is further elaborated, in a subsequent step, not shown, to give a compound in which Q is as defined in formula (Ib). The preparation of such compounds of formula (3) is readily appreciated in the art. A compound of formula (4) is one in which is one in which the group A2 is a carboxy group, or an activating groups as is discussed below, and n, $Y_1$, $Y_2$, $Z_1$, $Z_2$, $Z_3$, and $Z_4$ are as desired in the final product of formula (Ib) or a group that gives rise to $Y_1$, $Y_2$, $Z_1$, $Z_2$, $Z_3$, and $Z_4$ as desired in the final product of formula (Ib). The preparation of such compounds of formula (4) is readily appreciated in the art.

As mentioned above, Scheme B depicts the reaction of a compound of formula (3) in which using a compound of formula (4) to give a compound of formula (Ib). Typical groups $A_2$ are carboxy or an acid chloride or acid bromide, or imidazide, an activating moiety, a mixed anhydride of another carboxylic acid, such as formic acid, acetic acid, or represents the other part of a symmetrical anhydride formed from two compounds of formula (4) in which $A_2$ is carboxy derivative or another activated moiety. Such reactions are generally carried out using a base, such as N-methylmorpholine or triethylamine, in a wide variety of suitable solvents such as $CH_2Cl_2$, DMF, N-methylpyrrolidone (NMP), DMA, THF, and the like. As is well known, a compound of (Ib) in which M is O can be further elaborated to compound in M is S or in which M is $NR_{13}$.

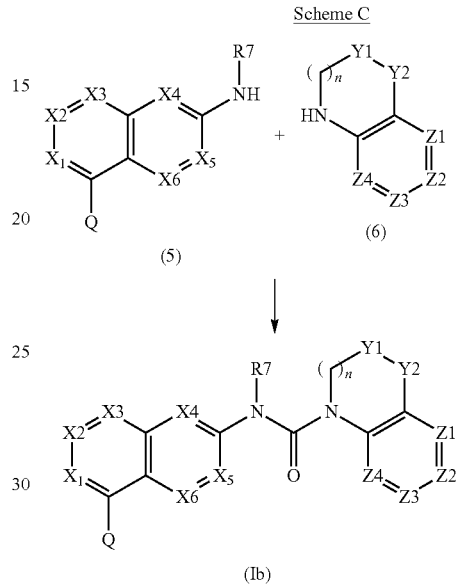

Scheme C depicts the reaction of a compound of formula (5) and a compound of formula (6) to give a compound of formula (Ib). The depicted compound of formula (5) is the same as the a compound of formula (3) described in Scheme B. A compound of formula (6) is one in which is one in which the depicted $R_7$ and n, $Y_1$, $Y_2$, $Z_1$, $Z_2$, $Z_3$, and $Z_4$ are as desired in the final product of formula (Tb) or a group that gives rise to the depicted $R_7$, and $Y_1$, $Y_2$, $Z_1$, $Z_2$, $Z_3$, and $Z_4$ as desired in the final product of formula (Tb). The preparation of such compounds of formula (6) is readily appreciated in the art. The formation of unsymmetrical ureas is well known using phosgene, carbonyldiimidazole, isopropenyl carbamates, and optionally substituted phenoxy carbonyl halides, such as p-nitrophenoxycarbonyl chloride.

Such reactions are generally carried out in a sequential manner by adding phosgene, carbonyldiimidazole, isopropenyl carbamates, and optionally substituted phenoxycarbonyl halides to either a compound of formula (5) or a compound of formula (6) using a base, such as N-methylmorpholine or triethylamine, in a wide variety of suitable solvents such as $CH_2Cl_2$, DMF, N-methylpyrrolidone (NMP), DMA, THF, and the like. Then the other of compound (5) or compound (6) is added.

It will be recognized by one of ordinary skill in the art that in Schemes B and C a compound of formula (Ib) can be elaborated in a variety of ways to give other compounds of formula (Ib). Such reactions include hydrolysis, oxidation, reduction, alkylation, arylation (including heteroaryl groups) amidations, sulfonations, and the like. As is well known, a compound of (Ib) in which M is O can be further elaborated to compound in M is S or in which M is $NR_{13}$.

Also, in an optional step, not shown, the compounds of formula (Ib) can be converted to salts by methods well known and appreciated in the art.

The following examples are intended to be illustrative and non-limiting, and represent specific embodiments of the present invention.

Analyses methods A and B were performed using an Agilent 1200 Infinity Series Liquid Chromatography (LC) system, consisting of a 1260 HiP degasser (G4225A), 1260 Binary Pump (G1312B), 1290 auto-sampler (G4226A), 1290 thermo-stated column compartment (G1316C) and a 1260 Diode Array Detector (G4212B) coupled to an Agilent 6150 single quadrupole mass spectrometry (MS) detector. The injection volume was set to 1 μL by default. The UV (DAD) acquisition was performed at 40 Hz, with a scan range of 190-400 nm (by 5 nm step). A 1:1 flow split was used before the MS detector. The MS was operated with an electro-spray ionization source (ESI) in both positive & negative ion mode. The nebulizer pressure was set to 50 psi, the drying gas temperature and flow to 350° C. and 12 L/min respectively. The capillary voltages used were 4000V in positive mode and 3500V in negative mode. The MS acquisition range was set to 100-800 m/z with a step size of 0.2 m/z in both polarity modes. Fragmentor voltage was set to 70 (ESI+) or 120 (ESI−), Gain to 0.40 (ESI+) or 1.00 (ESI−) and the ion count threshold to 4000 (ESI+) or 1000 (ESI−). The overall MS scan cycle time was 0.15 s/cycle. Data acquisition was performed with Agilent Chemstation software.

Method A: Analyses were carried out on a Phenomenex Gemini-NX C18 column of 50 mm length, 2.1 mm internal diameter and 3 μm particle size. The mobile phase used was: A1=Water with 0.1% formic acid/B1=CH$_3$CN with 0.1% formic acid. The run was performed at a temperature of 50° C. and a flow rate of 1.2 mL/min, with a gradient elution from 5% to 95% (B1) over 1.5 min followed by a 0.5 min hold at 95% (B1).

Method B: Analyses were carried out on a Waters XBridge C18 column of 50 mm length, 2.1 mm internal diameter and 3.5 μm particle size. The mobile phase used was: A2=Water with 10 mM ammonium bicarbonate, adjusted at pH 9 with ammonium hydroxide/B2=CH$_3$CN. The run was performed at a temperature of 50° C. and a flow rate of 1.2 mL/min, with a gradient elution from 5% to 95% (B2) over 1.5 min followed by a 0.5 min hold at 95% (B2).

Analyses methods C and D were performed using a Waters Acquity UPLC Liquid Chromatography (LC) system, coupled to an Waters SQ Detector 2 single quadrupole mass spectrometry (MS) detector. The UV (DAD) acquisition was performed with a scan range of 200-400 nm (by 1.2 nm resolution). The MS was operated with an electro-spray ionization source (ESI) in both positive & negative ion mode. Capillary Voltage 3.50 (kV), Cone Voltage 35 (V), and Desolvation Temperature of 550° C. Desolvation gas flow 1000 (L/Hr), Cone gas flow 50 (L/Hr). The MS acquisition range was set to 100-1500 m/z. MS scan cycle time was 0.5 s. Data acquisition was performed with Waters Masslynx software.

Method C: Analyses were carried out on an Acquity UPLC BEH C18 column of 50 mm length, 2.1 mm internal diameter and 1.7 μm particle size. The mobile phase used was: A1=Water with 0.1% formic acid/B1=CH$_3$CN with 0.1% formic acid. The injection volume was 0.1 μL. The run was performed at a temperature of 40° C. and a flow rate of 0.6 mL/min, with a gradient elution. Method info (Time (min) and B %): 0-5; 0.3-5; 2.5-95; 3.7-95; 4-5; 4.6-5.

Method D: Analyses were carried out on an Acquity UPLC BEH C18 column of 50 mm length, 2.1 mm internal diameter and 1.7 μm particle size. The mobile phase used was: A1=Water with 10 mM Ammonium acetate/B1=CH$_3$CN with 0.1% formic acid. The injection volume was 0.1 μL. The run was performed at a temperature of 45° C. and a flow rate of 0.5 mL/min, with a gradient elution. Method info (Time (min) and A %): 0-98; 0.3-98; 3.2-2; 4.4-2; 4.7-98.

Example 1.1

N-[8-(3,5-dichlorophenyl)-4-(dimethylamino)-3-quinolyl]-2,3-dihydro-1,4-benzoxazine-4-carboxamide

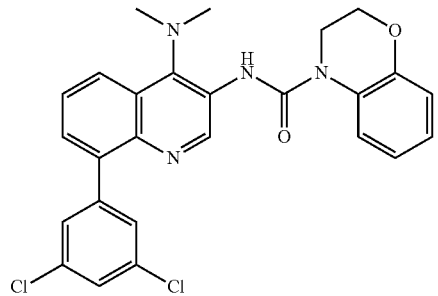 [SMILES: CN(C)c1c(NC(=O)N2CCOc3ccccc32)cnc2c(-c3cc(Cl)cc(Cl)c3)cccc12]

To a stirred solution of 8-bromoquinolin-4-ol (2 g, 8.82 mmol) in propionic acid (20 mL, 265 mmol) at 100° C. was added nitric acid (1 mL, 16 mmol) slowly over 5 min. The reaction was heated to 125° C. and left to stir for 45 min. The reaction was then allowed to cool to rt, causing the product to precipitate. The solid was collected by filtration and washed with water (3×10 mL), iPrOH (10 mL), isohexane (10 mL), and then dried in the vacuum oven for 1 hour to give 8-bromo-3-nitro-quinolin-4-ol. LCMS (method B): R$_t$=0.54 min, m/z=269 [M+H]$^+$.

To a solution of 8-bromo-3-nitro-quinolin-4-ol (1.52 g, 5.37 mmol) was added POCl$_3$ (10 mL, 107 mmol). The suspension was heated to reflux and stirred for 2 hours. The reaction mixture was allowed to cool to rt, and left to stand overnight. The reaction mixture was concentrated in vacuo (azeotroping with toluene) to give 8-bromo-4-chloro-3-nitro-quinoline which was used directly in the next step without further purification.

To a solution of 8-bromo-4-chloro-3-nitro-quinoline (2.32 g, 5.38 mmol) in THF (30 mL) was slowly added dimethylamine (2 M in THF, 7 mL, 14 mmol). The reaction was left to stir at rt for 1.5 hour. The reaction mixture was partitioned between EtOAc and sat. aq. NaHCO$_3$ (50 mL of each). Brine (50 mL) was added. The layers were separated and the aq. layer was extracted with EtOAc (2×50 mL). The combined organic layers were concentrated in vacuo to give 8-bromo-N,N-dimethyl-3-nitro-quinolin-4-amine. LCMS (method B): R$_t$=1.13 min, m/z=296 [M+H]$^+$.

To a solution of 8-bromo-N,N-dimethyl-3-nitro-quinolin-4-amine (505 mg, 1.62 mmol), was added (3,5-dichlorophenyl) boronic acid (314 mg, 1.61 mmol), tetrakis(triphenylphosphine) palladium(0) (92 mg, 0.08 mmol) and Na$_2$CO$_3$ (351 mg, 3.28 mmol). The vial was sealed, then evacuated and back-filled with N$_2$ three times. 1,4-dioxane (9 mL) was added, followed by water (3 mL) and the reaction was heated to 100° C. in the microwave for 1 hour.

The reaction mixture was partitioned between EtOAc and sat. aq. NaHCO$_3$ (50 mL of each). The layers were separated and the aq. layer was extracted with EtOAc (2×25 mL). The combined organic layers were concentrated in vacuo and the residue was purified by column chromatography to give 8-(3,5-dichlorophenyl)-N,N-dimethyl-3-nitro-quinolin-4-amine. LCMS (method B): R$_t$=1.57 min, m/z=362 [M+H]$^+$.

To a stirred suspension of 8-(3,5-dichlorophenyl)-N,N-dimethyl-3-nitro-quinolin-4-amine (401 mg, 1.05 mmol) in THF (5 mL), EtOH (5 mL) and water (2.5 mL) was added iron (184 mg, 3.23 mmol) and NH$_4$Cl (168 mg, 3.13 mmol). The reaction was heated to 75° C. and left to stir for 45 min. The reaction was allowed to cool to rt, then partitioned between sat. aq. NaHCO$_3$ and EtOAc (25 mL of each). The mixture was filtered through Celite® (washing with EtOAc), and the layers of the filtrate were separated. The aq. layer was extracted with EtOAc (2×25 mL), and the combined organic layers were concentrated in vacuo. The residue was purified by column chromatography to give 8-(3,5-dichlorophenyl)-N4,N4-dimethyl-quinoline-3,4-diamine. LCMS (method B): R$_t$=1.48 min, m/z=363.2 [M+H]$^+$.

To a stirred solution of 4-nitrophenyl chloroformate (88 mg, 0.42 mmol) in THF (2 mL) at 0° C. under N$_2$-atmosphere was added a solution of 8-(3,5-dichlorophenyl)-N', N'-dimethyl-quinoline-3,4-diamine (148 mg, 0.42 mmol) in THF (2.5 mL) dropwise over 2 min. The reaction was left to stir at 0° C. for 30 min. The reaction solution was used directly in the next step.

To the reaction mixture was added 3,4-dihydro-2H-1,4-benzoxazine (71 mg, 0.51 mmol) and NEt$_3$ (132 µL, 0.94 mmol) in THF (0.5 mL). The reaction was stirred at rt overnight. The reaction mixture was partitioned between sat. aq. NaHCO$_3$ and CH$_2$Cl$_2$ (20 mL of each). The layers were separated and the aq. layer was extracted with CH$_2$Cl$_2$ (2×20 mL). The combined organic layers were passed through Celite®, and concentrated in vacuo. The crude product was purified by column chromatography to afford the title compound. LCMS (method B): R$_t$=1.62 min, m/z=493.0 [M+H]$^+$. $^1$H NMR (400 MHz, CDCl$_3$) δ [ppm]: 9.95 (s, 1H), 9.13 (s, 1H), 7.91 (quint, J=4.8 Hz, 1H), 7.55 (d, J=2 Hz, 1H), 7.53 (d, J=5.2 Hz, 1H), 7.43 (dd, J=1.6, 8.4 Hz, 1H), 7.38 (t, J=2 Hz, 1H), 7.17 (m, 1H), 7.01 (m, 2H), 4.36 (t, J=4.4 Hz, 2H), 4.02 (t, J=4.8 Hz, 2H), 2.9 (s, 6H).

Example 2.1

8-(3,5-dichlorophenyl)-N-(2,3-dihydro-1,4-benzoxazin-4-yl)-4-(dimethylamino)-1,7-naphthyridine-3-carboxamide

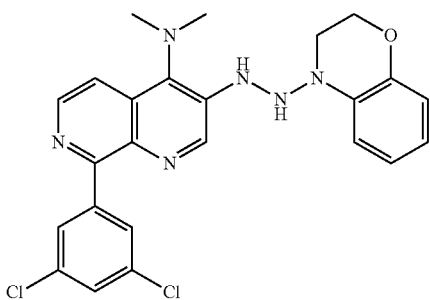 [SMILES: CN(C)c1c(NNN2CCOc3ccccc32)cnc2c(-c3cc(Cl)cc(Cl)c3)nccc12]

A mixture of 2-chloro-3-fluoro-pyridine-4-carboxylic acid (10.1 g, 56.3 mmol) and SOCl$_2$ (40 mL, 547 mmol) was heated at 80° C. for 2 hours. The reaction was allowed to cool to rt, and concentrated in vacuo. It was used directly in the next step: toluene (145 mL) and NEt$_3$ (9.8 mL, 70 mmol) were added followed by ethyl 3-(dimethylamino)-prop-2-enoate (10.2 g, 69.6 mmol). The reaction was heated at 80° C. and stirred for 45 min. The mixture was allowed to cool to rt, and filtered through Celite® (washing with EtOAc). The filtrate was concentrated in vacuo, and the residue was partitioned between EtOAc and aq. 2M HCl (150 mL of each). The layers were separated and the aq. layer was extracted with EtOAc (150 mL). The combined organic layers were dried over anhydrous MgSO$_4$, filtered, and concentrated in vacuo to give ethyl 2-(2-chloro-3-fluoro-pyridine-4-carbonyl)-3-(dimethylamino)-prop-2-enoate. LCMS (method B): R$_t$=0.86 min, m/z=301.00 [M+H]$^+$. To a solution of ethyl 2-(2-chloro-3-fluoro-pyridine-4-carbonyl)-3-(dimethylamino)-prop-2-enoate (188 mg, 0.59 mmol) in diethyl ether (2.4 mL) and EtOH (0.6 mL) was added 4-methoxybenzylamine (94 µL, 0.71 mmol). The reaction mixture was stirred at rt for 15 min, forming a precipitate. The reaction mixture was concentrated in vacuo to give a residue. The residue was triturated with cyclohexane to give ethyl 2-(2-chloro-3-fluoro-pyridine-4-carbonyl)-3-[(4-methoxyphenyl) methyl-amino]-prop-2-enoate. LCMS (method B): R$_t$=1.21 min, m/z=393 [M+H]$^+$.

To a solution of ethyl 2-(2-chloro-3-fluoro-pyridine-4-carbonyl)-3-[(4-methoxyphenyl) methyl-amino]-prop-2-enoate (214 mg, 518 µmol) in DMF (2.6 mL) was added K$_2$CO$_3$ (230 mg, 1.66 mmol) at rt. The reaction mixture was heated at 40° C. and left to stir for 2 hours. After cooling down to rt, the reaction mixture was poured into ice water (20 mL), forming a fine precipitate. The precipitate was dissolved in EtOAc (20 mL), and the layers were separated. The aq. layer was extracted with EtOAc (2×10 mL) and the combined organic layers were washed with water (20 mL), dried over anhydrous MgSO$_4$, filtered, and concentrated in vacuo to give ethyl 8-chloro-1-[(4-methoxyphenyl) methyl]-4-oxo-1,7-naphthyridine-3-carboxylate. LCMS (method B): R$_t$=1.01 min, m/z=373 [M+H]+. (3,5-Dichlorophenyl) boronic acid (110 mg, 0.56 mmol) was mixed with 1,1'-bis (diphenylphosphino) ferrocene-Pd(II)-CH$_2$Cl$_2$ complex and Na$_2$CO$_3$ (100 mg, 0.93 mmol). The vial was sealed, then evacuated and back-filled with N$_2$. Then, ethyl 8-chloro-1-[(4-methoxyphenyl) methyl]-4-oxo-1,7-naphthyridine-3-carboxylate (186 mg, 0.47 mmol) in 1,4-dioxane (2.4 mL, 28 mmol) was added, followed by water (0.8 mL) and the reaction mixture was heated at 100° C. in the microwave for 1 hour. The reaction mixture was filtered through Celite® (washing with EtOAc). The filtrate was washed with water (20 mL), dried over anhydrous MgSO$_4$, filtered, and concentrated in vacuo, then purified by column chromatography to give ethyl 8-(3,5-dichlorophenyl)-1-[(4-methoxyphenyl) methyl]-4-oxo-1,7-naphthyridine-3-carboxylate. LCMS (method B): R$_t$=1.30 min, m/z=483 [M+H]$^+$.

To a solution of ethyl 8-(3,5-dichlorophenyl)-1-[(4-methoxyphenyl)methyl]-4-oxo-1,7-naphthyridine-3-carboxylate (877 mg, 1.72 mmol) in CH$_2$Cl$_2$ (9 mL) was added anisole (1 mL, 1.74 mmol), followed by TFA (2.5 mL, 33 mmol). The resulting reaction mixture was stirred at rt for 1 hour, before being concentrated in vacuo. A mixture of sat. aq. NaHCO$_3$ and EtOAc (25 mL of each) was added to the crude product and the resulting suspension was stirred vigorously for 15 min. The precipitate was isolated by filtration (washing with water, then EtOAc), and dried in a vacuum oven to give ethyl 8-(3,5-dichlorophenyl)-4-hydroxy-1,7-naphthyridine-3-carboxylate. LCMS (method B): R$_t$=0.9 min, m/z=363 [M+H]$^+$.

To a stirring suspension of ethyl 8-(3,5-dichlorophenyl)-4-hydroxy-1,7-naphthyridine-3-carboxylate (61 mg, 0.13 mmol) in $CH_2Cl_2$ (2 mL) was added oxalyl chloride (17 µL, 192 µmol) followed by DMF (1 µL, 13 µmol) and the resulting mixture was left to stir at rt for 45 min. The reaction was quenched by the addition of a sat. aq. $NaHCO_3$ solution (5 mL), and the mixture was partitioned between water and $CH_2Cl_2$ (10 mL of each). The layers were separated and the aq. layer was extracted with $CH_2Cl_2$. The combined organic layers were dried over anhydrous $MgSO_4$, filtered, and concentrated in vacuo to give ethyl 4-chloro-8-(3,5-dichlorophenyl)-1,7-naphthyridine-3-carboxylate. LCMS (method B): $R_t$=1.6 min, m/z=381 $[M+H]^+$.

To a microwave vial was added ethyl 4-chloro-8-(3,5-dichlorophenyl)-1,7-naphthyridine-3-carboxylate (59 mg, 0.12 mmol) and dimethylamine HCl (17 mg, 0.2 mmol) in 1,4-dioxane (0.5 mL). The vial was sealed, DIPEA (73 µL, 0.41 mmol) was added and the reaction mixture was heated in the microwave at 100° C. for 30 min. The mixture was diluted with EtOAc (10 mL), washed with a sat. aq. $NaHCO_3$ solution (10 mL), and brine (10 mL), dried over anhydrous $MgSO_4$, filtered, and concentrated in vacuo to give ethyl 8-(3,5-dichlorophenyl)-4-(dimethylamino)-1,7-naphthyridine-3-carboxylate. LCMS (method B): $R_t$=1.5 min, m/z=390 $[M+H]^+$.

To a stirring solution of ethyl 8-(3,5-dichlorophenyl)-4-(dimethylamino)-1,7-naphthyridine-3-carboxylate (556 mg, 1.35 mmol) in THF (14 mL) was added a solution of lithium hydroxide (99 mg, 4.05 mmol) in water (4.5 mL) and MeOH (4.5 mL). The reaction mixture was heated at 40° C. for 2 hours and left to stir at rt overnight. Then, the mixture was concentrated in vacuo, and the residue was taken up in water (25 mL). The aq. layer was washed with EtOAc (25 mL, then adjusted to pH 4 by the addition of aq. 2 M HCl, forming a suspension. The precipitate was isolated by filtration, and dried in the vacuum oven overnight to give 8-(3,5-dichlorophenyl)-4-(dimethylamino)-1,7-naphthyridine-3-carboxylic acid as a solid. LCMS (method B): $R_t$=0.78 min, m/z=362 $[M+H]^+$.

At rt, under $N_2$-atmosphere, to a solution of 3,4-dihydro-2H-1,4-benzoxazine (504 mg, 3.73 mmol) in EtOH (4 mL), was added sodium nitrite (309 mg, 4.48 mmol) in water (1.6 mL). The mixture was then cooled to 0° C. Conc. HCl (0.39 mL, 4.7 mmol) was added dropwise to the reaction at 0° C. The reaction was then stirred at 0° C. for 15 min. A solution of sodium hydroxide (1.43 g, 35.87 mmol) in water (3.7 mL) was added at 0° C. followed by sodium hydrosulfite (2.40 g, 11.75 mmol). The resulting suspension was heated to 90° C. for 2 hours, then it was cooled to rt.

The reaction was diluted with water (30 mL) and then extracted with toluene (30 mL) and EtOAc (15 mL). The combined organic layers were separated and concentrated in vacuo. The residue was purified by column chromatography to afford 2,3-dihydro-1,4-benzoxazin-4-amine, as a pale yellow oil (354 mg). LCMS (method B) $R_t$=0.63 min, m/z=151 $[M+H]^+$. To a stirring suspension of 8-(3,5-dichlorophenyl)-4-(dimethylamino)-1,7-naphthyridine-3-carboxylic acid (158 mg, 0.41 mmol) in DMF (5 mL) was added $NEt_3$ (0.25 mL, 1.8 mmol), followed by 2,3-dihydro-1,4-benzoxazin-4-amine (79 mg, 0.501 mmol) and PyBOP (341 mg, 0.64 mmol). The reaction was left to stir at rt under $N_2$-atmosphere for 48 hours. The reaction was diluted with brine (25 mL) and extracted with $CH_2Cl_2$ (3×15 mL). The combined organic layers were separated and concentrated in vacuo. The residue was purified by column chromatography to afford the title compound. LCMS (method B) $R_t$=1.35 min, m/z=494 $[M+H]^+$. $^1$H NMR (400 MHz, DMSO-d6) δ[ppm]: 10.7 (s, 1H), 8.90 (s, 1H), 8.67 (d, J=4.4 Hz, 1H), 8.1 (m, 2H), 7.75 (t, J=2 Hz, 1H), 7.03 (dd, J=8, 1.2 Hz, 1H), 6.85 (td, J=2, 8 Hz, 1H), 6.69-6.78 (m, 2H), 4.38 (t, J=4.4 Hz, 2H), 3.68 (s, 2H), 3.13 (s, 6H).

The following compounds were prepared analogously by the methodology of Example 2.1:

| Ex. | Name | Structure |
|-----|------|-----------|
| 2.2 | 8-(3,5-dichlorophenyl)-N-(3,4-dihydro-2H-quinolin-1-yl)-4-(dimethylamino)-1,7-naphthyridine-3-carboxamide | |
| 2.3 | 8-(3,5-dichlorophenyl)-N-(2,3-dihydro-1,4-benzoxazin-4-yl)-4-morpholino-1,7-naphthyridine-3-carboxamide | |

-continued

| Ex. | Name | Structure |
|---|---|---|
| 2.4 | N-(2,3-dihydro-1,4-benzoxazin-4-yl)-4-morpholino-8-(2,3,5-trifluorophenyl)-1,7-naphthyridine-3-carboxamide | |
| 2.5 | N-(2,3-dihydro-1,4-benzoxazin-4-yl)-4-[methoxy(methyl)amino]-8-(2,3,5-trifluorophenyl)-1,7-naphthyridine-3-carboxamide | |
| 2.6 | 8-[3-chloro-5-(trifluoromethyl)phenyl]-N-(2,3-dihydro-1,4-benzoxazin-4-yl)-4-morpholino-1,7-naphthyridine-3-carboxamide | |
| 2.7 | N-(2,3-dihydro-1,4-benzoxazin-4-yl)-4-morpholino-8-(2,3-dichlorophenyl)-1,7-naphthyridine-3-carboxamide | |

-continued

| Ex. | Name | Structure |
|---|---|---|
| 2.8 | 8-(3,5-dichloro-4-fluoro-phenyl)-N-(2,3-dihydro-1,4-benzoxazin-4-yl)-4-morpholino-1,7-naphthyridine-3-carboxamide | |
| 2.9 | 8-(5-chloro-3-pyridyl)-N-(2,3-dihydro-1,4-benzoxazin-4-yl)-4-morpholino-1,7-naphthyridine-3-carboxamide | |
| 2.10 | N-(2,3-dihydro-1,4-benzoxazin-4-yl)-4-thiomorpholino-8-(2,3,5-trifluorophenyl)-1,7-naphthyridine-3-carboxamide | |
| 2.11 | N-(2,3-dihydro-1,4-benzoxazin-4-yl)-4-(1,1-dioxo-1,4-thiazinan-4-yl)-8-(2,3,5-trifluorophenyl)-1,7-naphthyridine-3-carboxamide | |

| Ex. | Name | Structure |
|---|---|---|
| 2.12 | N-(2,3-dihydro-1,4-benzoxazin-4-yl)-4-morpholino-8-(3,4,5-trifluorophenyl)-1,7-naphthyridine-3-carboxamide | 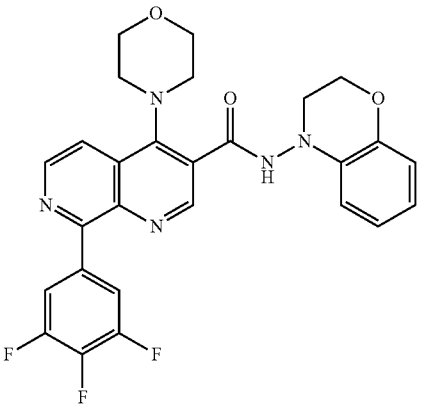 [SMILES: O=C(NN1CCOc2ccccc21)c1cnc2c(-c3cc(F)c(F)c(F)c3)nccc2c1N1CCOCC1] |

Example 3.1

8-(3,5-dichlorophenyl)-N-(2,3-dihydro-1,4-benzoxazin-4-yl)-4-(dimethylamino)-1,5-naphthyridine-3-carboxamide

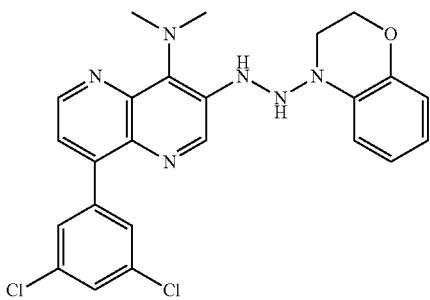 [SMILES: CN(C)c1c(NNN2CCOc3ccccc32)cnc2c(-c3cc(Cl)cc(Cl)c3)ccnc12]

Thionyl chloride (15 mL, 205 mmol) was added to 3,4-dichloropyridine-2-carboxylic acid (3.96 g, 20.6 mmol) and the reaction mixture was heated to 80° C. for 1 hour. The reaction was allowed to cool to rt, and concentrated in vacuo to give 3,4-dichloropyridine-2-carbonyl chloride which was used in the next step without further purification. To a stirring solution of 3,4-dichloropyridine-2-carbonyl chloride (20.6 mmol, 4.76 g) in toluene (50 mL) was added NEt$_3$ (3.5 mL, 25 mmol) followed by ethyl 3-(dimethylamino)prop-2-enoate (3.6 mL, 25 mmol). The reaction was stirred at rt overnight. The reaction was filtered through Celite® (washing with EtOAc). The filtrate was concentrated in vacuo, and the residue was partitioned between EtOAc and aq. 1M HCl (100 mL of each). The layers were separated, and the aq. layer was extracted with EtOAc (50 mL). The combined organic layers were concentrated in vacuo to give ethyl 2-(3,4-dichloropyridine-2-carbonyl)-3-(dimethylamino)prop-2-enoate. LCMS (method B) R$_t$=0.88 min, m/z=317.0 [M+H]$^+$.

To a stirring solution of ethyl 2-(3,4-dichloropyridine-2-carbonyl)-3-(dimethylamino) prop-2-enoate (5.58 g, 12.7 mmol) in diethyl ether (50 mL) and EtOH (12 mL) was added 4-methoxybenzylamine (1.9 mL, 14 mmol). The reaction was left to stir at rt for 2 hours. The reaction mixture was diluted with water (100 mL). The layers were separated and the aq. layer was extracted with CH$_2$Cl$_2$ (3×50 mL). The combined organic layers were dried over anhydrous Na$_2$SO$_4$, filtered and concentrated in vacuo to give ethyl 2-(3,4-dichloropyridine-2-carbonyl)-3-[(4-methoxyphenyl)methylamino]prop-2-enoate. Ethyl 2-(3,4-dichloropyridine-2-carbonyl)-3-[(4-methoxyphenyl)methylamino]prop-2-enoate (5.92 g, 9.40 mmol) was dissolved in DMF (24 mL). K$_2$CO$_3$ (4.0 g, 28.9 mmol) was added and the mixture was stirred at 90° C. for 6 hours. The reaction mixture was cooled down to rt, quenched by addition of water (250 mL) and diluted with CH$_2$Cl$_2$ (100 mL). The layers were separated and the aq. layer was extracted with CH$_2$Cl$_2$ (2×50 mL). The combined organic layers were filtered through Celite® and then washed with brine (100 mL), dried over anhydrous Na$_2$SO$_4$, filtered and reduced to dryness in vacuo. The crude material was purified by chromatography (0-6% MeOH in CH$_2$Cl$_2$) to give ethyl 8-hydroxy-1-[(4-methoxyphenyl) methyl]-4-oxo-1,5-naphthyridine-3-carboxylate.

Ethyl 8-hydroxy-1-[(4-methoxyphenyl) methyl]-4-oxo-1,5-naphthyridine-3-carboxylate (840 mg, 1.09 mmol) was dissolved in CH$_2$Cl$_2$ (11 mL) and DMF (0.05 mL). To this mixture, oxalyl chloride (0.48 mL, 5.5 mmol) was added and the mixture was heated to reflux for 3 hours. The reaction mixture was cooled down and was quenched by addition of sat. aq. NaHCO$_3$ solution (50 mL). The layers were separated and the aq. layer was extracted with CH$_2$Cl$_2$ (2×25 mL). The combined organic layers were reduced in vacuo to give ethyl 4,8-dichloro-1,5-naphthyridine-3-carboxylate.

Ethyl 4,8-dichloro-1,5-naphthyridine-3-carboxylate (950 mg, 2.21 mmol) was dissolved in THF (5 mL). To this solution, dimethylamine (2 mol/L) in THF (1.1 mL, 2.2 mmol, 2 M) was added dropwise and the mixture was stirred at rt for 30 min. The crude reaction mixture concentrated and the residue was purified by column chromatography (20-50% EtOAc in cyclohexane) to give ethyl 8-chloro-4-(dimethylamino)-1,5-naphthyridine-3-carboxylate. LCMS (method B) R$_t$=1.07 min, m/z=280.0 [M+H]$^+$.

Ethyl 8-chloro-4-(dimethylamino)-1,5-naphthyridine-3-carboxylate (315 mg, 0.93 mmol) was dissolved in 1,4-dioxane (3 mL) and water (1 mL). To this mixture, 1,1'-bis(diphenylphosphino) ferrocene] dichloropalladium(II) (40 mg, 0.048 mmol) was added (3,5-dichlorophenyl)boronic acid (215 mg, 1.13 mmol) and Na$_2$CO$_3$ (300 mg, 2.83 mmol). The mixture was submitted to microwave irradiation for 1 hour at 100° C. The crude reaction mixture was concentrated and the residue was purified by column chromatography (5-40% EtOAc in cyclohexane) to give ethyl 8-(3,5-dichlorophenyl)-4-(dimethylamino)-1,5-naphthyridine-3-carboxylate. LCMS (method B) $R_t$=1.56 min, m/z=390.0 [M+H]$^+$.

To a stirring solution of ethyl 8-(3,5-dichlorophenyl)-4-(dimethylamino)-1,5-naphthyridine-3-carboxylate (272 mg, 0.65 mmol) in 1,4-dioxane (2 mL) was added lithium hydroxide (32 mg, 1.34 mmol) in water (2 mL). The reaction was heated to 100° C. overnight. Then, the reaction mixture was cooled down to rt. The reaction mixture was quenched by addition of water (50 mL) and EtOAc (50 mL). pH was adjusted to pH=4 with 2M HCl. The layers were separated and the aq. layer was extracted with EtOAc (2×50 mL). The combined organic layers were washed with brine, dried over anhydrous Na$_2$SO$_4$, filtered and reduced in vacuo to give 8-(3,5-dichlorophenyl)-4-(dimethylamino)-1,5-naphthyridine-3-carboxylic acid. LCMS (method B) $R_t$=0.82 min, m/z=362.0 [M+H]$^+$.

A mixture of 2,3-dihydro-1,4-benzoxazin-4-amine (0.115 g, 0.73 mmol) and PyBOP (0.63 g, 1.21 mmol) was placed under N2-atmosphere and treated with a solution of 8-(3,5-dichlorophenyl)-4-(dimethylamino)-1,5-naphthyridine-3-carboxylic acid (0.24 g, 0.67 mmol) in THF (3 mL) followed by NEt$_3$ (0.42 mL, 3 mmol). The resulting reaction mixture was allowed to stir at rt over 48 hour. The reaction mixture was quenched by addition of sat. aq. NaHCO$_3$ solution (100 mL) and diluted with CH$_2$Cl$_2$ (50 mL). The layers were separated and the aq. layer was extracted with CH$_2$Cl$_2$ (2×25 mL). The combined organic layers were dried over anhydrous Na$_2$SO$_4$, filtered and then reduced in vacuo. The crude product was purified by column chromatography (10-50% EtOAc in cyclohexane) to afford the title compound. LCMS (method B) $R_t$=1.39 min, m/z=494.0 [M+H]$^+$. $^1$H NMR (400 MHz, CDCl$_3$) δ [ppm]: 9.62 (s, 1H), 9.24 (s, 1H), 8.96 (d, J=4.4 Hz, 1H), 7.59 (m, 3H), 7.47 (t, J=2 Hz, 1H), 6.79-6.95 (m, 4H), 4.50 (t, J=4.4 Hz, 2H), 3.74 (t, J=4.8 Hz, 2H), 3.35 (s, 6H).

The following compounds were prepared analogously by the methodology of Example 3.1:

| Ex. | Name | Structure |
|---|---|---|
| 3.2 | 8-(2,3-dichlorophenyl)-N-(2,3-dihydro-1,4-benzoxazin-4-yl)-4-(dimethylamino)-1,5-naphthyridine-3-carboxamide | |
| 3.3 | 8-(3,5-dichlorophenyl)-N-(2,3-dihydro-1,4-benzoxazin-4-yl)-4-morpholino-1,5-naphthyridine-3-carboxamide | |
| 3.4 | N-(2,3-dihydro-1,4-benzoxazin-4-yl)-4-morpholino-8-(2,3,5-trifluorophenyl)-1,5-naphthyridine-3-carboxamide | |

Example 4.1

5-(3,5-dichlorophenyl)-N-(2,3-dihydro-1,4-benzoxazin-4-yl)-1-(dimethylamino)naphthalene-2-carboxamide

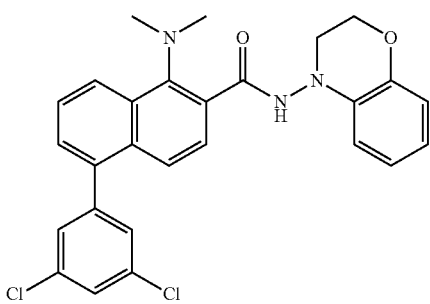 [SMILES: CN(C)c1c(C(=O)NN2CCOc3ccccc32)ccc2c(-c3cc(Cl)cc(Cl)c3)cccc12]

A round bottomed flask containing a mixture of 1-bromo-5-nitro-naphthalene (1.04 g, 4.13 mmol), (3,5-dichlorophenyl)boronic acid (0.7 g, 3.6 mmol), $Na_2CO_3$ (0.86 g, 8.10 mmol) and [1,1'-bis(diphenylphosphino) ferrocene] dichloropalladium(II) (156 mg, 0.20 mmol) was evacuated and re-filled with $N_2$ three times. The reaction mixture was treated with 1,4-dioxane (20 mL) and de-gassed water (6 mL), heated to 80° C. and was allowed to stir for 45 min. Then, the mixture was allowed to cool down to rt before being diluted with water (40 mL) and extracted with $CH_2Cl_2$ (3×30 mL). The combined organic layers were dried over anhydrous $MgSO_4$, filtered and concentrated in vacuo. The crude product was purified by column chromatography and the appropriate fractions were combined and concentrated in vacuo to give 1-(3,5-dichlorophenyl)-5-nitro-naphthalene. A mixture of 1-(3,5-dichlorophenyl)-5-nitro-naphthalene (928 mg, 2.77 mmol), $NH_4Cl$ (0.47 g, 8.72 mmol) and iron (0.47 g, 8.28 mmol) was placed under N2-atmosphere before being treated with THF (14 mL), EtOH (14 mL) and water (7 mL). The resulting mixture was heated to 75° C. and was allowed to stir for 45 min. Then, the mixture was allowed to cool down to rt before being filtered through Celite® (washed through with $CH_2Cl_2$). The filtrate was concentrated in vacuo, treated with sat. aq. $NaHCO_3$ (50 mL) and extracted with $CH_2Cl_2$ (3×25 mL). The combined organic layers were dried over anhydrous $MgSO_4$, filtered and concentrated in vacuo to give 5-(3,5-dichlorophenyl)naphthalen-1-amine. LCMS (method B) $R_t$=1.49 min, m/z=288.0 $[M+H]^+$.

A solution of 5-(3,5-dichlorophenyl)naphthalen-1-amine (881 mg, 2.60 mmol) in DMF (10 mL) was placed under $N_2$-atmosphere, cooled over an ice/salt bath to approximately −5° C. and treated with N-bromosuccinimide (474 mg, 2.58 mmol). The resulting reaction mixture was then treated with sat. aq. $NaHCO_3$-solution (50 mL) forming a pale brown precipitate. The mixture was extracted with $CH_2Cl_2$ (3×30 mL) and the combined organic layers were concentrated in vacuo. The residue was purified by column chromatography to afford 2-bromo-5-(3,5-dichlorophenyl)naphthalen-1-amine. LCMS (method B) $R_t$=1.64 min, m/z=365.8 $[M+H]^+$.

A suspension of 2-bromo-5-(3,5-dichlorophenyl)naphthalen-1-amine (0.73 g, 1.79 mmol) in formic acid (6 mL, 160 mmol) was placed under $N_2$-atmosphere and treated with formaldehyde solution (37 wt. % in water; 110 mmol, 8 mL). The resulting suspension was warmed to 100° C. and was allowed to stir for 1 hour. The reaction mixture was allowed to cool down to rt before being quenched by the careful addition of sat. aq. $NaHCO_3$ solution (60 mL). The mixture was then extracted with $CH_2Cl_2$ (3×20 mL) and the combined organic layers were dried over anhydrous $MgSO_4$, filtered and concentrated in vacuo. The residue was purified by column chromatography to afford 2-bromo-5-(3,5-dichlorophenyl)-N,N-dimethyl-naphthalen-1-amine. LCMS (method B) $R_t$=1.93 min, m/z=393.8 $[M+H]^+$.

A solution of 2-bromo-5-(3,5-dichlorophenyl)-N,N-dimethyl-naphthalen-1-amine (532 mg, 1.28 mmol) in 1,4-dioxane (10 mL) in a pressure-vessel was treated with MeOH (10 mL), $NEt_3$ (0.54 mL, 3.9 mmol) and [1,1'-bis(diphenylphosphino) ferrocene]dichloropalladium(II) (103 mg, 134 μmol) before being stirred at 100° C. under a CO-atmosphere (50 psi) for 16 hours. Then, the reaction mixture was allowed to cool down to rt, filtered and concentrated in vacuo. The residue was purified by column chromatography to afford methyl 5-(3,5-dichlorophenyl)-1-(dimethylamino)naphthalene-2-carboxylate. LCMS (method B) $R_t$=1.75 min, m/z=374.0 $[M+H]^+$.

A solution of methyl 5-(3,5-dichlorophenyl)-1-(dimethylamino)naphthalene-2-carboxylate (421 mg, 1.01 mmol) in 1,4-dioxane (15 mL), water (5 mL) and lithium hydroxide (512 mg, 20.3 mmol) was stirred at 80° C. for 48 hours. The reaction mixture was allowed to cool down to rt before being treated with 2 M HCl (17.5 mL—making the mixture weakly basic). The aq. layer was extracted with $CH_2Cl_2$ (3×25 mL). The combined organic layers were dried over anhydrous $MgSO_4$, filtered and concentrated in vacuo, yielding 5-(3,5-dichlorophenyl)-1-(dimethylamino)naphthalene-2-carboxylic acid. LCMS (method B) $R_t$=1.10 min, m/z=358.0 $[M-H]^-$.

A mixture of 2,3-dihydro-1,4-benzoxazin-4-amine (0.082 g, 519 μmol) and PyBOP (452 mg, 869 μmol) was placed under $N_2$-atmosphere and treated with a solution of 5-(3,5-dichlorophenyl)-1-(dimethylamino)naphthalene-2-carboxylic acid (192 mg, 426 μmol) in THF (3 mL) followed by $NEt_3$ (0.30 mL, 2.2 mmol). The resulting reaction mixture was allowed to stir at rt overnight. The reaction mixture was diluted with water (15 mL) and extracted with $CH_2Cl_2$ (3×15 mL). The combined organic layers were dried over anhydrous $MgSO_4$, filtered and concentrated in vacuo. The crude product was purified by column chromatography to give the title compound. LCMS (method B) $R_t$=1.61 min, m/z=492.2 $[M+H]^+$. $^1H$ NMR (400 MHz, DMSO) δ [ppm]: 10.5 (s, 1H), 8.36 (d, J=8.6 Hz, 1H), 7.75 (t, J=2 Hz, 1H), 7.64-7.68 (m, 1H), 7.60-7.48 (m, 5H), 6.98 (dd, J=8, 1.4 Hz, 1H), 6.86-6.80 (m, 1H), 6.77 (dd, J=8, 1.6 Hz, 1H), 6.73-6.67 (m, 1H), 4.38 (t, J=4.3 Hz, 2H), 3.70-3.63 (m, 2H), 2.99 (s, 6H).

Example 5.1

8-(3,5-dichlorophenyl)-N-(2,3-dihydro-4H-benzo[b][1,4]oxazin-4-yl)-4-(dimethylamino)quinoline-3-carboxamide

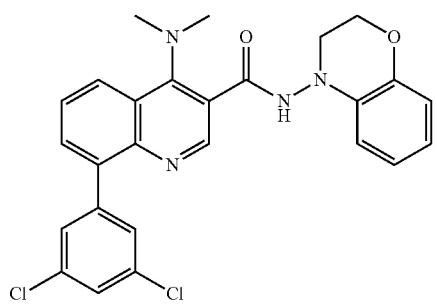 [SMILES: CN(C)c1c(C(=O)NN2CCOc3ccccc32)cnc2c(-c3cc(Cl)cc(Cl)c3)cccc12]

A solution of 2-bromoaniline (7.96 g, 44.9 mmol) and diethyl 2-(ethoxymethylene)propanedioate (11 mL, 53.8 mmol) was heated to 125° C. for 1 hour. LCMS (method B) $R_t$=1.28 min, m/z=342.0 [M+H]$^+$. Diphenylether (100 mL) was added, and the reaction was heated to 250° C. and left to stir for 48 hours. The reaction was allowed to cool to rt, forming a precipitate. Diethyl ether (100 mL) was added, the precipitate was isolated by filtration (washing with diethyl ether), and dried in vacuo to give ethyl 8-bromo-4-hydroxy-quinoline-3-carboxylate. LCMS (method B) $R_t$=0.69, m/z=296.0 [M+H]$^+$.

A suspension of ethyl 8-bromo-4-hydroxy-quinoline-3-carboxylate (2.0 g, 6.42 mmol) in $CH_2Cl_2$ (20 mL) was placed under $N_2$-atmosphere and treated with oxalyl chloride (0.60 mL, 6.8 mmol) and DMF (0.02 mL). The reaction mixture was warmed to 50° C. and was allowed to stir for 45 min. The reaction mixture was allowed to cool to rt then it was concentrated in vacuo to give ethyl 8-bromo-4-chloro-quinoline-3-carboxylate. LCMS (method B) $R_t$=1.28 min, m/z=314.0 [M+H]$^+$.

Dimethylamine (2 M) in THF (13 mL) was added to ethyl 8-bromo-4-chloro-quinoline-3-carboxylate (2.13 g, 6.42 mmol) under $N_2$-atmosphere. The resulting mixture was warmed to 60° C. and was allowed to stir for 15 min. The reaction mixture was concentrated in vacuo before being treated with sat. aq. $NaHCO_3$ (40 mL) and extracted with EtOAc (3×30 mL). The combined organic layers were dried over anhydrous $MgSO_4$ and concentrated in vacuo. The residue was subjected to column chromatography (20-60% EtOAc in cyclohexane) to give ethyl 8-bromo-4-(dimethylamino)quinoline-3-carboxylate. LCMS (method B) $R_t$=1.23 min, m/z=323.0 [M+H]$^+$.

Under $N_2$-atmosphere, a reaction mixture of ethyl 8-bromo-4-(dimethylamino)quinoline-3-carboxylate (2.22 g, 6.54 mmol), (3,5-dichlorophenyl)boronic acid (1.26 g, 6.61 mmol), bis(diphenylphosphino) ferrocene-Pd(II)-$CH_2Cl_2$ complex (0.27 g, 0.33 mmol) and $Na_2CO_3$ (1.43 g, 13.5 mmol) in 1,4-dioxane (20 mL) and water (10 mL) was heated to 80° C. and was allowed to stir for 30 min. The reaction mixture was allowed to cool down to rt before being diluted with water (70 mL) and extracted with $CH_2Cl_2$ (3×50 mL). The combined organic layers were filtered and concentrated in vacuo. The residue was purified by column chromatography (0-30% EtOAc in cyclohexane) to give ethyl 8-(3,5-dichlorophenyl)-4-(dimethylamino)quinoline-3-carboxylate. LCMS (method B) $R_t$=1.67 min, m/z=389.0 [M+H]$^+$.

A solution of ethyl 8-(3,5-dichlorophenyl)-4-(dimethylamino)quinoline-3-carboxylate (2.82 g, 6.17 mmol) in 1,4-dioxane (20 mL) was treated with water (10 mL) and lithium hydroxide (0.44 g, 18.5 mmol). The resulting reaction mixture was warmed to 100° C. and stirred overnight. The reaction mixture was allowed to cool down to rt, then it was acidified to pH 2 with 2 M HCl and was extracted with EtOAc (3×30 mL). The aq. phase was basified to pH 6 and was extracted with 10% MeOH in $CH_2Cl_2$ (3×30 mL). The organic phases were combined and concentrated in vacuo to give 8-(3,5-dichlorophenyl)-4-(dimethylamino) quinoline-3-carboxylic acid. LCMS (method B) $R_t$=0.94 min, m/z=361.0 [M+H]$^+$.

To a stirring suspension of 8-(3,5-dichlorophenyl)-4-(dimethylamino) quinoline-3-carboxylic acid (160 mg, 0.35 mmol) in DMF (3.5 mL) was added $NEt_3$ (200 μL, 1.42 mmol), followed by 2,3-dihydro-1,4-benzoxazin-4-amine (67 mg, 0.42 mmol) and PyBOP (282 mg, 0.53 mmol). The reaction was left to stir at rt under $N_2$-atmosphere overnight. The reaction was diluted with brine and extracted twice with $CH_2Cl_2$. The crude product was purified by column chromatography eluting with cyclohexane: EtOAc (0-40% EtOAc) to give the title compound. LCMS (method B) $R_t$=1.47 min, m/z=493.0 [M+H]$^+$. $^1$H NMR (400 MHz, DMSO) S [ppm]: 9.04 (s, 1H), 8.4 (s, 1H), 8.20 (dd, J=1.6 Hz, J=8.8 Hz, 1H), 7.69-7.71 (m, 1H), 7.58-7.62 (m, 1H), 7.52 (d, J=2 Hz, 2H), 7.4 (t, J=1.6 Hz, 1H), 6.79-6.97 (m, 4H), 4.49 (t, J=4.4 Hz, 2H), 3.74 (t, J=4.4 Hz, 2H), 3.19 (s, 6H).

The following compounds were prepared analogously by the methodology of Example 5.1:

| Ex. | Name | Structure |
|---|---|---|
| 5.2 | 8-(2,3-dichlorophenyl)-N-(2,3-dihydro-1,4-benzoxazin-4-yl)-4-morpholino-quinoline-3-carboxamide | 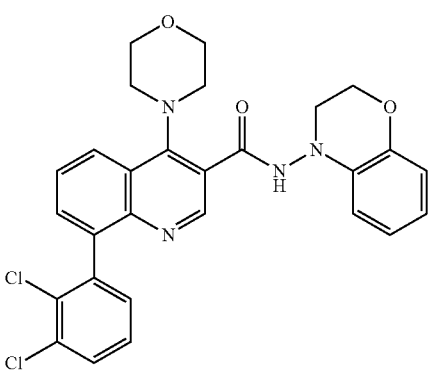 [SMILES: O=C(NN1CCOc2ccccc21)c1cnc2c(-c3cccc(Cl)c3Cl)cccc2c1N1CCOCC1] |

-continued

| Ex. | Name | Structure |
|---|---|---|
| 5.3 | 8-(3,5-dichlorophenyl)-N-(2,3-dihydro-1,4-benzoxazin-4-yl)-4-morpholino-quinoline-3-carboxamide | |
| 5.4 | N-(2,3-dihydro-1,4-benzoxazin-4-yl)-7-fluoro-4-morpholino-8-(2,3,5-trifluorophenyl)quinoline-3-carboxamide | |
| 5.5 | 8-(5-chloro-3-pyridyl)-N-(2,3-dihydro-1,4-benzoxazin-4-yl)-4-morpholino-quinoline-3-carboxamide | |
| 5.6 | N-(2,3-dihydro-1,4-benzoxazin-4-yl)-4-morpholino-8-(2,3,5-trifluorophenyl)quinoline-3-carboxamide | |

| Ex. | Name | Structure |
|---|---|---|
| 5.7 | 8-(3,5-dichlorophenyl)-N-(2,3-dihydro-1,4-benzoxazin-4-yl)-7-fluoro-4-morpholino-quinoline-3-carboxamide | |
| 5.8 | 8-(3,5-difluorophenyl)-N-(2,3-dihydro-1,4-benzoxazin-4-yl)-7-fluoro-4-morpholino-quinoline-3-carboxamide | |
| 5.9 | N-(2,3-dihydro-1,4-benzoxazin-4-yl)-4-morpholino-8-pyrimidin-5-yl-quinoline-3-carboxamide | |
| 5.10 | N-(2,3-dihydro-1,4-benzoxazin-4-yl)-4-thiomorpholino-8-(2,3,5-trifluorophenyl)quinoline-3-carboxamide | |

-continued

| Ex. | Name | Structure |
|---|---|---|
| 5.11 | 8-[2-chloro-6-(trifluoromethyl)-4-pyridyl]-N-(2,3-dihydro-1,4-benzoxazin-4-yl)-4-morpholino-quinoline-3-carboxamide | |
| 5.12 | 8-(2,6-dichloro-4-pyridyl)-N-(2,3-dihydro-1,4-benzoxazin-4-yl)-4-morpholino-quinoline-3-carboxamide | |
| 5.13 | 8-(3,5-dichloro-2-fluoro-phenyl)-N-(2,3-dihydro-1,4-benzoxazin-4-yl)-4-morpholino-quinoline-3-carboxamide | |
| 5.14 | 8-(5-chloro-2-fluoro-3-pyridyl)-N-(2,3-dihydro-1,4-benzoxazin-4-yl)-4-morpholino-quinoline-3-carboxamide | |

| Ex. | Name | Structure |
|---|---|---|
| 5.15 | N-(2,3-dihydro-1,4-benzoxazin-4-yl)-4-(1,1-dioxo-1,4-thiazinan-4-yl)-8-(2,3,5-trifluorophenyl)quinoline-3-carboxamide | |
| 5.16 | N-(2,3-dihydro-1,4-benzoxazin-4-yl)-4-morpholino-8-(2,4,5-trifluorophenyl)quinoline-3-carboxamide | |
| 5.17 | 8-(6-chloropyrazin-2-yl)-N-(2,3-dihydro-1,4-benzoxazin-4-yl)-4-morpholino-quinoline-3-carboxamide | |
| 5.18 | 8-(4,5-dichloro-3-pyridyl)-N-(2,3-dihydro-1,4-benzoxazin-4-yl)-4-morpholino-quinoline-3-carboxamide | |

-continued

| Ex. | Name | Structure |
|---|---|---|
| 5.19 | 8-(5-chloro-2,3-difluoro-phenyl)-N-(2,3-dihydro-1,4-benzoxazin-4-yl)-4-morpholino-quinoline-3-carboxamide | |
| 5.20 | N-(2,3-dihydro-1,4-benzoxazin-4-yl)-4-morpholino-8-(2,3,4,5-tetrafluorophenyl)quinoline-3-carboxamide | |
| 5.21 | 8-(4-chloro-5-fluoro-3-pyridyl)-N-(2,3-dihydro-1,4-benzoxazin-4-yl)-4-morpholino-quinoline-3-carboxamide | |
| 5.22 | 8-[4-chloro-6-(trifluoromethyl)-2-pyridyl]-N-(2,3-dihydro-1,4-benzoxazin-4-yl)-4-morpholino-quinoline-3-carboxamide | |

| Ex. | Name | Structure |
|---|---|---|
| 5.23 | 8-(3,5-dichloro-2,4-difluoro-phenyl)-N-(2,3-dihydro-1,4-benzoxazin-4-yl)-4-morpholino-quinoline-3-carboxamide | |
| 5.24 | N-indolin-1-yl-4-morpholino-8-(2,3,5-trifluorophenyl)quinoline-3-carboxamide | |
| 5.25 | 8-(4,6-dichloro-2-pyridyl)-N-(2,3-dihydro-1,4-benzoxazin-4-yl)-4-morpholino-quinoline-3-carboxamide | |
| 5.26 | N-(2,3-dihydro-1,4-benzoxazin-4-yl)-8-(6-fluoropyrazin-2-yl)-4-morpholino-quinoline-3-carboxamide | |

-continued

| Ex. | Name | Structure |
|---|---|---|
| 5.27 | 8-[2-chloro-6-(trifluoromethyl)pyrimidin-4-yl]-N-(2,3-dihydro-1,4-benzoxazin-4-yl)-4-morpholino-quinoline-3-carboxamide | |
| 5.28 | 8-(6-chloro-5-fluoro-2-pyridyl)-N-(2,3-dihydro-1,4-benzoxazin-4-yl)-4-morpholino-quinoline-3-carboxamide | |
| 5.29 | 8-(6-chloro-3-fluoro-2-pyridyl)-N-(2,3-dihydro-1,4-benzoxazin-4-yl)-4-morpholino-quinoline-3-carboxamide | |
| 5.30 | N-(2,3-dihydro-1,4-benzoxazin-4-yl)-8-(6-ethoxypyrazin-2-yl)-4-morpholino-quinoline-3-carboxamide | |

| Ex. | Name | Structure |
|---|---|---|
| 5.31 | 4-(azetidin-1-yl)-N-(2,3-dihydro-1,4-benzoxazin-4-yl)-8-(2,3,5-trifluorophenyl)quinoline-3-carboxamide | |
| 5.32 | N-(2,3-dihydro-1,4-benzoxazin-4-yl)-4-pyrrolidin-1-yl-8-(2,3,5-trifluorophenyl)quinoline-3-carboxamide | |
| 5.33 | N-(2,3-dihydro-1,4-benzoxazin-4-yl)-4-[2-methoxyethyl(methyl)amino]-8-(2,3,5-trifluorophenyl)quinoline-3-carboxamide | |
| 5.34 | 4-[bis(2-methoxyethyl)amino]-N-(2,3-dihydro-1,4-benzoxazin-4-yl)-8-(2,3,5-trifluorophenyl)quinoline-3-carboxamide | |

-continued

| Ex. | Name | Structure |
|---|---|---|
| 5.35 | 7-cyano-8-(3,5-dichlorophenyl)-N-(2,3-dihydro-1,4-benzoxazin-4-yl)-4-morpholino-quinoline-3-carboxamide | |
| 5.36 | 4-cyclopropyl-N-(2,3-dihydro-1,4-benzoxazin-4-yl)-8-(2,3,5-trifluorophenyl)quinoline-3-carboxamide | |
| 5.37 | N-(2,3-dihydro-1,4-benzoxazin-4-yl)-4-(3-fluoroazetidin-1-yl)-8-(2,3,5-trifluorophenyl)quinoline-3-carboxamide | |
| 5.38 | N-(2,3-dihydro-1,4-benzoxazin-4-yl)-4-(3-hydroxyazetidin-1-yl)-8-(2,3,5-trifluorophenyl)quinoline-3-carboxamide | |

-continued

| Ex. | Name | Structure |
|---|---|---|
| 5.39 | N-(2,3-dihydro-1,4-benzoxazin-4-yl)-4-oxazolidin-3-yl-8-(2,3,5-trifluorophenyl)quinoline-3-carboxamide | |
| 5.40 | N-(2,3-dihydro-1,4-benzoxazin-4-yl)-4-(2-oxa-6-azaspiro[3.3]heptan-6-yl)-8-(2,3,5-trifluorophenyl)quinoline-3-carboxamide | |
| 5.41 | N-(2,3-dihydro-1,4-benzoxazin-4-yl)-7-fluoro-4-morpholino-8-(3,4,5-trifluorophenyl)quinoline-3-carboxamide | |
| 5.42 | N-(2,3-dihydro-1,4-benzoxazin-4-yl)-4-isoxazolidin-2-yl-8-(2,3,5-trifluorophenyl)quinoline-3-carboxamide | |

-continued

| Ex. | Name | Structure |
|---|---|---|
| 5.43 | N-(2,3-dihydro-1,4-benzoxazin-4-yl)-4-morpholino-8-[1-(2,2,2-trifluoroethyl)pyrazol-4-yl]quinoline-3-carboxamide | |
| 5.44 | 8-(2,6-dichloropyrimidin-4-yl)-N-(2,3-dihydro-1,4-benzoxazin-4-yl)-4-morpholino-quinoline-3-carboxamide | |
| 5.45 | N-(2,3-dihydro-1,4-benzoxazin-4-yl)-4-tetrahydropyran-4-yl-8-(2,3,5-trifluorophenyl)quinoline-3-carboxamide | |
| 5.46 | 4-[acetyl(methyl)amino]-N-(2,3-dihydro-1,4-benzoxazin-4-yl)-8-(2,3,5-trifluorophenyl)quinoline-3-carboxamide | |

-continued

| Ex. | Name | Structure |
|---|---|---|
| 5.47 | 8-(3,5-dichloro-2-fluoro-phenyl)-N-(2,3-dihydro-1,4-benzoxazin-4-yl)-7-fluoro-4-morpholino-quinoline-3-carboxamide | |
| 5.48 | 8-(3,5-dichloro-2,4-difluoro-phenyl)-N-(2,3-dihydro-1,4-benzoxazin-4-yl)-7-fluoro-4-morpholino-quinoline-3-carboxamide | |
| 5.49 | N-(2,3-dihydro-1,4-benzoxazin-4-yl)-4-morpholino-8-(2,3,6-trifluoro-4-pyridyl)quinoline-3-carboxamide | |
| 5.50 | N-(2,3-dihydro-1,4-benzoxazin-4-yl)-8-(4-fluoro-2,6-dimethyl-phenyl)-4-morpholino-quinoline-3-carboxamide | |

-continued

| Ex. | Name | Structure |
|---|---|---|
| 5.51 | N-(2,3-dihydro-1,4-benzoxazin-4-yl)-8-[4-ethylsulfanyl-6-(trifluoromethyl)pyrimidin-2-yl]-4-morpholino-quinoline-3-carboxamide | |
| 5.52 | 8-[4-benzyloxy-6-(trifluoromethyl)pyrimidin-2-yl]-N-(2,3-dihydro-1,4-benzoxazin-4-yl)-4-morpholino-quinoline-3-carboxamide | |
| 5.53 | [3-(2,3-dihydro-1,4-benzoxazin-4-ylcarbamoyl)-8-(2,3,5-trifluorophenyl)-4-quinolyl]boronic acid | |

| Ex. | Name | Structure |
|---|---|---|
| 5.54 | 8-(3,5-dichloro-2,4-difluoro-phenyl)-7-fluoro-N-indolin-1-yl-4-morpholino-quinoline-3-carboxamide | |
| 5.55 | N-(2,3-dihydro-1,4-benzoxazin-4-yl)-4-(1-methoxyethyl)-8-(2,3,5-trifluorophenyl)quinoline-3-carboxamide | |
| 5.56 | 8-(3,5-dichloro-2,4-difluoro-phenyl)-N-(2,3-dihydro-1,4-benzoxazin-4-yl)-4-(dimethylamino)-7-fluoro-quinoline-3-carboxamide | |
| 5.57 | N-(2,3-dihydro-1,4-benzoxazin-4-yl)-4-morpholino-8-(2,3,5,6-tetrafluorophenyl)quinoline-3-carboxamide | |

-continued

| Ex. | Name | Structure |
|---|---|---|
| 5.58 | 4-cyclopropyl-8-(3,5-dichloro-2,4-difluoro-phenyl)-N-(2,3-dihydro-1,4-benzoxazin-4-yl)-7-fluoro-quinoline-3-carboxamide | |
| 5.59 | 8-[3,5-bis(trifluoromethyl)phenyl]-N-(2,3-dihydro-1,4-benzoxazin-4-yl)-7-fluoro-4-morpholino-quinoline-3-carboxamide | |
| 5.60 | 8-(5-chloro-2,3-difluoro-phenyl)-N-(2,3-dihydro-1,4-benzoxazin-4-yl)-7-fluoro-4-morpholino-quinoline-3-carboxamide | |
| 5.61 | 8-[3-chloro-5-(trifluoromethyl)phenyl]-N-(2,3-dihydro-1,4-benzoxazin-4-yl)-7-fluoro-4-morpholino-quinoline-3-carboxamide | |

-continued

| Ex. | Name | Structure |
|---|---|---|
| 5.62 | 8-(3,5-dichloro-2,4-difluoro-phenyl)-N-(2,3-dihydro-1,4-benzoxazin-4-yl)-7-fluoro-4-[methoxy(methyl)amino]quinoline-3-carboxamide | |
| 5.63 | N-(2,3-dihydro-1,4-benzoxazin-4-yl)-4-morpholino-8-[4-(trifluoromethyl)phenyl]quinoline-3-carboxamide | |
| 5.64 | 8-[3,5-dichloro-4-(trifluoromethyl)phenyl]-N-(2,3-dihydro-1,4-benzoxazin-4-yl)-4-morpholino-quinoline-3-carboxamide | |
| 5.65 | 8-(3-chloro-2,5,6-trifluoro-phenyl)-N-(2,3-dihydro-1,4-benzoxazin-4-yl)-7-fluoro-4-morpholino-quinoline-3-carboxamide | |

| Ex. | Name | Structure |
|---|---|---|
| 5.66 | 8-(3-chloro-5-cyano-phenyl)-N-(2,3-dihydro-1,4-benzoxazin-4-yl)-4-morpholino-quinoline-3-carboxamide | |
| 5.67 | 8-(3-cyano-2,5-difluoro-phenyl)-N-(2,3-dihydro-1,4-benzoxazin-4-yl)-4-morpholino-quinoline-3-carboxamide | |
| 5.68 | N-(2,3-dihydro-1,4-benzoxazin-4-yl)-4-(2,2,2-trifluoro-1-methyl-ethyl)-8-(2,3,5-trifluorophenyl)quinoline-3-carboxamide | |

Example 6.1

4-(3,5-dichlorophenyl)-N-(2,3-dihydro-1,4-benzo-xazin-4-yl)-8-morpholino-pyrido[3,2-d]pyrimidine-7-carboxamide

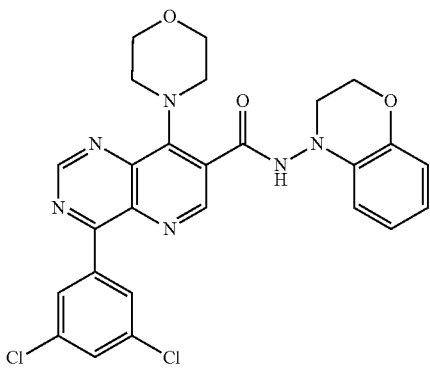 [SMILES: O=C(NN1CCOc2ccccc21)c1cnc2c(-c3cc(Cl)cc(Cl)c3)ncnc2c1N1CCOCC1]

To a suspension of ethyl 6-hydroxypyrimidine-4-carboxylate (5.03 g, 28.74 mmol) in DMF (25 mL) under N2-atmosphere was added 1,3-dichloro-5,5-dimethlyhydantoin (3.48 g, 17.3 mmol). The mixture was stirred overnight at rt. The reaction was partitioned between water (200 mL) and EtOAc (100 mL), then it was extracted with EtOAc (2×75 mL). The combined organic layers were dried over anhydrous $Na_2SO_4$, filtered and concentrated in vacuo to give ethyl 5-chloro-6-hydroxy-pyrimidine-4-carboxylate. LCMS (method A) $R_t$=0.54 min, m/z=203.0 $[M+H]^+$.

To a suspension of ethyl 5-chloro-6-hydroxy-pyrimidine-4-carboxylate (8.74 g, 28.1 mmol) in $CH_3CN$ (100 mL) at rt under $N_2$-atmosphere was added DIPEA (6.4 mL, 36 mmol) then phosphorous oxybromide (9.44 g, 31.28 mmol) was added. The resulting mixture was stirred at rt. The reaction was diluted with $CH_2Cl_2$ (100 mL) and slowly poured into water (100 mL). The mixture was then extracted with $CH_2Cl_2$ (3×100 mL). The combined organic layers were dried over anhydrous $Na_2SO_4$, filtered and concentrated in vacuo. The oil was purified by column chromatography (0-10% EtOAc in cyclohexane) to give ethyl 6-bromo-5-chloro-pyrimidine-4-carboxylate. LCMS (method A) $R_t$=0.98 min, m/z=265.0 $[M+H]^+$.

To a stirred solution of ethyl 6-bromo-5-chloro-pyrimidine-4-carboxylate (4.31 g, 14.9 mmol) and (3,5-dichlorophenyl) boronic acid (2.71 g, 14.20 mmol) in 1,4-dioxane (55 mL) under $N_2$-atmosphere was added $K_2CO_3$ (8.69 g, 62.9 mmol) followed by tetrakis (triphenylphosphine) palladium (0) (732 mg, 0.63 mmol). The reaction was degassed and put under $N_2$-atmosphere, then heated to 90° C. during 16 hours. The mixture was diluted with EtOAc (50 mL) and passed through Celite®. The combined organic filtrates were concentrated in vacuo. The residue was purified by column chromatography (0-20% EtOAc in cyclohexane) to give ethyl 5-chloro-6-(3,5-dichlorophenyl)pyrimidine-4-carboxylate. LCMS (method B) $R_t$=1.43 min, m/z=331.0 $[M+H]^+$.

To a mixture of ethyl 5-chloro-6-(3,5-dichlorophenyl) pyrimidine-4-carboxylate (2.90 g, 8.75 mmol) in THF (85 mL) and water (30 mL) at rt under N2-atmosphere was added lithium hydroxide (624 mg, 25.6 mmol). The resulting mixture was heated to 50° C. for 1 hour. The reaction was cooled to rt and then concentrated under reduced pressure to remove THF. The resulting solution was diluted with water (50 mL) then acidified with 2M HCl until the pH=1, causing a solid to precipitate. The precipitate was filtered off and washed with water (25 mL). The precipitate was then dried in vacuo at 50° C. to give 5-chloro-6-(3,5-dichlorophenyl) pyrimidine-4-carboxylic acid. LCMS (method B) $R_t$=0.72 min, m/z=303.0 [M+H]+.

A suspension of 5-chloro-6-(3,5-dichlorophenyl)pyrimidine-4-carboxylic acid (2.49 g, 7.82 mmol) in thionyl chloride (30 mL, 411 mmol) was heated to 80° C. under $N_2$-atmosphere. DMF (0.5 mL, 6 mmol) was added and the reaction fully dissolved. The reaction was then concentrated in vacuo, taken up in toluene (20 mL) and azotroped (3 times) to give 5-chloro-6-(3,5-dichlorophenyl)pyrimidine-4-carbonyl chloride, which was used without further purification.

To a solution of 5-chloro-6-(3,5-dichlorophenyl)pyrimidine-4-carbonyl chloride (2.65 g, 7.82 mmol) in toluene (20 mL) at rt under $N_2$-atmosphere was added $NEt_3$ (2 mL, 14 mmol) followed by ethyl 3-(dimethylamino)prop-2-enoate (1.4 mL, 9.7 mmol). The reaction was stirred at rt under $N_2$-atmosphere. The reaction was diluted with EtOAc (125 mL) and filtered through Celite®. The Celite® was washed through with EtOAc (125 mL). The combined organic filtrates were concentrated in vacuo. The residue was taken up in EtOAc (250 mL) and 2M HCl (aq, 100 mL). The aq. layer was extracted with EtOAc (125 mL). The combined organic layers were dried over anhydrous $Na_2SO_4$, filtered and concentrated in vacuo to give ethyl 2-[5-chloro-6-(3,5-dichlorophenyl)pyrimidine-4-carbonyl]-3-(dimethylamino) prop-2-enoate. LCMS (method B) $R_t$=1.24 min, m/z=428.0 $[M+H]^+$.

4-Methoxybenzylamine (1.20 mL, 9.09 mmol) was added to a solution of ethyl 2-[5-chloro-6-(3,5-dichlorophenyl) pyrimidine-4-carbonyl]-3-(dimethylamino) prop-2-enoate (3.59 g, 6.29 mmol) in diethyl ether (25 mL) and EtOH (6 mL) at rt under $N_2$-atmosphere for 1 hour. The reaction was diluted with water (150 mL) and extracted with $CH_2Cl_2$ (4×75 mL). The combined organic layers were washed with brine, dried over anhydrous $Na_2SO_4$, filtered and concentrated in vacuo to give ethyl 2-[5-chloro-6-(3,5-dichlorophenyl)pyrimidine-4-carbonyl]-3-[(4-methoxyphenyl) methylamino] prop-2-enoate. The material was taken on without any further purification. LCMS (method B) $R_t$=1.49 min, m/z=520.0 $[M+H]^+$.

To a solution of ethyl 2-[5-chloro-6-(3,5-dichlorophenyl) pyrimidine-4-carbonyl]-3-[(4-methoxyphenyl) methylamino] prop-2-enoate (4.4 g, 5.66 mmol) in DMF (15 mL) at rt under N2-atmosphere was added $K_2CO_3$ (2.37 g, 17.1 mmol). The resulting mixture was heated to 90° C. for 24 hours. The reaction was cooled to rt, then poured into water (300 mL) and extracted with $CH_2Cl_2$ (3×100 mL). The combined organic layers were washed with brine (200 mL) and dried over anhydrous $Na_2SO_4$, filtered and concentrated in vacuo. The residue was purified by column chromatography (0-5% MeOH in $CH_2Cl_2$) to give ethyl 4-(3,5-dichlorophenyl)-5-[(4-methoxyphenyl)methyl]-8-oxo-pyrido[3,2-d]pyrimidine-7-carboxylate. LCMS (method B) $R_t$=1.17 min, m/z=484.0 $[M+H]^+$.

To a solution of ethyl 4-(3,5-dichlorophenyl)-5-[(4-methoxyphenyl)methyl]-8-oxo-pyrido[3,2-d] pyrimidine-7-carboxylate (1.89 g, 3.70 mmol) in $CH_2Cl_2$ (75 mL) and DMF (0.5 mL) at rt under $N_2$-atmosphere was added slowly oxalyl chloride (2 mL, 23.1 mmol). The reaction was heated to reflux at 60° C. for 1 hour. The mixture was cooled to rt, then quenched by the addition of sat. aq. $NaHCO_3$ solution (200 mL) and extracted with $CH_2Cl_2$ (3×100 mL). The combined organic layers were combined and then concentrated in vacuo to give ethyl 8-chloro-4-(3,5-dichlorophenyl) pyrido[3,2-d]pyrimidine-7-carboxylate. LCMS (method B) $R_t$=1.52 min, m/z=382.0 $[M+H]^+$.

To a solution of ethyl 8-chloro-4-(3,5-dichlorophenyl) pyrido[3,2-d]pyrimidine-7-carboxylate (502 mg, 0.93 mmol) in THF (10 mL, 123 mmol) at rt under N$_2$-atmosphere was added dropwise morpholine (0.17 mL, 1.9 mmol). The reaction was stirred at rt for 3 hours. The reaction was then quenched with sat. aq. NaHCO$_3$ solution (50 mL) and extracted with CH$_2$Cl$_2$ (3×25 mL). The combined organic layers were dried over anhydrous Na$_2$SO$_4$, filtered and concentrated in vacuo. The residue was purified by column chromatography (10-25% EtOAc in cyclohexane) to give ethyl 4-(3,5-dichlorophenyl)-8-morpholino-pyrido[3,2-d]pyrimidine-7-carboxylate. LCMS (method B) R$_t$=1.56 min, m/z=433.0 [M+H]$^+$.

To a mixture of ethyl 4-(3,5-dichlorophenyl)-8-morpholino-pyrido[3,2-d]pyrimidine-7-carboxylate (337.5 mg, 0.717 mmol) in 1,4-dioxane (15 mL) and water (5 mL) at rt under N$_2$-atmosphere was added lithium hydroxide (61.6 mg, 2.52 mmol). The resulting mixture was heated to 80° C. The reaction was concentrated in vacuo and the residue was taken up in water (20 mL) and acidified with 2M HCl. The resulting precipitate was filtered off and washed with water (20 mL), then dried in vacuo at 45° C. overnight to give 4-(3,5-dichlorophenyl)-8-morpholino-pyrido[3,2-d]pyrimidine-7-carboxylic acid. LCMS (method B) R$_t$=0.80 min, m/z=405.0 [M+H]$^+$.

To a suspension of 4-(3,5-dichlorophenyl)-8-morpholino-pyrido[3,2-d]pyrimidine-7-carboxylic acid (125.1 mg, 0.31 mmol) in THF (3 mL) was added NEt$_3$ (0.18 mL, 1.3 mmol), followed by PyBOP (259 mg, 0.49 mmol). The reaction was stirred at rt under N$_2$-atmosphere. 2,3-Dihydro-1,4-benzoxazin-4-amine (60.5 mg, 0.40 mmol) in THF (1 mL) was then added to the reaction. The mixture was stirred for 22 hours at rt. The mixture was diluted with brine (25 mL) and extracted with CH$_2$Cl$_2$ (3×15 mL). The combined organic layers were dried over Na$_2$SO$_4$, filtered and concentrated in vacuo. The residue was purified by column chromatography (5-40% EtOAc in cyclohexane) to give the title compound. LCMS (method B) R$_t$=1.38 min, m/z=537.0 [M+H]$^+$. $^1$H NMR (400 MHz, DMSO-d6) δ[ppm]: 10.75 (s, 1H), 9.38 (s, 1H), 8.92 (s, 1H), 8.31 (d, J=2 Hz, 2H), 7.87 (t, J=2 Hz, 1H), 7.01 (dd, J=1.2, 8 Hz, 1H), 6.85 (td, J=1.6, 8.4 Hz, 1H), 6.69-6.78 (m, 2H), 4.38 (t, J=4.4 Hz, 2H), 3.86 (t, J=4 Hz, 4H), 3.63-3.73 (m, 6H).

Example 7.1

8-(3,5-dichlorophenyl)-N-(2,3-dihydro-1,4-benzoxazin-4-yl)-4-morpholino-1,6-naphthyridine-3-carboxamide

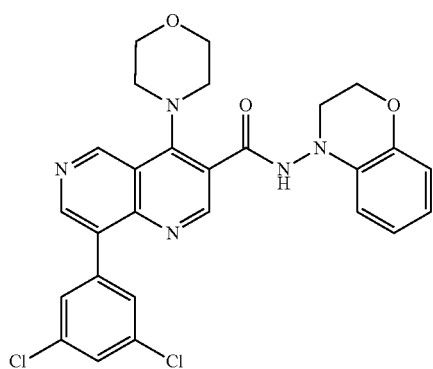 [SMILES: O=C(NN1CCOc2ccccc21)c1cnc2c(-c3cc(Cl)cc(Cl)c3)cncc2c1N1CCOCC1]

To a stirred solution of 3,4-dihydro-2H-1,4-benzoxazine in EtOH (8 mL) was added sodium nitrite (612 mg, 8.87 mmol) in water (3.2 mL) dropwise at 0° C. After 5 min, HCl (0.8 mL) was added dropwise and the reaction mixture left to stir at 0° C. for 2 hours. NaOH (2.96 g, 74 mmol) in water (7.5 mL) was added to the reaction mixture dropwise, followed by sodium dithionate (4.4 g, 22.2 mmol) at 0° C. The resulting reaction mixture was heated to 90° C. for 4 hours. The reaction mixture was dissolved in EtOAc (20 mL), washed with water (10 mL) and brine (10 mL). The organic layer was dried over anhydrous Na$_2$SO$_4$ and concentrated in vacuo. The crude compound was purified by column chromatography eluting with 0-50% EtOAc in petroleum ether. LCMS (method C) R$_t$=0.89 min, m/z=152.36 [M+H]$^+$.

A mixture of 3-bromopyridin-4-amine (10.0 g, 57.8 mmol) and diethyl 2-(ethoxymethylene)propanedioate (32.8 mL, 173 mmol) was heated to 120° C. for 16 hours. The reaction mixture was allowed to rt, reduced to dryness in vacuo and purified by column chromatography eluting with 0-50% EtOAc in petroleum ether to afford diethyl 2-[[(3-bromo-4-pyridyl)amino]methylene]propanedioate. LCMS (method C) R$_t$=1.71 min, m/z=343.19 [M+H]$^+$.

A solution of 2-[[(3-bromo-4-pyridyl)amino]methylene] propanedioate (2.8 g, 8.12 mmol) was in diphenyl ether (42 mL) was heated to 250° C. for 30 min. The reaction mixture was allowed cool to rt and petroleum ether (50 mL) was added. The resulting solid compound was filtered, washed with petroleum ether (50 mL) and dried in vacuo to afford ethyl 8-bromo-4-hydroxy-1,6-naphthyridine-3-carboxylate. LCMS (method C) R$_t$=1.16 min, m/z=297.11 [M+H]+.

Ethyl 8-bromo-4-hydroxy-1,6-naphthyridine-3-carboxylate (4.3 g, 14.5 mmol) was added to POCl$_3$ (43 mL) and heated to 90° C. for 6 hours. The reaction mixture was allowed to cool to rt, concentrated under reduced pressure. The residue was diluted in EtOAc (100 mL), washed with sat. aq. NaHCO$_3$ solution (3×30 mL) and brine (20 mL). The organic layer was dried over anhydrous Na$_2$SO$_4$ and concentrated under reduced pressure. The crude product was purified by column chromatography eluting with 0-20% EtOAc in petroleum ether. LCMS (method C) R$_t$=2.30 min, m/z=315.09 [M+H]+.

To a stirred solution of ethyl 8-bromo-4-chloro-1,6-naphthyridine-3-carboxylate (3 g, 9.5 mmol) in THF (60 mL) was added morpholine (4.1 g, 47.5 mmol) at rt and stirred for 30 min. The reaction mixture was concentrated to dryness under reduced pressure. The crude product was purified by column chromatography eluting with 0-50% EtOAc in petroleum ether to afford ethyl 8-bromo-4-morpholino-1,6-naphthyridine-3-carboxylate. LCMS (method C) R$_t$=1.65 min, m/z=366.24 [M+H]+.

To a stirred solution of ethyl 8-bromo-4-morpholino-1,6-naphthyridine-3-carboxylate (0.8 g, 2.18 mmol) and (3,5-dichlorophenyl)boronic acid (1.04 g, 5.46 mmol) in 1,4-dioxane/water (16/4 mL) were added Cs$_2$CO$_3$ (2.13 g, 6.55 mmol) followed by tri-tert-butylphosphonium tetrafluoroborate (0.127 g, 0.43 mmol) and degassed under N$_2$ for 10 min. PdCl2(dppf) (0.16 g, 0.21 mmol) was added to reaction mixture and heated to 90° C. for 16 hours. The reaction mixture was dissolved in EtOAc (30 mL), washed with water (15 mL) and brine (10 mL). The organic layer was dried over anhydrous Na$_2$SO$_4$ and concentrated to dryness. The crude product was purified by column chromatography eluting with 0-50% EtOAc in petroleum ether. LCMS (method C) R$_t$=2.33 min, m/z=432.30 [M+H]$^+$.

To a stirred solution of ethyl 8-(3,5-dichlorophenyl)-4-morpholino-1,6-naphthyridine-3-carboxylate (0.55 g, 1.27 mmol) in EtOH:THF:water (1:1:1, 9 mL) was added LiOH·H$_2$O (0.16 g, 3.81 mmol) at rt and heated to 70° C. for 4 hours. The reaction mixture was allowed to cool down to rt and then concentrated to remove solvents. pH was adjusted to 6-7 with aq. 0.5 M HCl solution under cooling condition (0° C.) and extracted with EtOAc (3×30 mL). The combined organic layers were dried over anhydrous Na$_2$SO$_4$ and concentrated to dryness. LCMS (method C) R$_f$=2.15 min, m/z=403.9 [M+H]$^+$.

To a stirred solution of 8-(3,5-dichlorophenyl)-4-morpholino-1,6-naphthyridine-3-carboxylic acid (0.3 g, 0.74 mmol) and 2,3-dihydro-1,4-benzoxazin-4-amine (134 mg, 0.89 mmol) in DMF (5 mL) were added HATU (0.34 g, 0.89 mmol) and DIPEA (0.38 g, 2.2 mmol) at rt. The resulting reaction mixture was heated to 60° C. for 16 hours. The reaction mixture was quenched by adding water (5 mL) and extracted with EtOAc (3×15 mL). The combined organic layers were washed with brine, dried over anhydrous Na$_2$SO$_4$ and concentrated under reduced pressure. The crude product was purified by column chromatography eluting with 0-100% EtOAc in petroleum ether to afford title compound. LCMS (method D) R$_f$=2.12 min, m/z=536.24 [M+H]$^+$. $^1$H NMR (400 MHz, DMSO-d6) δ[ppm]: 10.75 (s, 1H), 9.03 (s, 1H), 8.84 (s, 1H), 7.77 (d, J=2 Hz, 2H), 7.72 (t, J=2 Hz, 1H), 7.03 (m, 1H), 6.85 (td, J=2, 7.2 Hz, 1H), 6.72-6.78 (m, 2H), 4.38 (t, J=4.4 Hz, 2H), 3.92 (t, J=3.6 Hz, 4H), 3.69 (br s, 2H), 3.39 (t, J=4 Hz, 4H).

Example 8.1

N-(2,3-dihydro-1,4-benzoxazin-4-yl)-2-methyl-4-morpholino-8-(2,3,5-trifluorophenyl)quinoline-3-carboxamide

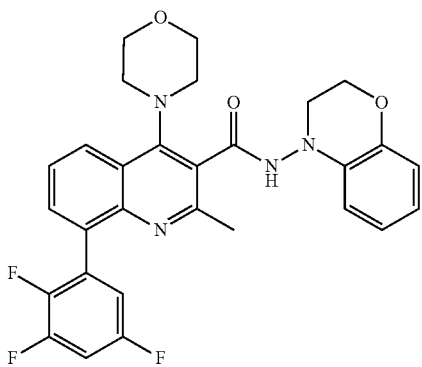 [SMILES: Cc1nc2c(-c3cc(F)cc(F)c3F)cccc2c(N2CCOCC2)c1C(=O)NN1CCOc2ccccc21]

To a stirred solution of 8-bromo-1H-3,1-benzoxazine-2,4-dione (0.8 g, 3.3 mmol) and ethyl 3-oxobutanoate (0.86 g, 6.61 mmol) in DMA (5 mL) was added NaOH (0.132 g, 3.3 mmol). The resulting reaction mixture was stirred for 12 h at 100° C. The mixture was quenched by adding water (200 mL) and extracted with EtOAc (3×50 mL). The combined organic layer was washed with brine (50 mL), dried over Na$_2$SO$_4$ and concentrated under reduced pressure. The crude compound was triturated with n-pentane (30 mL) to afford ethyl 8-bromo-4-hydroxy-2-methyl-quinoline-3-carboxylate. LCMS (method C) R$_f$=1.54 min, m/z=310.22 [M+H]$^+$.

To a stirred solution of ethyl 8-bromo-4-hydroxy-2-methyl-quinoline-3-carboxylate (0.3 g, 0.96 mmol) in EtOH (5 mL) was added KOH (0.814 g, 14.5 mmol) at rt and heated to 80° C. for 24 h. The reaction mixture was allowed to rt and concentrated. The pH of the residue was adjusted to 1-2 using aqueous 2 N HCl solution and the precipitated solid was filtered, washed with water (10 mL) and dried to afford 8-bromo-4-hydroxy-2-methyl-quinoline-3-carboxylic acid. LCMS (method C) R$_f$=1.46 min. m/z=280.05 [M−H]$^−$.

A mixture of 8-bromo-4-hydroxy-2-methyl-quinoline-3-carboxylic acid (0.2 g, 0.7 mmol) and POCl$_3$ (10 mL) was heated to 90° C. for 2 h. The reaction mixture was allowed to cool to rt, and concentrated under reduced pressure to afford 8-bromo-4-chloro-2-methyl-quinoline-3-carbonyl chloride.

To a stirred solution of 2,3-dihydro-1,4-benzoxazin-4-amine (0.188 g, 1.25 mmol) in THF (3 mL) was added DIPEA (0.342 g, 2.5 mmol) and cooled to 0-5° C. A solution of 8-bromo-4-chloro-2-methyl-quinoline-3-carbonyl chloride (0.2 g, 0.62 mmol) in 2 mL THF was added to the reaction mixture and allowed to stir at rt. The reaction mixture was quenched by adding water (100 mL) and extracted with EtOAc (2×50 mL). The combined organic layer was washed with brine (50 mL), dried over Na$_2$SO$_4$ and concentrated under reduced pressure. The crude compound was purified by column chromatography, to obtain 8-bromo-4-chloro-N-(2,3-dihydro-1,4-benzoxazin-4-yl)-2-methyl-quinoline-3-carboxamide. LCMS (method C) Rt=2.12 min, m/z=432.06 [M+H]$^+$.

To a stirred solution of 8-bromo-4-chloro-N-(2,3-dihydro-1,4-benzoxazin-4-yl)-2-methyl-quinoline-3-carboxamide (0.25 g, 0.57 mmol) and morpholine (0.5 g, 5.77 mmol) in THF (5 mL) was added Et$_3$N (0.116 g, 1.15 mmol). The reaction mixture stirred at rt for 16 h. The reaction mixture was quenched by adding water (100 mL) and extracted with EtOAc (2×50 mL). The combined organic layer was washed with brine, dried over Na$_2$SO$_4$ and concentrated under reduced pressure. The crude compound triturated with diethyl ether (30 mL) to obtain 8-bromo-N-(2,3-dihydro-1,4-benzoxazin-4-yl)-2-methyl-4-morpholino-quinoline-3-carboxamide. LCMS (method C) Rt=2.25 min, m/z=483.49 [M+H]$^+$.

To a stirred solution of 8-bromo-N-(2,3-dihydro-1,4-benzoxazin-4-yl)-2-methyl-4-morpholino-quinoline-3-carboxamide (0.3 g, 0.62 mmol) and (2,3,5-trifluorophenyl)boronic acid (0.656 g, 3.72 mmol) in 1,4-Dioxane (12 mL):water (3 mL) was added Cs$_2$CO$_3$, reaction mixture was de-gassed with N2 gas for 10 min followed by the addition of [(t-Bu)$_3$PH]BF$_4$ (0.036 g, 0.12 mmol) and PdCl$_2$(dppf) (0.045 g, 0.06 mmol), and heated to 90° C. for 16 h. The reaction mixture was quenched by adding water (200 mL) and extracted with EtOAc (2×100 mL). The combined organic layer was washed with brine (50 mL), dried over Na$_2$SO$_4$ and concentrated under reduced pressure. The crude compound was purified by column chromatography and eluted with 10% EtOAc in petroleum ether to obtain Example 8.1. LCMS (method C) Rt=2.29 min, m/z=535.22 [M+H]$^+$. $^1$H NMR (400 MHz, DMSO) δ [ppm]: 10.57 (s, 1H), 8.31 (d, J=7.6 Hz, 2H) 7.79 (d, J=6.4 Hz, 2H), 7.69 (t, J=8.4 Hz, 1H), 7.59-7.61 (m, 1H), 7.20-7.21 (m, 1H), 6.99 (d, J=6.8 Hz, 1H), 6.85 (td, J=1.6, 6.8 Hz, 1H), 6.74-6.79 (m, 2H), 4.39 (t, J=4 Hz, 2H), 3.87 (t, J=4 Hz, 4H), 3.72 (br s, 2H), 3.32 (br s, 4H), 2.55 (s, 3H).

Example 8.2

N-(2,3-dihydro-1,4-benzoxazin-4-yl)-4-morpholino-2-(trifluoromethyl)-8-(2,3,5-trifluorophenyl)quinoline-3-carboxamide

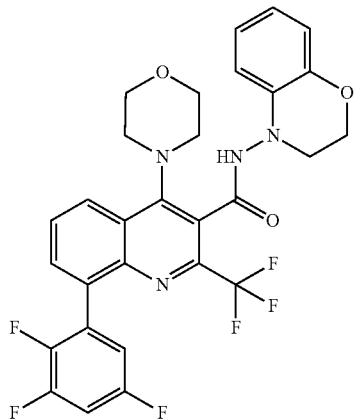 [SMILES: O=C(NN1CCOc2ccccc21)c1c(C(F)(F)F)nc2c(-c3cc(F)cc(F)c3F)cccc2c1N1CCOCC1]

Step 1: To a stirred solution of 7-bromoindoline-2,3-dione (2.5 g, 11.06 mmol) and ethyl 4,4,4-trifluorobut-2-ynoate (1.83 g, 11.06 mmol) in DMF (15 mL) was added Na$_2$CO$_3$ (2.34 g, 22.12 mmol) followed by tert-butyl hydroperoxide (TBHP, 0.99 g, 11.06 mmol). The reaction mixture was stirred for 2 h at rt. The reaction mixture was quenched by adding water (20 mL) and extracted with ethy (2×30 mL). The combined organic layer was washed with brine (3×30 mL), dried over Na$_2$SO$_4$ and concentrated under reduced pressure. The crude compound was purified by column chromatography, eluting with 0-50% EtOAc in petroleum ether to obtain ethyl 8-bromo-4-hydroxy-2-(trifluoromethyl)quinoline-3-carboxylate. LCMS (method C) Rt=2.29 min, m/z=364.14 [M+H]$^+$.

Step 2: To a stirred solution of ethyl 8-bromo-4-hydroxy-2-(trifluoromethyl) quinoline-3-carboxylate (1.75 g, 4.80 mmol) in EtOH (10 mL) was added KOH (5.39 g, 96.12 mmol) at rt and heated to 90° C. for 24 h. The reaction mixture was allowed to rt and concentrated. The pH of the residue was adjusted to 1-2 using aqueous 2 N HCl solution and the precipitated solid filtered, washed with water (10 mL), diethyl ether (20 mL) and dried to afford 8-bromo-4-hydroxy-2-(trifluoromethyl)quinoline-3-carboxylic acid. LCMS (method C) Rt=1.79 min. m/z=335.99 [M+H]$^+$.

Step 3: A mixture of 8-bromo-4-hydroxy-2-(trifluoromethyl)quinoline-3-carboxylic acid (1 g, 2.97 mmol) and POCl$_3$ (10 mL) was heated to 90° C. for 2 h. The reaction mixture was allowed to rt and concentrated under reduced pressure to afford 8-bromo-4-chloro-2-(trifluoromethyl)quinoline-3-carbonyl chloride.

Step 4: To a stirred solution of 2,3-dihydro-1,4-benzoxazin-4-amine (0.8 g, 5.36 mmol) in THF (5 mL) was added DIPEA and cooled to 0-5° C. A solution of 8-bromo-4-chloro-2-(trifluoromethyl) quinoline-3-carbonyl chloride (1 g, 2.68 mmol) in 4 mL THF was added to the reaction mixture and allowed to stir at rt for 16 h. The reaction was quenched by adding water (20 mL) and extracted with EtOAc (2×30 mL). The combined organic layer was washed with brine (20 mL), dried over Na$_2$SO$_4$ and concentrated under reduced pressure. The crude compound was purified by column chromatography eluting with 0-100% EtOAc in petroleum ether to obtain 8-bromo-4-chloro-N-(2,3-dihydro-1,4-benzoxazin-4-yl)-2-(trifluoromethyl)quinoline-3-carboxamide. LCMS (method C) Rt=2.23 min, m/z=486.04 [M+H]$^+$.

Step 5: To a stirred solution of 8-bromo-4-chloro-N-(2,3-dihydro-1,4-benzoxazin-4-yl)-2-(trifluoromethyl)quinoline-3-carboxamide (0.844 g, 1.73 mmol) in THF (6 mL) was added morpholine (1.5 mL, 17.34 mmol) at rt and stirred for 16 h. The reaction mixture was concentrated to dryness. The crude was purified by column chromatography eluting with 0-50% EtOAc in petroleum ether to afford 8-bromo-N-(2,3-dihydro-1,4-benzoxazin-4-yl)-4-morpholino-2-(trifluoromethyl)quinoline-3-carboxamide. LCMS (method C) Rt=2.18 min, m/z=537.08 [M+H]$^+$.

Step 6: To a stirred solution of 8-bromo-N-(2,3-dihydro-1,4-benzoxazin-4-yl)-4-morpholino-2-(trifluoromethyl)quinoline-3-carboxamide and (2,3,5-trifluorophenyl) boronic acid (0.687 g, 3.91 mmol) in 1,4-dioxane (15 mL):water (5 mL) was added Cs$_2$CO$_3$ (0.636 g, 1.95 nmmol). The reaction mixture was de-gassed with N2 gas for 10 min followed by the addition of [(t-Bu)$_3$PH]BF$_4$ (0.075 g, 0.26 mmol) and PdCl$_2$(dppf) (0.095, 0.13 mmol). The reaction mixture was heated to 90° C. for 16 h. The reaction mixture was quenched by adding water (150 mL) and extracted with EtOAc (3×50 mL). The combined organic layer was washed with brine (30 mL), dried over Na$_2$SO$_4$ and concentrated under reduced pressure. The crude compound was purified by column chromatography eluting with 0-14% EtOAc in petroleum ether to afford Example 8.2 as a white solid. LCMS (method C) Rt=2.27 min, m/z=589.39 [M+H]$^+$. 1H NMR (400 MHz, DMSO) δ [ppm]: 10.62 (s, 1H), 8.45 (d, J=8.4 Hz, 2H), 8.03 (d, J=7.2 Hz, 2H), 7.94 (t, J=8.4 Hz, 1H), 7.65-7.67 (m, 1H), 7.29-7.31 (m, 1H), 7.03 (d, J=7.6 Hz, 1H), 6.83-6.87 (mz, 1H), 6.76-6.80 (m, 2H), 4.39 (t, J=3.6 Hz, 2H), 3.87 (br s, 4H), 3.64 (br s, 2H), 3.43 (br s, 4H).

Experimental details for compounds in the tables:

| Ex. | HPLC | NMR |
|---|---|---|
| 2.2 | R$_t$ = 1.43 min, m/z = 494 [M + H]$^+$/ Method B | $^1$H NMR (400 MHz, DMSO-C) δ [ppm]: 10.6 (s, 1 H), 8.88 (s, 1 H), 8.67 (d, J = 5.9 Hz, 1 H), 8.12-8.08 (m, 3 H), 7.75 (t, J = 2 Hz, 1 H), 7.09-7.03 (m, 1 H), 6.99 (d, J = 6.4 Hz, 1 H), 6.93 (d, J = 7.9 Hz, 1 H), 6.70-6.64 (m, 1 H), 3.29 (m, 2 H), 3.13 (s, 6 H), 2.77 (t, J = 6.2 Hz, 2 H), 2.05 (quint, J = 5.9 Hz, 2 H) |
| 2.3 | R$_t$ = 1.32 min, m/z = 534.0 [M − H]$^-$/ Method B | $^1$H NMR (400 MHz, DMSO-d6) δ [ppm]: 10.81 (s, 1 H), 9.01 (s, 1 H), 8.73 (d, J = 6 Hz, 1 H), 8.11 (d, J = 2 Hz, 2 H), 8.09 (d, J = 5.6 Hz, 1 H), 7.76 (t, J = 2 Hz, 1 H), 7.05 (dd, J = 1.2, 7.6 Hz, 1 H), 6.86 (td, J = 1.6, 6.8 Hz, 1 H), 6.71-6.79 (m, 2 H), 4.39 (t, J = 4.4 Hz, 2 H), 3.90 (t, J = 4 Hz, 4 H), 3.7 (br s, 2 H), 3.31 (br s, 4 H) |

| Ex. | HPLC | NMR |
| --- | --- | --- |
| 2.4 | R$_t$ = 2.38 min, m/z = 522.61 [M + H]$^+$/ Method C | $^1$H NMR (400 MHz, DMSO-d6) δ [ppm]: 10.9 (s, 1 H), 8.92 (s, 1 H), 8.74 (d, J = 6 Hz, 1 H), 8.14 (d, J = 5.6 Hz, 1 H), 7.68-7.75 (m, 1 H), 7.34-7.37 (m, 1 H), 7.02 (dd, J = 1.2, 8 Hz, 1 H), 6.72-6.85 (m, 3 H), 4.38 (t, J = 4.4 Hz, 2 H), 3.90 (t, J = 4 Hz, 4 H), 3.68 (br s, 2 H), 3.31 (br s, 4 H) |
| 2.5 | R$_t$ = 2.35 min, m/z = 496.30 [M + H]$^+$/ Method D | $^1$H NMR (400 MHz, DMSO-d6) δ [ppm]: 10.9 (s, 1 H), 8.92 (s, 1 H), 8.79 (d, J = 6 Hz, 1 H), 8.10 (d, J = 5.6 Hz, 1 H), 7.69-7.76 (m, 1 H), 7.34-7.39 (m, 1 H), 7.13 (dd, J = 1.6, 8 Hz, 1 H), 6.82-6.86 (m, 1 H), 6.74-6.76 (m, 2 H), 4.36 (t, J = 4 Hz, 2 H), 3.60-3.63 (m, 5 H), 3.36 (s, 3 H) |
| 2.6 | R$_t$ = 2.71 min, m/z = 570.35 [M + H]$^+$/ Method D | $^1$H NMR (400 MHz, DMSO-d6) δ [ppm]: 10.81 (s, 1 H), 9.01 (s, 1 H), 8.76 (d, J = 5.6 Hz, 1 H), 8.48 (s, 1 H), 8.39 (s, 1 H), 8.12 (d, J = 6 Hz, 1 H), 8.03 (s, 1 H), 7.05 (dd, J = 1.2, 8 Hz, 1 H), 6.84-6.89 (m, 1 H), 6.73-6.79 (m, 2 H), 4.39 (t, J = 4 Hz, 2 H), 3.90 (t, J = 4 Hz, 4 H), 3.71 (br s, 2 H) |
| 2.7 | R$_t$ = 2.92 min, m/z = 536.0 [M + H]$^+$/ Method D | $^1$H NMR (400 MHz, DMSO-d6) δ [ppm]: 10.80 (s, 1 H), 8.87 (s, 1 H), 8.71 (d, J = 5.6 Hz, 1 H), 8.11 (d, J = 6 Hz, 1 H), 7.77 (dd, J = 1.6, 8 Hz, 1 H), 7.51 (t, J = 8 Hz, 1 H), 7.45 (dd, J = 1.6, 7.6 Hz, 1 H), 7.01 (dd, J = 0.8, 8 Hz, 1 H), 6.82 (td, J = 2, 8.8 Hz, 1 H), 6.74-6.78 (m, 2 H), 4.37 (t, J = 4.4 Hz, 2 H), 3.90 (t, J = 4 Hz, 4 H), 3.68 (br s, 2 h), 3.32 (br s, 4 H) |
| 2.8 | R$_t$ = 2.68 min, m/z = 554.24 [M + H]$^+$/ Method C | $^1$H NMR (400 MHz, DMSO-d6) δ [ppm]: 90° C.: 10.53 (s, 1 H), 8.95 (s, 1 H), 8.70 (d, J = 5.6 Hz, 1 H), 8.35 (d, J = 6.4 Hz, 2 H), 8.07 (d, J = 5.6 Hz, 1 H), 7.01 (d, J = 8 Hz, 1 H), 6.87 (td, J = 1.6, 8.4 Hz, 1 H), 6.70-6.78 (m, 2 H), 4.37 (t, J = 4.4 Hz, 2 H), 3.90 (t, J = 4 Hz, 4 H), 3.71 (t, J = 4.4 Hz, 2 H), 3.45 (t, J = 4.4 Hz, 4 H) |
| 2.9 | R$_t$ = 1.78 min, m/z = 503.19 [M + H]$^+$/ Method C | $^1$H NMR (400 MHz, DMSO-d6) δ [ppm] 90° C: 10.55 (s, 1 H), 9.23 (d, J = 1.6 Hz, 1 H), 8.94 (s, 1 H), 8.74 (d, J = 6 Hz, 1 H), 8.69 (d, J = 2.4 Hz, 1 H), 8.56 (t, J = 2 Hz, 1 H), 7.95 (d, J = 5.6 Hz, 1 H), 7.01 (dd, J = 0.8, 7.6 Hz, 1 H), 6.85 (td, J = 1.6, 8.4 Hz, 1 H), 6.70-6.78 (m, 2 H), 4.37 (t, J = 4.4 Hz, 2 H), 3.90 (t, J = 4.4 Hz, 4 H), 3.71 (t, J = 4.8 Hz, 2 H), 3.36 (t, J = 4.8 Hz, 4 H) |
| 2.10 | R$_t$ = 2.09 min, m/z = 503.19 [M + H]$^+$/ Method C | $^1$H NMR (400 MHz, DMSO-d6) δ [ppm] 90° C: 10.55 (s, 1 H), 8.88 (s, 1 H), 8.73 (d, J = 5.6 Hz, 1 H), 8.12 (d, J = 6 Hz, 1 H), 7.53-7.58 (m, 1 H), 7.23-7.28 (m, 1 H), 6.99-7.01 (m, 1 H), 6.83 (td, J = 1.6, 8.8 Hz, 1 H), 6.73-6.77 (m, 2 H), 4.37 (t, J = 4.4 Hz, 2 H), 3.70 (t, J = 4.4 Hz, 4 H), 3.55-3.58 (m, 4 H), 2.91-2.99 (m, 4 H) |
| 2.11 | R$_t$ = 1.83 min, m/z = 503.19 [M + H]$^+$/ Method C | $^1$H NMR (400 MHz, DMSO-d6) δ [ppm] 90° C.: 10.6 (s, 1 H), 8.95 (s, 1 H), 8.76 (d, J = 5.6 Hz, 1 H), 8.26 (d, J = 5.6 Hz, 1 H), 7.55-7.58 (m, 1 H), 7.26-7.28 (m, 1 H), 6.99-7.01 (m, 1 H), 6.99 (dd, J = 0.8, 7.6 Hz, 1 H), 6.84 (td, J = 1.6, 8.4 Hz, 1 H), 6.75-6.77 (m, 2 H), 4.38 (t, J = 4.4 Hz, 2 H), 3.68-3.75 (m, 6 H), 3.45-3.47 (m, 4 H) |
| 2.12 | R$_t$ = 2.20 min, m/z = 522.75 [M + H]+/ Method C | $^1$H NMR (400 MHz, DMSO) δ [ppm] 90° C.: 10.53 (s, 1 H), 8.94 (s, 1 H), 8.70 (d, J = 5.6 Hz, 1 H), 8.13 (m, 2 H), 8.07 (d, J = 6 Hz, 1 H), 7.01 (d, J = 6.8 Hz, 1 H), 6.85 (t, J = 6.8 Hz, 1 H), 6.70-6.78 (m, 2 H), 4.37 (t, J = 4.4 Hz, 2 H), 3.89 (t, J = 4.8 Hz, 4 H), 3.71 (t, J = 4.8 Hz, 2 H), 3.35 (t, J = 4.4 Hz, 4 H). |
| 3.2 | R$_t$ = 1.27 min, m/z = 494.0 [M + H]$^+$/ Method B | $^1$H NMR (400 MHz, DMSO-d6) δ [ppm]: 10.57 (s, 1 H), 8.94 (d, J = 4 Hz, 1 H). 8.62 (s, 1 H), 7.75 (dd, J = 1.6, 8 Hz, 1 H), 7.68 (d, J = 4 Hz, 1 H), 7.49 (t, J = 7.6 Hz, 1 H), 7.38 (dd, J = 1.2, 7.6 Hz, 1 H), 6.95 (dd, J = 1.6, 8 Hz, 1 H), 3.67-3.82 (m, 3 H), 4.36 (t, J = 4.4 Hz, 2 H), 3.65 (br s, 2 H), 3.32 (s, 6H) |
| 3.3 | R$_t$ = 1.36 min, m/z = 536.0 [M + H]$^+$/ Method B | $^1$H NMR (400 MHz, DMSO-d6) δ [ppm]: 10.64 (s, 1 H), 8.96 (d, J = 4.4 Hz, 1 H), 8.81 (s, 1 H), 7.84 (d, J = 4.8 Hz, 1 H), 7.74-7.77 (m, 3 H), 6.98 (dd, J = 1.2, 8 Hz, 1 H), 6.84 (td, J = 1.6, 7.2 Hz, 1 H), 6.69-6.78 (m, 2 H), 4.38 (t, J = 4.4 Hz, 2 H), (t, J = 4 Hz, 4 H), 3.69 (br s, 2 H), 3.64 (t, J = 4 Hz, 4 H) |
| 3.4 | Rt = 2.06 min, m/z = 522.29 [M + H]+/ Method C | $^1$H NMR (400 MHz, DMSO-d6) δ [ppm]: 10.64 (s, 1 H), 9.01 (d, J = 4.4 Hz, 1 H), 8.78 (s, 1 H), 7.83 (d, J = 4 Hz, 1 H), 7.67-7.74 (m, 1 H), 7.31-7.33 (m, 1 H), 6.97 (d, J = 7.6 Hz, 1 H), 6.82 (t, J = 7.2 Hz, 1 H), 6.69-6.77 (m, 2 H), 4.37 (t, J = 4 Hz, 2 H), 3.86 (br s, 74 H), 3.65-3.68 (m, 6 H). |
| 5.2 | R$_t$ = 1.29 min, m/z = 535.5 [M + H]$^+$/ Method B | $^1$H NMR (400 MHz, DMSO-d6) δ [ppm]: 10.69 (s, 1 H), 8.77 (s, 1 H), 8.32 (dd, J = 2.4, 7.2 Hz, 1 H), 7.70-7.75 (m, 3 H), 7.46 (t, J = 7.6 Hz, 1 H), 7.36 (dd, J = 1.6 , 7.6 Hz, 1 H), 7.00 (dd, J = 1.2 , 8 Hz, 1 H), 6.82 (td, J = 2 , 7.2 Hz, 1 H), 6.69-6.77 (m, 2 H), 4.38 (t, J = 4.4 Hz, 2 H), 3.89 (t, J = 4 Hz, 4 H), 3.68 (br s, 2 H), 3.30 (t, J = 3.2 Hz, 4 H) |

| Ex. | HPLC | NMR |
| --- | --- | --- |
| 5.3 | R$_t$ = 1.41 min, m/z = 535.0 [M + H]$^+$/ Method B | $^1$H NMR (400 MHz, DMSO-d6) δ [ppm]: 10.71 (s, 1 H), 8.88 (s, 1 H), 8.31 (dd, J = 0.8 , 8.4 Hz, 1 H), 7.88 (dd, J = 1.2, 7.2 Hz, 1 H), 7.74 (t, J = 7.2 Hz, 1 H), 7.03 (dd, J = 1.6, 8.4 Hz, 1 H), 6.85 (td, J = 2, 7.2 Hz, 1 H), 6.70-6.79 (m, 2 H), 4.39 (t, J = 4 Hz, 2 H), 3.89 (t, J = 4 Hz, 4 H), 3.7 (br s, 2 H), 3.28 (t, J = 4 Hz, 2 H) |
| 5.4 | R$_t$ = 2.12 min, m/z = 539.31 [M + H]$^+$/ Method C | $^1$H NMR (400 MHz, DMSO-d6) δ [ppm]: 10.70 (s, 1 H), 8.85 (s, 1 H), 8.42 (m, 1 H), 7.66-7.75 (m, 2 H), 7.29-7.31 (m, 1 H), 7.01 (dd, J = 1.2, 8.4 Hz, 1 H), 6.83 (td, J = 1.6, 8.8 Hz, 1 H), 6.73-6.78 (m, 2 H), 4.38 (t, J = 4.4 Hz, 2 H), 3.88 (m, 4 H), 3.68 (br s, 2 H), 3.29 (m, 4 H) |
| 5.5 | R$_t$ = 3.07 min, m/z = 502.44 [M + H]$^+$/ Method D | $^1$H NMR (400 MHz, DMSO-d6) δ [ppm]: 10.72 (s, 1 H), 8.87 (s, 1 H), 8.78 (d, J = 2 Hz, 1 H), 8.67 (d, J = 2 Hz, 1 H), 8.33-8.35 (m, 1 H), 8.21 (t, J = 2 Hz, 1 H), 7.95 (dd, J = 0.8, 7.2 Hz, 1 H), 7.46-7.78 (m, 1 H), 7.03 (dd, J = 1.2, 8 Hz, 1 H), 6.85 (td, J = 1.6, 8.4 Hz, 1 H), 6.72-6.79 (m, 2 H), 4.39 (t, J = 4.4 Hz, 2 H), 3.89 (m, 4 H), 3.71 (br s, 2 H), 3.30 (m, 4 H) |
| 5.6 | R$_t$ = 1.78 min, m/z = 503.19 [M + H]$^+$/ Method C | $^1$H NMR (400 MHz, DMSO-d6) δ [ppm] 90° C.: 10.55 (s, 1 H), 9.23 (d, J = 1.6 Hz, 1 H), 8.94 (s, 1 H), 8.74 (d, J = 6 Hz, 1 H), 8.69 (d, J = 2.4 Hz, 1 H), 8.56 (t, J = 2 Hz, 1 H), 7.95 (d, J = 5.6 Hz, 1 H), 7.01 (dd, J = 0.8, 7.6 Hz, 1 H), 6.85 (td, J = 1.6, 8.4 Hz, 1 H), 6.70-6.78 (m, 2 H), 4.37 (t, J = 4.4 Hz, 2 H), 3.90 (t, J = 4.4 Hz, 4 H), 3.71 (t, J = 4.8 Hz, 2 H), 3.36 (t, J = 4.8 Hz, 4 H) |
| 5.7 | R$_t$ = 2.09 min, m/z = 503.19 [M + H]$^+$/ Method C | $^1$H NMR (400 MHz, DMSO-d6) δ [ppm] 90° C.: 10.55 (s, 1 H), 8.88 (s, 1 H), 8.73 (d, J = 5.6 Hz, 1 H), 8.12 (d, J = 6 Hz, 1 H), 7.53-7.58 (m, 1 H), 7.23-7.28 (m, 1 H), 6.99-7.01 (m, 1 H), 6.83 (td, J = 1.6, 8.8 Hz, 1 H), 6.73-6.77 (m, 2 H), 4.37 (t, J = 4.4 Hz, 2 H), 3.70 (t, J = 4.4 Hz, 2 H), 3.55-3.58 (m, 4 H), 2.91-2.99 (m, 4 H) |
| 5.8 | Rt = 2.08 min, m/z = 521.33 [M + H]$^+$/ Method C | $^1$H NMR (400 MHz, DMSO-d6) δ [ppm] 90° C.: 10.42 (s, 1 H), 8.80 (s, 1 H), 8.34-8.39 (m, 1 H), 7.62 (t, J = 8.8 Hz, 1 H), 7.16 (m, 3 H), 6.97 (d, J = 7.2 Hz, 1 H), 6.82 (t, J = 7.6 Hz, 1 H), 6.70-6.76 (m, 2 H), 4.36 (br s, 2 H), 3.88 (br s, 4 H), 3.69 (br s, 2H), 3.31 (br s, 4 H) |
| 5.9 | R$_t$ = 1.52 min, m/z = 521.33 [M + H]$^+$/ Method C | $^1$H NMR (400 MHz, DMSO-d6) δ [ppm] 90° C.: 10.6 (s, 1 H), 9.17 (s, 1 H), 9.06 (s, 2 H), 8.82 (s, 1 H), 8.36 (dd, J = 1.6, 8.8 Hz, 1 H), 7.94 (dd, J = 0.8, 6.8 Hz, 1 H), 7.74-7.78 (m, 1 H), 6.99 (dd, J = 1.2, 9.2 Hz, 1 H), 6.83 (td, J = 1.6, 8.4 Hz, 1 H), 6.75-6.77 (m, 2 H), 4.37 (t, J = 4.4 Hz, 2 H), 3.89 (t, J = 4.4 Hz, 4 H), 3.71 (t, J = 4.4 Hz, 2 H), 3.33 (t, J = 4.4 Hz, 4 H) |
| 5.10 | R$_t$ = 2.24 min, m/z = 537.33 [M + H]$^+$/ Method C | $^1$H NMR (400 MHz, DMSO-d6) δ [ppm]: 10.71 (s, 1 H), 8.85 (dd, J = 1.2, 8.4 Hz, 1 H), 7.75-7.87 (m, 2 H), 7.60-7.64 (m, 1 H), 7.22-7.25 (m, 1 H), 7.02 (dd, J = 1.2, 6.8 Hz, 1 H), 6.70-6.78 (m, 3 H), 4.39 (t, J = 4.4 Hz, 2 H), 3.69 (br s, 2 H), 3.49 (br s, 4 H), 2.92 (br s, 2 H) |
| 5.11 | R$_t$ = 3.16 min, m/z = 521.33 [M + H]$^+$/ Method D | $^1$H NMR (400 MHz, DMSO-d6) δ [ppm]: 10.75 (s, 1 H), 8.90 (s, 1 H), 8.39 (dd, J = 1.2, 8.4 Hz, 1 H), 8.23 (s, 1 H), 8.16 (s, 1 H), 8.06 (dd, J = 1.2, 7.2 Hz, 1 H), 7.79 (t, J = 7.2 Hz, 1 H), 7.03 (dd, J = 1.6, 8 Hz, 1 H), 6.85 (td, J = 1.6, 7.2 Hz, 1 H), 6.74-6.79 (m, 2 H), 4.39 (t, J = 4.4 Hz, 2 H), 3.90 (t, J = 3.6 Hz, 4 H), 3.71 (br s, 2 H), 3.31 (br s, 4 H) |
| 5.12 | R$_t$ = 2.54 min, m/z = 536.09 [M + H]$^+$/ Method C | $^1$H NMR (400 MHz, DMSO-d6) δ [ppm]: 10.75 (s, 1 H), 8.90 (s, 1 H), 8.37 (dd, J = 1.2, 8.4 Hz, 1 H), 7.99 (dd, J = 1.6, 7.2 Hz, 1 H), 7.86 (s, 2 H), 7.77 (t, J = 7.2 Hz, 1 H), 7.03 (dd, J = 1.6, 8 Hz, 1 H), 6.86 (td, J = 1.6, 6.8 Hz, 1 H), 6.72-6.79 (m, 2 H), 4.39 (t, J = 4.4 Hz, 2 H), 3.89 (t, J = 4 Hz, 4 H), 3.71 (br s, 2 H), 3.28 (br s, 4 H) |
| 5.13 | R$_t$ = 2.28 min, m/z = 553.38 [M + H]$^+$/ Method C | $^1$H NMR (400 MHz, DMSO-d6) δ [ppm]: 10.71 (s, 1 H), 8.83 (s, 1 H), 8.35 (dd, J = 1.2, 8.4 Hz, 1 H), 7.85-7.89 (m, 2 H), 7.75 (t, J = 7.2 Hz, 1 H), 7.55 (m, 1H), 7.02 (dd, J = 1.2, 8 Hz 1H), 6.84 (td, J = 1.6, 7.2 Hz, 1 H), 6.74-6.78 (m, 2 H), 4.39 (t, J = 4.4 Hz, 2 H), 3.89 (t, J = 4 Hz, 4 H), 3.70 (br s, 2 H), 3.28 (br s, 4 H) |
| 5.14 | R$_t$ = 2.07 min, m/z = 518.35 [M + H]$^+$/ Method D | $^1$H NMR (400 MHz, DMSO-d6) δ [ppm]: 0.72 (s, 1 H), 8.82 (s, 1 H), 8.40 (m, 1 H), 8.36 (dd, J = 1.2, 8.4 Hz, 1 H), 8.23 (dd, J = 2.8, 8 Hz, 1 H), 7.91 (dd, J = 1.2, 7.2 Hz, 1 H), 7.76 (t, J = 7.2 Hz, 1 H), 7.01 (dd, J = 1.6, 8 Hz, 1 H), 6.84 (td, J = 1.6, 7.2 Hz, 1 H), 6.73-6.78 (m, 2 H), 4.38 (t, J = 4.4 Hz, 2 H), 3.89 (t, J = 4 Hz, 4 H), 3.69 (br s, 2 H), 3.25 (br s, 4 H) |

| Ex. | HPLC | NMR |
|---|---|---|
| 5.15 | Rt = 2.10 min, m/z = 569.30 [M + H]+/ Method C | ¹H NMR (400 MHz, DMSO-d6) δ [ppm]: 10.78 (s, 1 H), 10.78 (s, 1 H), 8.48 (d, J = 8.4 Hz, 1 H), 7.89 (d, J = 6.8 Hz, 1 H), 7.78 (t, J = 8 Hz, 1 H), 7.62-7.64 (m, 1 H), 7.23-7.26 (m, 1 H), 7.02 (d, J = 8 Hz, 1 H), 6.85 (td, J = 1.6 , 8Hz, 1 H), 6.70-6.79 (m, 2H), 4.40 (t, J = 4 Hz, 2 H), 3.65-3.67 (m, 6 H), 3.50 (br s, 2 H) |
| 5.16 | Rt = 2.11 min, m/z = 521.41 [M + H]+/ Method C | ¹H NMR (400 MHz, DMSO-d6) δ [ppm]: 10.70 (s, 1 H), 8.80 (s, 1 H), 8.33 (dd, J = 0.8, 8.4 Hz, 1 H), 7.68-7.82 (m, 2 H), 7.59-7.66 (m, 2 H), 7.01 (dd, J = 0.8, 8 Hz, 1 H), 6.84 (td, J = 1.6, 8.4 Hz, 1 H), 6.73-6.78 (m, 2 H), 4.38 (t, J = 4.4 Hz, 2 H), 3.65-3.67 (t, J = 3.6 Hz, 4 H), 3.39 (br s, 2 H), 3.28-3.30 (m, 4 H) |
| 5.17 | Rt = 1.91 min, m/z = 503.26 [M + H]+/ Method C | ¹H NMR (400 MHz, DMSO-d6) δ at 90° C.: 10.45 (s, 1 H), 9.34 (s, 1 H), 8.86 (s, 1 H), 8.72 (s, 1 H), 8.42 (d, J = 7.6 Hz, 1 H), 8.19 (d, J = 6.8 Hz, 1 H), 7.79 (t, J = 8 Hz, 1 H), 7.00 (d, J = 7.6 Hz, 1 H), 6.84 (t, J = 6.8 Hz, 1 H), 6.71-6.77 (m, 2 H), 4.37 (t, J = 4.4 Hz, 2 H), 3.89 (t, J = 4 Hz, 4 H), 3.72 (t, J = 4.4 Hz, 2 H), 3.34 (t, J = 4.4 Hz, 4 H) |
| 5.18 | Rt = 2.02 min, m/z = 536.20 [M + H]+/ Method C | ¹H NMR (400 MHz, DMSO-d6) δ at 90° C. [ppm]: 10.41 (s, 1 H), 8.78 (s, 1 H), 8.73 (s, 1 H), 8.47 (s, 1 H), 8.37 (d, J = 7.2 Hz, 1 H), 7.72-7.80 (m, 2 H), 6.97 (d, J = 8 Hz, 1 H), 6.81 (t, J = 6.8 Hz, 1 H), 6.67-6.75 (m, 2 H), 4.36 (t, J = 4.4 Hz, 2 H), 3.89 (t, J = 4.4 Hz, 4 H), 3.69 (t, J = 4.4 Hz, 2 H), 3.34 (t, J = 4.4 Hz, 4H) |
| 5.19 | Rt = 2.29 min, m/z = 535.27 [M + H]+/ Method C | ¹H NMR (400 MHz, DMSO-d6) δ [ppm] at 90° C.: 10.42 (s, 1 H), 8.77 (s, 1 H), 8.36 (d, J = 8.4 Hz, 1 H), 7.81 (d, J = 6.8 Hz, 1 H), 7.72 (t, J = 8 Hz, 1 H), 7.62-7.67 (m, 1 H), 7.32-7.34 (m, 1 H), 6.98 (d, J = 8 Hz, 1 H), 6.82 (t, J = 6.8 Hz, 1 H), 6.70-6.76 (m, 2 H), 4.37 (t, J = 4 Hz, 2 H), 3.89 (t, J = 4 Hz, 4 H), 3.70 (t, J = 4.4 Hz, 2 H), 3.34 (t, J = 4.4 Hz, 4 H) |
| 5.20 | Rt = 2.18 min, m/z = 539.48 [M + H]+/ Method C | ¹H NMR (400 MHz, DMSO-d6) δ [ppm] at 90° C.: 10.42 (s, 1 H), 8.77 (s, 1 H), 8.36 (dd, J = 0.8, 8.4 Hz, 1 H), 7.80 (d, J = 4.8 Hz, 1 H), 7.73 (t, J = 8.4 Hz, 1 H), 7.40-7.47 (m, 1 H), 6.98 (d, J = 7.6 Hz, 1 H), 6.82 (t, J = 6.8 Hz, 1 H), 6.68-6.76 (m, 2 H), 4.36 (t, J = 4.4 Hz, 2 H), 3.89 (t, J = 4.4 Hz, 4 H), 3.70 (t, J = 4.4 Hz, 2 H), 3.33 (t, J = 4.8 Hz, 4 H) |
| 5.21 | Rt = 1.90 min, m/z = 520.27 [M + H]+/ Method C | ¹H NMR (400 MHz, DMSO) δ [ppm] at 90° C.: 10.42 (s, 1 H), 8.72 (d, J = 8.8 Hz, 1 H), 8.42 (s, 1 H), 8.38 (d, J = 8 Hz, 1 H), 7.73-7.81 (m, 2 H), 6.97 (d, J = 7.6 Hz, 1 H), 6.81 (t, J = 7.2 Hz, 1 H), 6.67-6.79 (m, 2 H), 4.36 (t, J = 4 Hz, 2 H), 3.89 (t, J = 4 Hz, 4 H), 3.69 (t, J = 4.4 Hz, 2 H), 3.34 (t, J = 4.4 Hz, 4 H). |
| 5.22 | Rt = 2.27 min, m/z = 570.27 [M + H]+/ Method C | ¹H NMR (400 MHz, DMSO) δ [ppm] at 90° C.: 10.42 (s, 1 H), 8.87 (s, 1 H), 8.54 (s, 1 H), 8.42 (dd, J = 1.2, 8.4 Hz, 1 H), 8.20 (d, J = 6.8 Hz, 1 H), 8.01 (s, 1 H), 7.78 (d, J = 7.2 Hz, 1 H), 7.01 (d, J = 7.6 Hz, 1 H), 6.84 (t, J = 7.2 Hz, 1 H), 6.69-6.77 (m, 2 H), 4.38 (t, J = 4.4 Hz, 2 H), 3.90 (t, J = 4.4 Hz, 4 H), 3.72 (t, J = 4.4 Hz, 2 H), 3.34 (t, J = 4.4 Hz, 4 H). |
| 5.23 | Rt = 2.33 min, m/z = 571.19 [M + H]+/ Method C | ¹H NMR (400 MHz, DMSO) δ [ppm] at 90° C.: 10.43 (s, 1 H), 8.77 (s, 1 H), 8.36 (d, J = 8.4 Hz, 1 H), 7.82 (d, J = 6.8 Hz, 1 H), 7.67-7.75 (m, 2 H), 6.98 (d, J = 8 Hz, 1 H), 6.82 (t, J = 7.6 Hz, 1 H), 6.68-6.77 (m, 2 H), 4.37 (t, J = 4 Hz, 2 H), 3.89 (t, J = 4 Hz, 4 H), 3.71 (t, J = 4 Hz, 2 H), 3.33 (br s, 4 H). |
| 5.24 | Rt = 2.16 min, m/z = 505.32 [M + H]+/ Method C | ¹H NMR (400 MHz DMSO) δ [ppm]: 8.80 (s, 1 H), 8.34 (d, J = 8.4 Hz, 1 H), 7.84 (d, J = 6.8 Hz, 1 H), 7.71-7.79 (m, 1 H), 7.61-7.65 (m, 1 H), 7.07-7.25 (m, 3 H), 6.78-6.88 (m, 2 H), 3.90 (br, s, 4 H), 3.69 (t, J = 8 Hz, 2 H), 3.30 (br s, 4 H), 3.02 (t, J = 8 Hz, 2 H). |
| 5.25 | Rt = 2.12 min, m/z = 536.24 [M + H]+/ Method C | ¹H NMR (400 MHz, DMSO) δ [ppm] at 90° C.: 10.6 (br s, 1 H), 8.87 (s, 1 H), 8.39 (dd, J = 1.2 , 8.4 Hz, 1 H), 8.28 (d, J = 1.2 Hz, 1 H), 8.18 (d, J = 6.4 Hz, 1 H), 7.75 (t, J = 8 Hz, 1 H), 7.69 (d, J = 1.2 Hz, 1 H), 7.01 (d, J = 7.2 Hz, 1 H), 6.84 (t, J = 7.2 Hz, 1 H), 6.68-6.77 (m, 2 H), 4.37 (t, J = 4.4 Hz, 2 H), 3.89 (t, J = 4.4 Hz, 4 H), 3.71 (t, J = 4.4 Hz, 2 H), 3.33 (t, J = 4.4 Hz, 4 H). |
| 5.26 | Rt = 3.30 min, m/z = 487.45 [M + H]+/ Method D | ¹H NMR (400 MHz, DMSO) δ [ppm] at 90° C.: 10.47 (br s, 1 H), 9.38 (d, J = 4.8 Hz, 1 H), 8.87 (s, 1 H), 8.62 (d, J = 8.4 Hz, 1 H), 8.41 (d, J = 8.4 Hz, 1 H), 8.19 (d, J = 6.8 Hz, 1 H), 7.79 (t, J = 7.6 Hz, 1 H), 7.00 (d, J = 7.6 Hz, 1 H), 6.84 (t, J = 7.6 Hz, 1 H), 6.69-6.77 (m, 2 H), 4.38 (t, J = 4 Hz, 2 H), 3.89 (t, J = 4 Hz, 4 H), 3.72 (t, J = 4 Hz, 2 H), 3.34 (t, J = 4.4 Hz, 4 H). |
| 5.27 | Rt = 2.31 min, m/z = 571.23 | ¹H NMR (400 MHz, DMSO) δ [ppm] at 90° C.: 10.46 (s, 1 H), 8.90 (d, J = 2.8 Hz, 1 H), 8.50 (d, J = 8.4 Hz, 1 H), 8.41 (d, J = 6.8 Hz, 1 H), 7.83 (t, J = 8 Hz, 1 H), 7.00 (d, J = 8 |

| Ex. | HPLC | NMR |
|---|---|---|
| | [M + H]+/ Method C | Hz, 1 H), 6.84 (t, J = 6.8 Hz, 1 H), 6.69-6.77 (m, 2 H), 4.37 (t, J = 4.4 Hz, 2 H), 3.89 (q, J = 4.4 Hz, 4 H), 3.72 (t, J = 4 Hz, 2 H), 3.34 (t, J = 4.4 Hz, 4 H). |
| 5.28 | Rt = 1.88 min, m/z = 520.27 [M + H]+/ Method C | ¹H NMR (400 MHz DMSO) δ [ppm] at 90° C.: 10.46 (br s, 1 H), 8.82 (s, 1 H), 8.36 (dd, J = 1.2, 8.4 Hz, 1H), 8.21 (dd, J = 3.6, 8.4 Hz, 1H), 8.10 (d, J = 6.8 Hz, 1 H), 7.95 (t, J = 8.4 Hz, 1 H), 7.73 (t, J = 7.6 Hz, 1 H), 7.00 (d, J = 7.6 Hz, 1 H), 6.82 (t, J = 6.8 Hz, 1 H), 6.67-6.76 (m, 2 H), 4.37 (t, J = 4.4 Hz, 2 H), 3.88 (t, J = 4.4 Hz, 4 H), 3.71 (t, J = 4.4 Hz, 2 H), 3.34 (t, J = 4.4 Hz, 4 H). |
| 5.29 | Rt = 1.92 min, m/z = 520.23 [M + H]+/ Method C | ¹H NMR (400 MHz, DMSO) δ [ppm] at 90° C.: 10.42 (s, 1 H), 8.73 (s, 1 H), 8.39 (dd, J = 1.6, 8.4 Hz, 1 H), 7.82-7.87 (m, 2 H), 7.75 (t, J = Hz, 1 H), 7.60 (dd, J = 3.2, 8.8 Hz, 1 H), 6.98 (d, J = 8.8 Hz, 1 H), 6.82 (t, J = 6.8 Hz, 1 H), 6.68-6.76 (m, 2 H), 4.36 (t, J = 4.4 Hz, 2 H), 3.89 (t, J = 4.4 Hz, 4 H), 3.70 (t, J = 4.4 Hz, 2 H), 3.34 (t, J = 4.4 Hz, 4 H). |
| 5.30 | Rt = 1.78 min, m/z = 513.39 [M + H]+/ Method C | ¹H NMR (400 MHz, DMSO) δ [ppm]: 10.7 (s, 1 H), 8.91 (d, J = 9.6 Hz, 12 H), 8.36 (dd, J = 1.2, 8.4 Hz, 1 H), 8.29 (s, 1 H), 8.23 (dd, J = 1.2, 7.2 Hz, 1 H), 7.80 (t, J = 8.4 Hz, 1 H), 7.03 (dd, J = 1.2, 8 Hz, 1 H), 6.86 (td, J = 1.6, 8.4 Hz, 1 H), 6.71-7.79 (m, 2 H), 4.45 (q, J = 6.8 Hz, 2 H), 4.39 (t, J = 4.4 Hz, 2 H), 3.89 (t, J = 3.6 Hz, 4 H), 3.71 (br s, 2 H), 3.32 (br s, 4 H), 1.40 (t, J = 6.8 Hz, 3 H). |
| 5.31 | Rt = 1.64 min, m/z = 491.75 [M + H]+/ Method C | ¹H NMR (400 MHz, DMSO) δ [ppm]: 10.46 (s, 1 H), 8.56 (s, 1 H), 8.15 (d, J = 8.4 Hz, 1 H), 7.70 (d, J = 6.0 Hz, 1 H), 7.54-7.62 (m, 1 H), 7.5 (dd, J = 7.2, 8.8 Hz, 1 H), 7.15-7.21 (m, 1 H), 6.91 (dd, J = 1.6, 8.0 Hz, 1 H), 6.72-6.82 (m, 2 H), 6.66-6.69 (m, 1 H), 4.42-4.50 (m, 4 H), 4.31-4.38 (m, 2 H), 3.61-3.65 (m, 2 H), 2.37-2.45 (m, 2 H). |
| 5.32 | Rt = 2.17 min, m/z = 508.39 [M + H]+/ Method C | ¹H NMR (400 MHz, DMSO) δ [ppm]: 10.52 (s, 1 H), 8.53 (s, 1 H), 8.38 (d, J = 8.8 Hz, 1 H), 7.71 (d, J = 6.8 Hz, 1 H), 7.48-7.61 (m, 2 H), 7.18-7.22 (m, 1 H), 6.92 (d, J = 7.6 Hz, 1 H), 6.81 (t, J = 6.8 Hz, 1 H), 6.74 (d, J = 7.2 Hz, 1 H), 6.64-6.72 (m, 1 H), 4.33-4.37 (m, 2 H), 3.62-3.74 (m, 6 H), 1.93-1.97 (m, 4 H). |
| 5.33 | Rt = 2.22 min, m/z = 523.80 [M + H]+/ Method C | ¹H NMR (400 MHz, DMSO) δ [ppm]: 10.64 (s, 1 H), 8.81 (s, 1 H), 8.40 (dd, J = 1,2, 8.4 Hz, 1 H), 7.82 (dd, J = 1.2, 7.8 Hz, 1 H), 7.58-7.75 (m, 2 H), 7.20-7.28 (m, 1 H), 6.99 (dd, J = 8.0, 1.2 Hz, 1 H), 6.80-6.85 (m, 1 H), 6.75-6.78 (m, 1 H), 6.67-6.73 (m, 1 H), 4.35-4.39 (m, 2 H), 3.60-3.69 (m, 4 H), 3.46 (t, J = 5.6 Hz, 2 H), 3.26 (s, 3 H), 3.09 (s, 3 H). |
| 5.34 | Rt = 2.40 min, m/z = 567.87 [M + H]+/ Method C | ¹H NMR (400 MHz, DMSO) δ [ppm] at 90° C.: 10.34 (s, 1 H), 8.81 (s, 1 H), 8.37 (d, J = 8.4 Hz, 1 H), 7.79 (d, J = 6.8 Hz, 1 H), 7.71 (t, J = 8.4 Hz, 1 H), 7.42-7.49 (m, 1 H), 7.15-7.17 (m, 1 H), 6.93 (d, J = 7.2 Hz, 1 H), 6.80 (t, J = 7.2 Hz, 1 H), 6.75 (d, J = 6.4 Hz, 1 H), 6.67-6.71 (m, 1 H), 4.37 (t, J = 4 Hz, 2 H), 3.68 (t, J = 4.4 Hz, 2 H), 3.53-3.67 (m, 8 H), 3.16 (s, 6 H). |
| 5.35 | Rt = 2.33 min, m/z = 560.38 [M + H]+/ Method C | ¹H NMR (400 MHz, DMSO) δ [ppm] at 90° C.: 10.49 (s, 1 H), 8.87 (s, 1 H), 8.42 (d, J = 8.8 Hz, 1 H), 7.96 (d, J = 8.8 Hz, 1 H), 7.69 (t, J = 1.6 Hz, 1 H), 7.55 (d, J = 2 Hz, 2 H), 6.98 (d, J = 6.8 Hz, 1 H), 6.81 (td, J = 1.2, 8 Hz, 1 H), 6.69-6.75 (m, 2 H), 4.36 (t, J = 4.4 Hz, 2 H), 3.89 (t, J = 4.4 Hz, 4 H), 3.69 (t, J = 4.4 Hz, 2 H), 3.33 (t, J = 4.8 Hz, 4 H). |
| 5.36 | Rt = 2.33 min, m/z = 476.29 [M + H]+/ Method C | ¹H NMR (400 MHz, DMSO) δ [ppm] at 90° C.: 10.27 (s, 1 H), 8.82 (s, 1 H), 8.69 (dd, J = 1.2, 8 Hz, 1 H), 7.78-7.86 (m, 2 H), 7.44-7.50 (m, 1 H), 7.15-7.17 (m,1 H), 6.96 (d, J = 7.2 Hz, 1 H), 6.81 (td, J = 1.2, 8 Hz, 1 H), 6.71-6.75 (m, 2 H), 4.37 (t, J = 4.4 Hz, 2 H), 3.72 (t, J = 4.4 Hz, 2 H), 2.47-2.49 (m, 1 H), 1.25-1.30 (m, 2 H), 0.80 (q, J = 5.6 Hz, 2H). |
| 5.37 | Rt = 1.69 min, m/z = 509.95 [M + H]+/ Method C | ¹H NMR (400 MHz, DMSO) δ [ppm] at 90° C.: 10.28 (s, 1 H), 8.57 (s, 1 H), 8.13 (d, J = 8.4 Hz, 1 H), 7.70 (d, J = 6.8 Hz, 1 H), 7.52 (t, J = 8 Hz, 1 H), 7.39-7.46 (m, 1 H), 7.01-7.12 (m, 1 H), 6.90 (d, J = 7.6 Hz, 1 H), 6.78 (t, J = 7.6 Hz, 1 H), 6.64-6.74 (m, 3 H), 5.41-5.56 (m, 1 H), 4.56-4.62 (m, 2 H), 4.33 (s, 2 H), 3.65 (s, 1 H). |
| 5.38 | Rt = 2.03 min, m/z = 507.45 [M + H]+/ Method C | ¹H NMR (400 MHz, DMSO) δ [ppm] at 90° C.: 10.20 (s, 1 H), 8.52 (s, 1 H), 8.13 (d, J = 8.4 Hz, 1 H), 7.66 (d, J = 6.8 Hz, 1 H), 7.38-7.50 (m, 2 H), 7.09-7.11 (m, 1 H), 6.90 (d, J = 7.6 Hz, 1 H), 6.78 (t, J = 6.8 Hz, 1 H), 6.64-6.73 (m, 2 H), 5.54 (d, J = 5.6 Hz, 1 H), 4.64-4.68 (m, 2 H), 4.57-4.60 (m, 1 H), 4.33 (br s, 2 H), 4.21-4.24 (m, 2 H), 3.64 (br s, 2 H). |

-continued

| Ex. | HPLC | NMR |
|---|---|---|
| 5.39 | Rt = 2.06 min, m/z = 507.35 [M + H]+/ Method C | |
| 5.40 | Rt = 1.61 min, m/z = 533.76 [M + H]+/ Method C | ¹H NMR (400 MHz, DMSO) δ [ppm] at 90° C.: 10.18 (s, 1 H), 8.53 (s, 1 H), 8.14 (d, J = 8.8 Hz, 1 H), 7.69 (t, J = 7.2 Hz, 1 H), 7.50 (t, J = 8.4 Hz, 1 H), 7.41-7.43 (m, 1 H), 7.09 (m, 1 H), 6.91 (d, J = 8 Hz, 1 H), 6.80 (t, J = 7.2 Hz, 1 H), 6.73 (d, J = 8 Hz, 2 H), 6.67 (t, J = 7.2 Hz, 1 H), 4.73 (s, 4 H), 4.63 (s, 4 H), 4.35 (br s, 2 H), 3.69 (br s, 2 H). |
| 5.41 | Rt = 2.28 min, m/z = 539.81 [M + H]+/ Method C | ¹H NMR (400 MHz, DMSO) δ [ppm] at 90° C.: 10.43 (br s, 1 H), 8.80 (s, 1 H), 8.35-8.39 (m, 1 H), 7.62 (d, J = 9.6 Hz, 1 H), 7.39 (t, J = 7.6 Hz, 2 H), 6.98 (d, J = 7.6 Hz, 1 H), 6.82 (t, J = 7.2 Hz, 1 H), 6.67-6.76 (m, 2 H), 4.36 (t, J = 4 Hz, 2 H), 3.88 (t, J = 4 Hz, 2 H), 3.69 (t, J = 4.4 Hz, 2 H), 3.31 (t, J = 4.4 Hz, 4 H). |
| 5.42 | Rt = 1.82 min, m/z = 507.42 [M + H]+/ Method C | ¹H NMR (400 MHz, DMSO) δ [ppm]: 10.18 (br s, 1 H), 8.59 (s, 1 H), 8.25 (dd, J = 1.2, 8.4 Hz, 1 H), 7.58-7.83 (m, 3 H), 7.07-7.24 (m, 2 H), 6.82 (t, J = 7.2 Hz, 1 H), 7.05 (d, J = 7.2 Hz, 1 H), 6.81 (td, J = 1.2, 8.4 Hz, 2 H), 6.60-6.74 (m, 2 H), 4.35 (t, J = 4 Hz, 2 H), 4.02 (t, J = 6.8 Hz, 2 H), 3.92 (t, J = 6.8 Hz, 2 H), 3.63 (br s, 2 H), 2.29 (quint, J = 6.8 Hz, 2 H). |
| 5.43 | Rt = 1.89 min, m/z = 539.81 [M + H]+/ Method C | ¹H NMR (400 MHz, DMSO) d [ppm] at 90° C.: 10.44 (s, 1 H), 8.86 (s, 1 H), 8.72 (s, 1 H), 8.28 (s, 1 H), 8.15 (dd, J = 1.2, 8.8 Hz, 1 H), 8.05 (d, J = 6.8 Hz, 1 H), 7.39 (t, J = 8 Hz, 2 H), 7.00 (d, J = 7.6 Hz, 1 H), 6.85 (t, J = 6.8 Hz, 1 H), 6.70-6.78 (m, 2 H), 5.15 (q, J = 9.2 Hz, 2 H), 4.38 (t, J = 4.4 Hz, 2 H), 3.87 (t, J = 4.4 Hz, 4 H), 3.69 (t, J = 4.4 Hz, 2 H), 3.31 (t, J = 4.4 Hz, 4 H). |
| 5.44 | Rt = 2.20 min, miz = 537.36 [M + H]+/ Method C | ¹H NMR (400 MHz, DMSO) δ [ppm] at 90° C.: 10.50 (s, 1 H), 8.91 (s, 1 H), 8.58 (s, 1 H), 8.47 (d, J = 8.4 Hz, 1 H), 8.36 (d, J = 7.2 Hz, 1 H), 7.80 (t, J = 8 Hz, 1 H), 7.01 (d, J = 8 Hz, 2 H), 6.84 (t, J = 6.8 Hz, 1 H), 6.69-6.77 (m, 2 H), 4.38 (t, J = 4.4 Hz, 2 H), 3.88 (t, J = 4.4 Hz, 4 H), 3.72 (t, J = 4.4 Hz, 2 H), 3.32 (t, J = 4.4 Hz, 4 H). |
| 5.45 | Rt = 2.25 min, m/z = 520.36 [M + H]+/ Method C | ¹H NMR (400 MHz, DMSO) δ [ppm] at 90° C.: 10.45 (s, 1 H), 8.83 (s, 1 H), 8.59(d, J = 7.6 Hz, 1 H), 7.76-7.86 (m, 2 H), 7.40-7.51 (m, 1 H), 7.13-7.18 (m, 1 H), 6.99 (dd, J = 0.8, 8 Hz, 2 H), 6.84 (td, J = 1.6, 8.4 Hz, 1 H), 6.69-6.77 (m, 2 H), 4.37 (t, J = 4.4 Hz, 2 H), 4.04-4.08 (m, 2 H), 3.74-3.83 (m, 1 H), 3.70 (t, J = 4.4 Hz, 2 H), 3.56 (t, J = 10 Hz, 2 H), 2.44-2.54 (m, 2 H), 1.79 (d, J = 11.2 Hz, 2 H). |
| 5.46 | Rt = 2.09 min, m/z = 507.29 [M + H]+/ Method C | ¹H NMR (400 MHz DMSO) δ [ppm] at 90° C.: 10.47 (br s, 1 H), 9.16 (s, 1 H), 7.81-8.13 (m, 3 H), 7.45-7.55 (m, 1 H), 7.15-7.25 (m, 1 H), 6.92 (d, J = 7.2 Hz, 1 H), 6.99-6.81 (m, 3 H), 4.37 (br s, 2 H), 3.62 (br s, 2 H), 3.42 (s, 1 H), 3.27 (s, 2 H), 2.29 (s, 1 H), 1.72 (s, 2 H). |
| 5.47 | Rt = 2.47 min, m/z = 571.19 [M + H]+/ Method C | ¹H NMR (400 MHz, DMSO) δ [ppm] at 90° C.: 10.45 (s, 1 H), 8.83 (s, 1 H), 8.59(d, J = 7.6 Hz, 1 H), 7.76-7.86 (m, 2 H), 7.40-7.51 (m, 1 H), 7.13-7.18 (m, 1 H), 6.99 (dd, J = 0.8, 8 Hz, 2 H), 6.84 (td, J = 1.6, 8.4 Hz, 1 H), 6.69-6.77 (m, 2 H), 4.37 (t, J = 4.4 Hz, 2 H), 4.04-4.08 (m, 2 H), 3.74-3.83 (m, 1 H), 3.70 (t, J = 4.4 Hz, 2 H), 3.56 (t, J = 10 Hz, 2 H), 2.44-2.54 (m, 2 H), 1.79 (d, J = 11.2 Hz, 2 H). |
| 5.48 | Rt = 2.51 min, m/z = 589.17 [M + H]+/ Method C | ¹H NMR (400 MHz, DMSO) δ [ppm] at 90° C.: 10.42 (br s, 1 H), 8.79 (s, 1 H), 8.41-8.45 (m, 1 H), 7.75 (t, J = 7.2 Hz, 1 H), 7.66 (t, J = 9.2 Hz, 1 H), 6.97 (d, J = 7.6 Hz, 1 H), 6.81 (t, J = 7.2 Hz, 2 H), 6.67-6.75 (m, 2 H), 4.36 (t, J = 4 Hz, 2 H), 3.88 (t, J = 4 Hz, 4 H), 3.69 (br s, 2 H), 3.33 (br s, 4 H). |
| 5.49 | Rt = 2.35 min, m/z = 522.34 [M + H]+/ Method C | ¹H NMR (400 MHz, DMSO) δ [ppm]: 10.72 (s, 1 H), 8.85 (s, 1 H), 8.41 (d, J = 8.4 Hz, 1 H), 7.95 (d, J = 6.4 Hz, 1 H), 7.46 (s, 1 H), 7.02 (d, J = 6.8 Hz, 1 H), 6.82-6.86 (m, 1 H). 6.70-6.78 (m, 2 H), 4.38 (t, J = 4.4 Hz, 2 H), 3.89 (br s, 4 H), 3.69 (br s, 2 H), 3.32 (br s, 4 H). |
| 5.50 | Rt = 2.99 min, m/z = 513.26 [M + H]+/ Method C | ¹H NMR (400 MHz, DMSO) δ [ppm]: 10.68 (s, 1 H), 8.73 (s, 1 H), 8.27 (d, J = 7.6 Hz, 1 H), 7.72 (t, J = 7.2 Hz, 1 H), 7.55 (d, J = 6 Hz, 1 H), 6.99 (d, J = 9.6 Hz, 3 H), 6.71 (quint, J = 1.2, 8.4 Hz, 1 H), 6.69-6.77 (m, 2 H), 4.37 (t, J = 4 Hz, 2 H), 3.89 (br s, 4 H), 3.67 (br s, 2 H), 3.32 (br s, 4 H). |
| 5.51 | Rt = 2.15 min, m/z = 597.28 [M + H]+/ Method C | ¹H NMR (400 MHz, DMSO) δ [ppm]: 10.75 (s, 1 H), 8.94 (s, 1 H), 8.46 (d, J = 7.6 Hz, 1 H), 8.42 (s, 1 H), 8.36 (d, J = 7.2 Hz, 1 H), 7.84 (t, J = 8 Hz, 1 H), 7.03 (d, J = 8 Hz, 1 H), 6.86 (quint, J = 1.6, 8.4 Hz, 1 H), 671-6.79 (m, 2 H), 4.39 (t, J = 4 Hz, 2 H), 3.90 (br s, 4 H), 3.71 (br s, 2 H), |

| Ex. | HPLC | NMR |
|---|---|---|
| | | 3.32 (br s , 4 H), 3.24 (quad, J = 7.2 Hz, 2 H), 1.41 (t, J = 7.2 Hz, 3 H). |
| 5.52 | Rt = 1.75 min, m/z = 643.28 [M + H]+/ Method C | $^1$H NMR (400 MHz, DMSO) δ [ppm]: 10.73 (s, 1 H), 8.79 (s, 1 H), 8.39 (d, J = 8 Hz, 1 H), 7.97 (d, J = 6.4 Hz, 1 H), 7.77 (t, J = 8 Hz, 1 H), 7.60 (s, 1 H), 7.52 (d, J = 6.8 Hz, 2 H), 7.35-7.42 (quad, J = 6.8 Hz, 3 H), 7.01 (d, J = 7.6 Hz, 1 H), 6.84 (t, J = 7.2 Hz, 1 H), 671-6.79 (m, 2 H), 5.50 (s, 2 H), 4.39 (t, J = 4 Hz, 2 H), 3.90 (br s, 4 H), 3.70 (br s, 2 H), 3.31 (br s , 4 H). |
| 5.53 | Rt = 1.85 min, miz = 480.20 [M + H]+/ Method C | $^1$H NMR (400 MHz, DMSO + D$_2$O exchange at 90° C.) δ [ppm]: 9.24 (s, 1 H), 8018 (t, J = 7.2 Hz, 1 H), 7.86 (d, J = 6.8 Hz, 1 H), 7.78 (t, J = 7.6 Hz, 1 H), 7.42-7.44 (m, 1 H), 7.14-7.16 (m, 1 H), 6.88 (d, J = 7.2 Hz, 1 H), 6.73-6.77 (m, 3 H), 4.37 (br s, 2 H), 3.66 (br s, 2 H). |
| 5.54 | Rt = 2.52 min, m/z = 573.27 [M + H]+/ Method C | $^1$H NMR (400 MHz, DMSO) δ [ppm]: 9.92 (s, 1 H), 8.82 (s, 1 H), 8.40-8.44 (m, 1 H), 7.89 (t, J = 7.2 Hz, 1 H), 7.73 (t, J = 9.2 Hz, 1 H), 7.15 (d, J = 7.2 Hz, 1 H), 7.09 (t, J = 7.6 Hz, 1 H), 6.78-8.83 (m, 2 H), 3.89 (t, J = 3.6 Hz, 4 H), 3.65-3.72 (m, 2 H), 3.32 (br s, 4 H), 3.02 (t, J = 7.6 Hz, 2 H). |
| 5.55 | Rt = 2.31 min, miz = 494.31 [M + H]+/ Method C | $^1$H NMR (400 MHz, DMSO) δ [ppm]: 10.6 (s, 1 H), 8.96 (s, 1 H), 8.72 (d, J = 8.4 Hz, 1 H), 7.90 (d, J = 6.8 Hz, 1 H), 7.81 (t, J = 8 Hz, 1 H), 7.63-7.66 (m, 1H), 7.26-7.29 (m 1 H), 6.84 (t, J = 7.6 Hz, 1 H), 6.71-6.77 (m, 2 H), 5.18 (br s, 1 H), 4.37 (t, J = 4 Hz, 2 H), 3.68 (br s, 2 H), 3.23 (s, 3 H), 1.70 (d, J = 6.8 Hz, 3 H). |
| 5.56 | Rt = 2.42 min, m/z = 545.30 [M + H]+/ Method C | $^1$H NMR (400 MHz, DMSO) δ [ppm]: 10.60 (s, 1 H), 8.75 (s, 1 H), 8.38-8.42 (m, 1 H), 7.86-7.89 (t, J = 7.2 Hz, 1 H), 7.68 (t, J = 8.8 Hz, 1 H), 6.99 (dd, J = 1.2, 8 Hz, 1 H), 6.81 (td, J = 1.6, 8.8 Hz, 1 H), 6.72-6.77 (m, 2 H), 4.37 (t, J = 4.4 Hz, 2 H), 3.66 (d, J = 3.6 Hz, 2 H), 3.10 (s, 6 H). |
| 5.57 | Rt = 2.18 min, m/z = 539.72 [M + H]+/ Method C | $^1$H NMR (400 MHz, DMSO) δ [ppm]: 10.70 (s, 1 H), 8.82 (s, 1 H), 8.39 (d, J = 7.6 Hz, 1 H), 7.95-8.05 (m, 2 H), 7.80 (t, J = 8.4 Hz, 2 H), 7.01 (dd, J = 1.2, 8 Hz, 1 H), 6.83 ((d, J = 1.2, 8 Hz, 1 H), 6.74-6.78 (m, 2 H), 4.38 (t, J = 4 Hz, 2 H), 3.90 (br s, 2 H), 3.69 (br s, 4 H), 3.32 (s, 4 H). |
| 5.58 | Rt = 2.28 min, m/z = 544.25 [M + H]+/ Method D | $^1$H NMR (400 MHz, DMSO) δ [ppm]: 10.52 (s, 1 H), 8.89 (s, 1 H), 8.78-8.82 (m, 1 H), 7.85-7.93 (m, 2 H), 6.98 (d, J = 8 Hz, 1 H), 6.82 (t, J = 6.8 Hz, 1 H), 6.70-6.77 (m, 2 H), 4.39 (t, J = 4 Hz, 2 H), 3.71 (br s, 2 H), 1.23-1.34 (m, 3 H), 0.71-0.78 (m, 2 H). |
| 5.59 | Rt = 2.51 min, m/z = 621.14 [M + H]+/ Method D | $^1$H NMR (400 MHz, DMSO) δ [ppm]: 10.72 (s, 1 H), 8.85 (s, 1 H), 8.39-8.43 (m, 1 H), 8.21 (s, 3 H), 7.73 (t, J = 9.6 Hz, 1 H), 7.00 (d, J = 6.8 Hz, 1 H), 6.83 (td, J = 1.6, 8 Hz, 1 H), 6.71-6.78 (m, 2 H), 4.37 (t, J = 4 Hz, 2 H), 3.89 (t, J = 4 Hz, 2 H), 3.69 (br s, 2 H), 3.29 (t, J = 4 Hz, 4 H). |
| 5.60 | Rt = 2.25 min, m/z = 555.31 [M + H]+/ Method C | $^1$H NMR (400 MHz, DMSO) δ [ppm]: 10.71 (s, 1 H), 8.85 (s, 1 H), 8.40-8.44 (m, 1 H), 7.84-7.89 (m, 1 H), 7.73 (t, J = 9.2 Hz, 1 H), 7.47 (br s, 1 H), 7.01 (d, J = 7.6 Hz, 1 H), 6.83 (t, J = 7.2 Hz, 1 H), 6.69-6.77 (m, 2 H), 4.38 (t, J = 4.4 Hz, 2 H), 3.89 (br s, 2 H), 3.69 (br s, 2 H), 3.29 (br s, 4 H). |
| 5.61 | Rt = 2.40 min, m/z = 587.39 [M + H]+/ Method C | $^1$H NMR (400 MHz, DMSO) δ [ppm]: 10.71 (s, 1 H), 8.85 (s, 1 H), 8.37-8.41 (m, 1 H), 7.97 (s, 1 H), 7.91 (s, 1 H), 7.82 (s, 1 H), 7.71 (t, J = 9.2 Hz, 1 H), 7.01 (d, J = 8 Hz, 1 H), 6.83 (t, J = 7.2 Hz, 1 H), 6.71-6.77 (m, 2 H), 4.37 (br s, 2 H), 3.89 (br s, 4 H), 3.69 (br s, 2 H), 3.29 (br s, 4 H). |
| 5.62 | Rt = 2.43 min, m/z = 563.22 [M + H]+/ Method C | $^1$H NMR (400 MHz, DMSO) δ [ppm]: 10.29 (s, 1 H), 8.84 (s, 1 H), 8.33-8.37 (m, 1 H), 7.91 (t, J = 7.6 Hz, 1 H), 7.79 (t, J = 9.2 Hz, 1 H), 7.11 (d, J = 7.6 Hz, 1 H), 6.83 (t, J = 6.8 Hz, 1 H), 6.67-6.75 (m, 2 H), 4.36 (t, J = 3.6 Hz, 2 H), 3.62 (br s, 2 H), 3.58 (s, 3 H), 3.32 (br s, 2 H). |
| 5.63 | Rt = 2.48 min, m/z = 535.30 [M + H]+/ Method C | $^1$H NMR (400 MHz, DMSO) δ [ppm] 90° C.: 10.43(s, 1 H), 8.78 (s, 1 H), 8.32 (d, J = 7.6 Hz, 1 H), 7.70-7.84 (m, 6 H), 6.98 (d, J = 7.6 Hz, 1 H), 6.83 (t, J = 6.8 Hz, 1 H), 6.68-6.76 (m, 2 H), 4.37 (t, J = 4.4 Hz, 2 H), 3.89 (t, J = 4.4 Hz, 4 H), 3.71 (t, J = 4.4 Hz, 2 H), 3.33 (t, J = 4.4 Hz, 4 H). |
| 5.64 | Rt = 2.47 min, m/z = 603.24 [M + H]+/ Method C | $^1$H NMR (400 MHz DMSO) δ [ppm]: 10.72 (s, 1 H), 8.89 (s, 1 H), 8.36 (d, J = 8.4 Hz, 1 H), 7.97 (s, 3 H), 7.76 (t, J = 8 Hz, 1 H), 7.03 (d, J = 8 Hz, 1 H), 6.82 (t, J = 7.2 Hz, 1 H), 6.72-6.78 (m, 2 H), 4.39 (br s, 2 H), 3.89 (br s, 4 H), 3.71 (br s, 2 H), 3.31 (s, 4 H). |

-continued

| Ex. | HPLC | NMR |
|---|---|---|
| 5.65 | Rt = 2.25 min, m/z = 573.25 [M + H]+/ Method C | $^1$H NMR (400 MHz, DMSO) δ [ppm]: 10.71 (s, 1 H), 8.86 (s, 1 H), 847-8.51 (m, 1 H), 8.20 (quad, J = 7.6 Hz, 1 H), 7.78 (t, J = 8.8 Hz, 1 H), 7.01 (d, J = 8 Hz, 1 H), 6.82 (t, J = 7.2 Hz, 1 H), 6.69-6.77 (m, 2 H), 4.37 (t, J = 4.4 Hz, 2 H), 3.89 (br s, 4 H), 3.68 (br s, 2 H), 3.31 (s, 4 H). |
| 5.66 | Rt = 2.11 min, m/z = 526.15 [M + H]+/ Method C | $^1$H NMR (400 MHz, DMSO) δ [ppm]: 10.72 (s, 1 H), 8.88 (s, 1 H), 8.33 (d, J = 8.4 Hz, 1 H), 8.07 (d, J = 9.6 Hz, 1 H), 7.93 (d, J = 7.2 Hz, 1 H), 7.75 (t, J = 8 Hz, 1 H), 7.03 (d, J = 8 Hz, 1 H), 6.85 (t, J = 7.2 Hz, 1 H), 6.70-6.78 (m, 2 H), 4.39 (br s, 2 H), 3.89 (br s, 4 H), 3.70 (br s, 2 H), 328 (br s, 4 H). |
| 5.67 | Rt = 2.00 min, m/z = 528.31 [M + H]+/ Method C | |
| 5.68 | Rt = 2.26 min, m/z = 532.30 [M + H]+/ Method C | |

The compounds of formula (I) of the present invention are useful for the treatment and/or control, in particular helminths, in which the endoparasitic nematodes and trematodes may be the cause of serious diseases of mammals and poultry. Typical nematodes of this indication are: *Filariidae, Setariidae, Haemonchus, Trichostrongylus, Ostertagia, Nematodirus, Cooperia, Ascaris, Bunostonum, Oesophagostonum, Charbertia, Trichuris, Strongylus, Trichonema, Dictyocaulus, Capillaria, Heterakis, Toxocara, Ascaridia, Oxyuris, Ancylostoma, Uncinaria, Toxascaris* and *Parascaris*. The trematodes include, in particular, the family of Fasciolideae, especially *Fasciola hepatica*.

Certain parasites of the species *Nematodirus, Cooperia* and *Oesophagostonum* infest the intestinal tract of the host animal, while others of the species *Haemonchus* and *Ostertagia* are parasitic in the stomach and those of the species Dictyocaulus are parasitic in the lung tissue. Parasites of the families and may be found in the internal cell tissue and in the organs, e.g. the heart, the blood vessels, the lymph vessels and the subcutaneous tissue. A particularly notable parasite is the heartworm of the dog, *Dirofilaria iminitis*.

The parasites which may be treated and/or controlled by the compounds of formula (I) also include those from the class of Cestoda (tapeworms), e.g. the families Mesocestoidae, especially of the genus *Mesocestoides*, in particular *M. lineatus*; Dipylidiidae, especially *Dipylidium caninum, Joyeuxiella* spp., in particular *Joyeuxiella pasquali*, and *Diplopylidium* spp., and Taeniidae, especially *Taenia pisformis, Taenia cervi, Taenia ovis, Taeneia hydatigena, Taenia multiceps, Taenia taeniaeformis, Taenia serialis*, and *Echinococcus* spp., most particularly *Taneia hydatigena, Taenia ovis, Taenia multiceps, Taenia serialis; Echinococcus granulosus* and *Echinococcus multilocularis*.

Furthermore, the compounds of formula (I) are suitable for the treatment and/or control of human pathogenic parasites. Of these, typical representatives that appear in the digestive tract are those of the genus *Ancylostoma, Necator, Ascaris, Strongyloides, Trichinella, Capillaria, Trichuris* and *Enterobius*. The compounds of the present invention are also against parasites of the genus *Wuchereria, Brugia, Onchocerca* and *Loa* from the family of *Dracunculus* and parasites of the genus *Strongyloides* and *Trichinella*, which infect the gastrointestinal tract in particular.

A particular parasite to be treated and/or and controlled by the compounds of the invention is the heartworm (*Dirofilaria immitis*). Particular subjects for such treatment are dogs and cats.

The compounds of the invention can be administered alone or in the form of a composition. In practice, the compounds of the invention are usually administered in the form of compositions, that is, in admixture with at least one acceptable excipient. The proportion and nature of any acceptable excipient(s) are determined by the properties of the selected compound of the invention, the chosen route of administration, and standard practice as in the veterinary and pharmaceutical fields.

In one embodiment, the present invention provides compositions comprising: a compound of invention and at least one acceptable excipient.

In effecting such treatment and/or control, a compound of the invention can be administered in any form and route which makes the compound bioavailable. The compounds of the invention can be administered by a variety of routes, including orally, in particularly by tablets and capsules. The compounds of the invention can be administered parenteral routes, more particularly by inhalation, subcutaneously, intramuscularly, intravenously, intraarterially, transdermally, intranasally, rectally, vaginally, occularly, topically, sublingually, and buccally, intraperitoneally, intraadiposally, intrathecally and via local delivery for example by catheter or stent. One skilled in the art can readily select the proper form and route of administration depending upon the particular characteristics of the compound selected, the disorder or condition to be treated, the stage of the disorder or condition, and other relevant circumstances. The pharmaceutical compositions of the invention may be administered to the subject, for example, in the form of tablets, capsules, cachets, papers, lozenges, wafers, elixirs, ointments, transdermal patches, aerosols, inhalants, suppositories, drenches, solutions, and suspensions.

The term "acceptable excipient" refers to refers to those typically used in preparing veterinary and pharmaceutical compositions and should be pure and non-toxic in the amounts used. They generally are a solid, semi-solid, or liquid material which in the aggregate can serve as a vehicle or medium for the active ingredient. Some examples of acceptable excipients are found in Remington's Pharmaceutical Sciences and the Handbook of Pharmaceutical Excipients and include diluents, vehicles, carriers, ointment bases, binders, disintegrates, lubricants, glidants, sweetening agents, flavoring agents, gel bases, sustained release matrices, stabilizing agents, preservatives, solvents, suspending agents, buffers, emulsifiers, dyes, propellants, coating agents, and others.

In one embodiment, the composition is adapted for oral administration, such as a tablet or a capsule or a liquid formulation, for example, a solution or suspension, adapted for oral administration. In one embodiment, the composition is adapted for oral administration, such as chewable formulation, adapted for oral administration. In still another embodiment, the composition is a liquid or semi-solid formulation, for example, a solution or suspension or a paste, adapted for parenteral administration.

Particular compositions for usage on subjects in the treatment and/or control of nematodes/helminths comprise solutions; emulsions including classical emulsions, microemulsions and self-emulsifying compositions, that are waterless organic, preferably oily, compositions which form emulsions, together with body fluids, upon addition to the subject's body; suspensions (drenches); pour-on formulations; food additives; powders; tablets including effervescent tablets; boli; capsules including micro-capsules; and chewable treats. Particularly composition forms are tablets, capsules, food additives or chewable treats.

The compositions of the present invention are prepared in a manner well known in the veterinary and pharmaceutical art and include at least one of the compounds of the invention as the active ingredient. The amount of a compound of the present invention may be varied depending upon its particular form and may conveniently be between 1% to about 50% of the weight of the unit dose form. The present pharmaceutical compositions are preferably formulated in a unit dose form, each dose typically containing from about 0.5 mg to about 100 mg of a compounds of the invention. One or more unit dose form(s) may be taken to affect the treatment dosage.

In one embodiment, the present invention also provides a method for treating parasites, comprising: administering to a subject in need thereof an effective amount of a compound of formula (I) or a salt thereof, the method optionally further comprising an effective amount of at least one additional active compound.

In one embodiment, the present invention also provides a method for controlling parasites, comprising: administering to a subject in need thereof an effective amount of a compound of formula (I) or a salt thereof, the method optionally further comprising an effective amount of at least one additional active compound.

In one embodiment, the present invention also provides a method for treating or controlling parasites, comprising: contacting a subject's environment with an effective amount of a compound of formula (I) or a salt thereof, the method optionally further comprising an effective amount of at least one additional active compound.

Thus, the invention provides for the use of the compounds of the invention as a medicament, including for the manufacture of a medicament. In one embodiment, the invention provides the manufacture of a medicament comprising a compound of formula (I) or a salt thereof for treating parasites. In one embodiment, the invention provides the manufacture of a medicament comprising a compound of the invention or a salt thereof for controlling parasites.

The terms "treating", "to treat", "treated", or "treatment", include without limitation restraining, slowing, stopping, reducing, ameliorating, reversing the progression or severity of an existing symptom, or preventing a disorder, condition, or disease. For example, an adult heartworm infection would be treated by administering a compound of the invention. A treatment may be applied or administered therapeutically.

The terms "control", "controlling" or "controlled" refers to include without limitation decreasing, reducing, or ameliorating the risk of a symptom, disorder, condition, or disease, and protecting an animal from a symptom, disorder, condition, or disease.

Controlling may refer to therapeutic, prophylactic, or preventative administration. It is well understood that a larvae or immature heartworm infection may be asymptomatic and infection by mature parasites is symptomatic and/or debilitating. Therefore, for example, a heartworm infection would be controlled by acting on the larvae or immature parasite preventing the infection from progressing to an infection by mature parasites.

Thus, the use of the compounds of the invention in the treatment and/or control of parasites, in particular helminths, in which the endoparasitic nematodes and trematodes refers to the use of the compounds of the invention to act on the various forms of the parasites throughout its life cycle, independent of whether a subject is manifesting a symptom, including morbidity or mortality, and independently of the phase(s) of the parasitic challenge.

As used herein, "administering to a subject" includes but is not limited to cutaneous, subcutaneous, intramuscular, mucosal, submucosal, transdermal, oral or intranasal administration. Administration could include injection or topical administration.

The terms "subject" and "patient" refers includes humans and non-human mammalian animals, such as dogs, cats, mice, rats, guinea pigs, rabbits, ferrets, cows, horses, sheep, goats, and pigs. It is understood that a more particular subject is a human. Also, a more particular subject are mammalian pets or companion animals, such as dogs and cats and also mice, guinea pigs, ferrets, and rabbits.

The term "effective amount" refers to an amount which gives the desired benefit to the subject and includes administration for both treatment and control. The amount will vary from one individual subject to another and will depend upon a number of factors, including the overall physical condition of the subject and the severity of the underlying cause of the condition to be treated, concomitant treatments, and the amount of compound of the invention used to maintain desired response at a beneficial level.

An effective amount can be readily determined by the attending diagnostician, as one skilled in the art, by the use of known techniques and by observing results obtained under analogous circumstances. In determining the effective amount, the dose, a number of factors are considered by the attending diagnostician, including, but not limited to: the species of patient; its size, age, and general health; the specific condition, disorder, infection, or disease involved; the degree of or involvement or the severity of the condition, disorder, or disease, the response of the individual patient; the particular compound administered; the mode of administration; the bioavailability characteristics of the preparation administered; the dose regimen selected; the use of concomitant medication; and other relevant circumstances. An effective amount of the present invention, the treatment dosage, is expected to range from 0.5 mg to 100 mg. Specific amounts can be determined by the skilled person. Although these dosages are based on a subject having a mass of about 1 kg to about 20 kg, the diagnostician will be able to determine the appropriate dose for a subject whose mass falls outside of this weight range. An effective amount of the present invention, the treatment dosage, is expected to range from 0.1 mg/kg to 10 mg/kg of the subject. The dosing regimen is expected to be daily, weekly, or monthly administration.

The compounds of the invention may be combined with one or more other active compounds or therapies for the treatment of one or more disorders, diseases or conditions, including the treatment of parasites, for which it is indicated. The compounds of the invention may be administered simultaneously, sequentially or separately in combination with one or more compounds or therapies for treating parasites and other disorders.

For example, when used to treat parasites, including heartworm, a compound of the invention may be combined with a macrocyclic lactone such as ivermectin, moxidectin, or milbemycin oxime, or with imidacloprid. Particular combinations for treating parasites include a compound of the invention and ivermectin. Another particular combination for treating parasites include a compound of the invention and milbemycin oxime.

Thus, it is understood that the compositions and methods of the present invention optionally include comprising an effective amount of at least one additional active compound.

The activity of compounds as parasiticides may be determined by a variety of methods, including in vitro and in vivo methods.

Example A

Dog Heart Worm Microfilariae

D. immitis microfilariae are isolated by filtration from beagle blood of an infected donor and allowed to incubate in appropriate media. Test compounds are diluted in DMSO and added to a 96-well plate containing parasites. Plates are incubated for the desired time and motility is assessed using an LCD camera imaging system. Effect of serum is tested by addition of up to 20% fetal bovine serum in the assay. Percent motility inhibition values are generated relative to the average of the DMSO-only wells.

In this test for example, the following compounds from the preparation examples showed $EC_{50}$<0.1 μg/mL: 2.1, 2.2, 2.3, 2.4, 2.5, 2.6, 2.7, 2.8, 3.1, 3.2, 3.3, 3.4, 4.1, 5.1, 5.2, 5.3, 5.4, 5.6, 5.7, 5.8, 5.10, 5.11, 5.12, 5.13, 5.14, 5.15, 5.16, 5.17, 5.18, 5.19, 5.20, 5.21, 5.22, 5.23, 5.23, 5.24, 6.1, and 7.1.

Example B1

Ruminant Gastrointestinal (H. contortus Larval Development Assay (Hc LDA)):

H.c. eggs isolated from lamb fecal matter are allowed to hatch overnight. Test compounds are diluted in DMSO and added to a 96-well plate containing appropriate media. H.c. larvae are added to each well and plates are incubated for the desired time(s). Motility is assessed using an LCD camera imaging system. Percent motility inhibition values are generated relative to the average of the DMSO-only wells.

In this test for example, the following compounds from the preparation examples showed $EC_{50}$<1 μg/mL: 2.1, 2.2, 2.3, 2.4, 2.5, 2.6, 2.8, 3.1, 3.2, 3.3, 3.4, 4.1, 5.1, 5.2, 5.3, 5.4, 5.6, 5.7, 5.8, 5.11, 5.12, 5.13, 5.14, 5.15, 5.16, 5.17, 5.18, 5.19, 5.20, 5.21, 5.22, 5.23, 5.23, 5.24, 6.1, and 7.1.

Example B2

Other Nematodes In Vitro

Caenorhabditis elegans (Ce): C. elegans development assay (Ce DA) measures the effect of compounds on developing nematodes. Eggs of C. elegans are deposited in a 384 well plate together with food (E. coli) and the treatment formulated in DMSO. Plates are incubated at 25° C. for 48 h to allow the development of nematodes up to the L4-stage. The effect of compounds is measured as motility reduction. Efficacy is expressed in % motility reduction compared to negative controls.

In this test for example, the following compounds from the preparation examples showed $EC_{90}$<1 μg/mL: 5.23, 5.35, 5.36, 5.41, 5.45, 5.47, 5.48, 5.49, 5.54, 5.55, 5.56, 5.57, 5.58, 5.59, 5.60, 5.61, 5.62, 5.63.

Example C

Gastro Intestinal Nematodes

Jirds (Meriones unguiculatus), are artificially infected by gavage with third instar larvae each of T. colubriformis and H. contortus. Then treated orally with the test compound formulated in eg DMSO/PEG 2/1, on Day 6 after infection at a dose in a range between 1×3 mg/kg up to 1×32 mg/kg. Three days after treatment, gerbils are euthanized and dissected to recover H. contortus from stomach and T. colubriformis from the small intestine. Efficacy is expressed as a % reduction in worm numbers in comparison with a placebo treated group, using the Abbot's formula.

The compound of examples 3.3, 5.2, 5.3, 5.4, 5.19, 5.23 and 5.47 were >80% effective against He and Tc. The compound of examples 3.1, 2.3 and 5.6 were >80% effective against Hc.

Example D

Filarial Nematodes

Av model: Gerbils, injected subcutaneously with infective A. viteae larvae, were subsequently treated with the test article formulated in eg DMSO/PEG 2/1, by oral gavage at a dose in a range between 1×3 mg/kg up to 5×32 mg/kg (one dose per day for 5 consecutive days). At necropsy 12 weeks after infection, efficacy is expressed as a % reduction in worm numbers in comparison with the placebo treated group, using the Abbot's formula.

The compound of examples 2.6, 3.4, 5.4, 5.6, 5.7, 5.8, 5.19 and 5.20 were >80% effective against Av.

Example E

L.s. Model

Mice (BALB/c) were experimentally infected with 3rd stage larvae of L. sigmodontis, either by subcutaneous injection or by exposure to infected mites. Treatment was done with test article formulated in DMSO/PEG at a ratio 2/1, by oral gavage or subcutaneous injection at a dose in a range between 1×3 mg/kg (single dose) up to 5×32 mg/kg (one dose per day for 5 consecutive days). At necropsy 35 to 37 days after infection, worms are counted in the peritoneum and the pleural cavity. Efficacy is expressed as % reduction in worm numbers in comparison with the placebo treated group, using the Abbot's formula. The compound of examples 3.3, 5.3, 5.41, 5.47, 5.48 and 5.56 were >80% effective against L.s.

We claim:
1. A compound of formula (I):

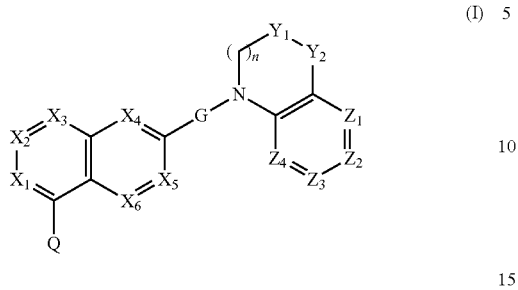

wherein
n is 0 or 1;
$X_1$ is selected from the group consisting of N and $CR_1$;
$X_2$ is selected from the group consisting of N and $CR_2$;
$X_5$ is selected from the group consisting of N and $CR_3$;
$X_4$ is selected from the group consisting of N and $CR_4$;
$X_5$ is selected from the group consisting of N and $CR_5$;
$X_5$ is selected from the group consisting of N and $CR_6$;
G is selected from the group consisting of

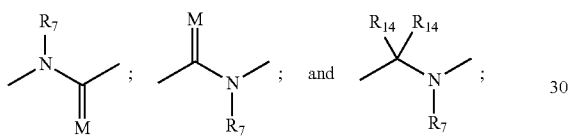

M is selected from the group consisting of N—$R_{13}$, O, and S;
$Y_1$ is selected from the group consisting of $CR_8R_9$, O, S, and $NR_{10}$;
$Y_2$ is selected from the group consisting of $CR_8R_9$, O, S, and $NR_{10}$;
wherein at least one of the groups $Y_1$ or $Y_2$ is $CR_8R_9$;
$Z_1$ is selected from the group consisting of N, O, S, and $CR_{11}$;
$Z_2$ is selected from the group consisting of nil, N, and $CR_{11}$;
$Z_3$ is selected from the group consisting of nil, N and $CR_{11}$;
$Z_4$ is selected from the group consisting of N, O, S, and $CR_{11}$;
wherein no more than 2 of $Z_1$, $Z_2$, $Z_3$, and $Z_4$ are N and wherein only one of $Z_1$ and $Z_4$ is O or S, $Z_2$ is nil only when $Z_1$ is O or S, and $Z_3$ is nil only when $Z_4$ is O or S;
$R_1$ is selected from the group consisting of hydrogen, halogen, hydroxyl, —SH, —$SC_1$-$C_4$ alkyl, —S(O)($C_1$-$C_4$ alkyl), —S(O)$_2$($C_1$-$C_4$ alkyl), cyano, $C_1$-$C_4$ alkyl, $C_1$-$C_4$ halogenalkyl, $C_1$-$C_4$-alkoxy, —B(O$R_{15}$)(O$R_{16}$) wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —NH($C_1$-$C_4$ alkyl), and —N($C_1$-$C_4$ alkyl)$_2$;
$R_2$ is selected from the group consisting of hydrogen, halogen, hydroxyl, —SH, —$SC_1$-$C_4$ alkyl, —S(O)($C_1$-$C_4$ alkyl), —S(O)$_2$($C_1$-$C_4$ alkyl), cyano, $C_1$-$C_4$ alkyl, $C_1$-$C_4$ halogenoalkyl, $C_1$-$C_4$-alkoxy, —B(O$R_{15}$)(O$R_{16}$) wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —NH($C_1$-$C_4$ alkyl), and —N($C_1$-$C_4$ alkyl)$_2$;
$R_3$ is selected from the group consisting of hydrogen, halogen, hydroxyl, —SH, —$SC_1$-$C_4$ alkyl, —S(O)($C_1$-$C_4$ alkyl), —S(O)$_2$($C_1$-$C_4$ alkyl), cyano, $C_1$-$C_4$ alkyl, $C_1$-$C_4$ halogenoalkyl, $C_1$-$C_4$-alkoxy, —B(O$R_{15}$)(O$R_{16}$) wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —NH($C_1$-$C_4$ alkyl), and —N($C_1$-$C_4$ alkyl)$_2$;
$R_4$ is selected from the group consisting of halogen, cyano, —CHO, hydroxyl, $C_1$-$C_4$ alkyl, $C_2$-$C_4$ alkenyl, $C_2$-$C_4$ alkynyl, $C_3$-$C_6$ cycloalkyl, $C_1$-$C_4$ halogenoalkyl, $C_1$-$C_4$-alkoxy substituted-$C_1$-$C_4$ alkyl, benzyl optionally substituted with 1 to 5 halogen atoms, $C_1$-$C_4$ alkoxy, —$NH_2$, —NH($C_1$-$C_4$ alkyl), —N($C_1$-$C_4$ alkyl)$_2$, —NH($C_3$-$C_6$ cycloalkyl), —N($C_1$-$C_4$ alkyl)($C_3$-$C_6$-cycloalkyl), —N($C_1$-$C_4$ alkyl)(4- to 7-membered heterocycloalkyl), —NH (4- to 7-membered heterocycloalkyl), —N($C_1$-$C_4$ alkyl)($C_1$-$C_4$ alkoxy), —C(O)NH($C_1$-$C_4$ alkyl), —C(O)N($C_1$-$C_4$ alkyl)$_2$, —C(O)N($C_1$-$C_4$ alkyl)(4- to 7-membered heterocycloalkyl), —NHSO$_2$($C_1$-$C_4$ alkyl), —$SC_1$-$C_4$ alkyl, —S(O)$C_1$-$C_4$ alkyl, —SO$_2$$C_1$-$C_4$ alkyl, —B(O$R_{15}$)(O$R_{16}$) wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; 6- or 10 membered aryl; a monocyclic heterocycle selected from the group consisting of 4- to 7-membered heterocycloalkyl, 5-membered heteroaryl having at least one nitrogen atom via which the 5-membered heteroaryl ring is connected to the rest of the molecule, and 6-membered heteroaryl having at least one nitrogen atom; each of the aryl, heterocycloalkyl, and heteroaryl rings in $R_4$ is optionally substituted with 1, 2 or 3 substituents independently selected from the group consisting of halogen, cyano, nitro, hydroxy, oxo, $C_1$-$C_4$ alkyl, $C_3$-$C_6$ cycloalkyl, $C_1$-$C_4$ halogenoalkyl, $C_1$-$C_4$ alkoxy,
—$NH_2$, —NH($C_1$-$C_4$ alkyl), —N($C_1$-$C_4$ alkyl)$_2$, —NH ($C_3$-$C_6$ cycloalkyl), —N($C_1$-$C_4$ alkyl)($C_3$-$C_6$-cycloalkyl), —NHSO$_2$($C_1$-$C_4$ alkyl), —$SC_1$-$C_4$ alkyl, —S(O)$C_1$-$C_4$ alkyl, —SO$_2$$C_1$-$C_4$ alkyl, —S(O)$C_1$-$C_4$-halogenoalkyl and —SO$_2$$C_1$-$C_4$ halogenoalkyl; wherein the $C_3$-$C_6$ cycloalkyl and the heterocycloalkyl rings in $R_4$ are optionally substituted with a spiro group, wherein said spiro group is a 3- to 6-membered cycloalkyl or 4- to 6-membered heterocycloalkyl containing 1, 2, or 3 heteroatoms independently selected from the group consisting of N, S and O, wherein said spiro group is optionally substituted with 1, 2 or 3 substituents independently selected from the group consisting of halogen, cyano, nitro, hydroxy, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —NH($C_1$-$C_4$ alkyl), —N($C_1$-$C_4$ alkyl)$_2$, —NH($C_3$-$C_6$ cycloalkyl), —N($C_1$-$C_4$ alkyl)($C_3$-$C_6$-cycloalkyl), —$NHSO_2$($C_1$-$C_4$ alkyl), —$SC_1$-$C_4$ alkyl, —S(O)$C_1$-$C_4$ alkyl, —$SO_2C_1$-$C_4$ alkyl, —S(O)$C_1$-$C_4$-halogenoalkyl and —$SO_2C_1$-$C_4$ halogenoalkyl; and wherein each $C_1$-$C_4$ alkyl, $C_3$-$C_6$ cycloalkyl and $C_1$-$C_4$ alkoxy in $R_4$ may be optionally substituted with 1, 2 or 3 substituents independently selected from the group consisting of halogen, hydroxy, $NH_2$, —NH($C_1$-$C_4$ alkyl), —N($C_1$-$C_4$ alkyl)$_2$, cyano, carboxy, carbamoyl, $C_1$-$C_4$ alkoxycarbonyl, —C(O)NH($C_1$-$C_4$ alkyl), —C(O)N($C_1$-$C_4$ alkyl)$_2$, and $C_1$-$C_4$ alkoxy;

$R_5$ is selected from the group consisting of hydrogen, halogen, hydroxyl, —SH, —$SC_1$-$C_4$ alkyl, —S(O)($C_1$-$C_4$ alkyl), —S(O)$_2$($C_1$-$C_4$ alkyl), cyano, $C_1$-$C_4$ alkyl, $C_1$-$C_4$ halogenoalkyl, $C_1$-$C_4$-alkoxy, —B($OR_{15}$)($OR_{16}$) wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —NH($C_1$-$C_4$ alkyl), and —N($C_1$-$C_4$ alkyl)$_2$;

$R_6$ is selected from the group consisting of hydrogen, halogen, hydroxyl, —SH, —$SC_1$-$C_4$ alkyl, —S(O)($C_1$-$C_4$ alkyl), —S(O)$_2$($C_1$-$C_4$ alkyl), cyano, $C_1$-$C_4$ alkyl, $C_1$-$C_4$ halogenoalkyl, $C_1$-$C_4$-alkoxy, —B($OR_{15}$)($OR_{16}$) wherein $R_{15}$ is, each time taken, selected from the group consisting of hydrogen, $C_1$-$C_4$ alkyl, and $C_3$-$C_6$ cycloalkyl, $R_{16}$ is, each time taken, selected from the group consisting of hydrogen, $C_1$-$C_4$ alkyl, and $C_3$-$C_6$ cycloalkyl, or $R_{15}$ and $R_{16}$ together with the oxygen atoms to which they are attached form a 5- to 7-membered ring which is optionally substituted with 1 to 4 $C_1$-$C_4$ alkyl; —$NH_2$, —NH($C_1$-$C_4$ alkyl), and —N($C_1$-$C_4$ alkyl)$_2$;

$R_7$ is selected from the group consisting of hydrogen, $C_1$-$C_4$ alkyl, and $C_3$-$C_6$ cycloalkyl optionally substituted with 1 to 5 halogen atoms, —C(H)O, $C_2$-$C_4$ alkenyl, $C_2$-$C_4$ alkynyl, $C_1$-$C_4$ halogenoalkyl, and $C_1$-$C_4$-alkoxy;

$R_8$ is, each time selected, independently selected from the group consisting of hydrogen, fluoro, and $C_1$-$C_4$ alkyl;

$R_9$ is, each time selected, independently selected from the group consisting of hydrogen, fluoro, and $C_1$-$C_4$ alkyl;

$R_{10}$ is selected from the group consisting of hydrogen and $C_1$-$C_4$ alkyl;

$R_{11}$ is, each time selected, independently selected from the group consisting of hydrogen, halogen, hydroxyl, cyano, $C_1$-$C_4$ alkyl, $C_1$-$C_4$ halogenoalkyl, $C_1$-$C_4$-alkoxy, $C_3$-$C_6$ cycloalkyl, —$NH_2$, —NH($C_1$-$C_4$ alkyl), and —N($C_1$-$C_4$ alkyl)$_2$;

Q is selected from the group consisting of (i) 6- or 10 membered aryl optionally substituted with 1, 2, 3, 4, or 5 substituents independently selected from the group consisting of halogen, cyano, nitro, hydroxyl, $C_1$-$C_4$ alkyl, $C_1$-$C_4$ halogenoalkyl, $C_1$-$C_4$ alkoxy, $C_3$-$C_6$ cycloalkyl, —$NH_2$, —NH($C_1$-$C_4$ alkyl), —N($C_1$-$C_4$ alkyl)$_2$, —NH($C_3$-$C_6$ cycloalkyl), —N($C_1$-$C_4$ alkyl)($C_3$-$C_6$-cycloalkyl), —$NHSO_2$($C_1$-$C_4$ alkyl), —$SC_1$-$C_4$ alkyl, —S(O)$C_1$-$C_4$ alkyl, —$SO_2C_1$-$C_4$ alkyl, —S(O)$C_1$-$C_4$-halogenoalkyl and —$SO_2C_1$-$C_4$ halogenoalkyl, wherein the 6- or 10 membered aryl is optionally fused with a 4- to 7-membered heterocycloalkyl having 1 or 2 heteroatoms selected from the group consisting of O, S, and N and wherein the carbons of the heterocycloalkyl are optionally substituted with 1, 2 or 3 substituents independently selected from the group halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —NH($C_1$-$C_4$ alkyl), and —N($C_1$-$C_4$ alkyl)$_2$ and any N in the heterocycloalkyl is, valency permitting, substituted with a substituent selected from the group consisting of hydrogen, $C_1$-$C_4$ alkyl, and $C_3$-$C_6$ cycloalkyl;

(ii) 5- to 10-membered heteroaryl having 1, 2, or 3 heteroatoms independently selected from the group consisting of O, S, and N and wherein the carbons of the 5- to 10-membered heteroaryl are optionally substituted with 1, 2, 3, 4, or 5 substituents independently selected from the group consisting of halogen, cyano, nitro, hydroxyl, $C_1$-$C_4$ alkyl, $C_3$-$C_6$ cycloalkyl, $C_1$-$C_4$ halogenoalkyl, $C_1$-$C_4$ alkoxy, benzyloxy, —$NH_2$, —NH($C_1$-$C_4$ alkyl), —N($C_1$-$C_4$ alkyl)$_2$, —$SC_1$-$C_4$ alkyl, —S(O)$C_1$-$C_4$ alkyl, —$SO_2C_1$-$C_4$ alkyl, —S(O)$C_1$-$C_4$-halogenoalkyl and —$SO_2C_1$-$C_4$ halogenoalkyl, and any N in the heteroaryl, valency permitting, is optionally substituted with a substituent selected from the group consisting of hydrogen, $C_1$-$C_4$ alkyl, and $C_3$-$C_6$ cycloalkyl;

(iii) 4- to 7-membered heterocycloalkyl having 1, 2, or 3 heteroatoms independently selected from the group consisting of O, S, and N, wherein the heterocycloalkyl is optionally benzo-fused, wherein the carbons of the 4- to 7-membered heterocycloalkyl or optionally benzo-fused 4- to 7-membered heterocycloalkyl are optionally substituted with 1, 2, 3, or 4 substituents independently selected from the group consisting of halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —NH($C_1$-$C_4$ alkyl), and —N($C_1$-$C_4$ alkyl)$_2$ and any N in the heterocycloalkyl is optionally substituted with a substituent selected from the group consisting of hydrogen, $C_1$-$C_4$ alkyl, and $C_3$-$C_6$ cycloalkyl;

(iv) 6- or 10 membered aryloxy optionally substituted with 1, 2 or 3 substituents independently selected from the group consisting of halogen, cyano, nitro, hydroxyl, $C_1$-$C_4$ alkyl, $C_3$-$C_6$ cycloalkyl, $C_1$-$C_4$ halogenoalkyl, $C_1$-$C_4$ alkoxy, —$NH_2$, —NH($C_1$-$C_4$ alkyl), —N($C_1$-$C_4$ alkyl)$_2$, —NH($C_3$-$C_6$ cycloalkyl), —N($C_1$-$C_4$ alkyl)($C_3$-$C_6$-cycloalkyl), —$NHSO_2$($C_1$-$C_4$ alkyl), —$SC_1$-$C_4$ alkyl, —S(O)$C_1$-$C_4$ alkyl, —$SO_2C_1$-$C_4$ alkyl, —S(O)$C_1$-$C_4$-halogenoalkyl and —$SO_2C_1$-$C_4$ halogenoalkyl;

(v) 6- or 10 membered arylthio-oxy optionally substituted with 1, 2 or 3 substituents independently selected from the group consisting of halogen, cyano, nitro, hydroxyl, $C_1$-$C_4$ alkyl, $C_3$-$C_6$ cycloalkyl, $C_1$-$C_4$ halogenoalkyl, $C_1$-$C_4$ alkoxy, —$NH_2$, —NH($C_1$-$C_4$ alkyl), —N($C_1$-$C_4$ alkyl)$_2$, —NH($C_3$-$C_6$ cycloalkyl), —N($C_1$-$C_4$ alkyl)($C_3$-$C_6$-cycloalkyl), —NHSO$_2$(C$_1$-C$_4$ alkyl), —SC$_1$-C$_4$ alkyl, —S(O)C$_1$-C$_4$ alkyl, —SO$_2$C$_1$-C$_4$ alkyl, —S(O)C$_1$-C$_4$-halogenoalkyl and —SO$_2$C$_1$-C$_4$ halogenoalkyl; and (vi) 5- to 10-membered heteroaryloxy optionally substituted with 1, 2 or 3 substituents independently selected from the group consisting of halogen, cyano, nitro, hydroxyl, oxo, C$_1$-C$_4$ alkyl, C$_3$-C$_6$ cycloalkyl, C$_1$-C$_4$ halogenoalkyl, C$_1$-C$_4$ alkoxy, —NH$_2$, —NH(C$_1$-C$_4$ alkyl), —N(C$_1$-C$_4$ alkyl)$_2$, —NH(C$_3$-C$_6$ cycloalkyl), —N(C$_1$-C$_4$ alkyl)(C$_3$-C$_6$-cycloalkyl), —NHSO$_2$(C$_1$-C$_4$ alkyl), —SC$_1$-C$_4$ alkyl, —S(O)C$_1$-C$_4$ alkyl, —SO$_2$C$_1$-C$_4$ alkyl, —S(O)C$_1$-C$_4$-halogenoalkyl and —SO$_2$C$_1$-C$_4$ halogenoalkyl;

R$_{13}$ is selected from the group consisting of hydroxy, C$_1$-C$_4$ alkoxy, and —NH$_2$; and R$_{14}$ is, each time selected, independently selected from the group consisting of hydrogen, halogen, cyano, nitro, hydroxyl, C$_1$-C$_4$ alkyl, C$_3$-C$_6$ cycloalkyl, C$_1$-C$_4$ halogenoalkyl, C$_1$-C$_4$ alkoxy, C$_1$-C$_4$ halogenalkoxy, —NH$_2$, —NH(C$_1$-C$_4$ alkyl), and —N(C$_1$-C$_4$ alkyl)$_2$;

or a salt thereof.

2. The compound according to claim 1 wherein X$_1$ is CR$_1$; X$_2$ is CR$_2$; X$_3$ is CR$_3$; X$_4$ is CR$_4$; X$_5$ is CR$_5$; and X$_5$ is N; or a salt thereof.

3. The compound according to claim 1 wherein X$_1$ is CR$_1$; X$_2$ is CR$_2$; X$_3$ is CR$_3$; X$_4$ is CR$_4$; X$_5$ is N; and X$_5$ is N; or a salt thereof.

4. The compound according to claim 1 wherein X$_1$ is CR$_1$; X$_2$ is CR$_2$; X$_5$ is CR$_3$; X$_4$ is CR$_4$; X$_5$ is N; and X$_5$ is CR$_6$; or a salt thereof.

5. The compound according to claim 1 wherein
Q is a 6- or 10 membered aryl optionally substituted with 1, 2 or 3 substituents independently selected from the group consisting of halogen, cyano, nitro, hydroxy, C$_1$-C$_4$ alkyl, C$_1$-C$_4$ halogenoalkyl, C$_1$-C$_4$ alkoxy, C$_3$-C$_6$ cycloalkyl, —NH$_2$, —NH(C$_1$-C$_4$ alkyl), —N(C$_1$-C$_4$ alkyl)$_2$, —NH(C$_3$-C$_6$ cycloalkyl), —N(C$_1$-C$_4$ alkyl)(C$_3$-C$_6$-cycloalkyl), —NHSO$_2$(C$_1$-C$_4$ alkyl), —SC$_1$-C$_4$ alkyl, —S(O)C$_1$-C$_4$ alkyl, —SO$_2$C$_1$-C$_4$ alkyl, —S(O)C$_1$-C$_4$-halogenoalkyl and —SO$_2$C$_1$-C$_4$ halogenoalkyl;
or a salt thereof.

6. The compound according to claim 1 wherein
Q is 6-membered aryl optionally substituted with 1, 2 or 3 substituents independently selected from the group consisting of halogen, cyano, nitro, hydroxy, C$_1$-C$_4$ alkyl, C$_1$-C$_4$ halogenoalkyl, C$_1$-C$_4$ alkoxy, C$_3$-C$_6$ cycloalkyl, —NH$_2$, —NH(C$_1$-C$_4$ alkyl), —N(C$_1$-C$_4$ alkyl)$_2$, —NH(C$_3$-C$_6$ cycloalkyl), —N(C$_1$-C$_4$ alkyl)(C$_3$-C$_6$-cycloalkyl), —NHSO$_2$(C$_1$-C$_4$ alkyl), —SC$_1$-C$_4$ alkyl, —S(O)C$_1$-C$_4$ alkyl, —SO$_2$C$_1$-C$_4$ alkyl, —S(O)C$_1$-C$_4$-halogenoalkyl and —SO$_2$C$_1$-C$_4$ halogenoalkyl, wherein the 6-membered aryl is fused with a 4- to 7-membered heterocycloalkyl having 1 or 2 heteroatoms selected from the group consisting of O, S, and N and wherein the carbons of the heterocycloalkyl are optionally substituted with 1, 2 or 3 substituents independently selected from the group consisting of halogen, cyano, nitro, hydroxy, oxo, C$_1$-C$_4$ alkyl, C$_3$-C$_6$ cycloalkyl, C$_1$-C$_4$ halogenoalkyl, C$_1$-C$_4$ alkoxy, —NH$_2$, —NH(C$_1$-C$_4$ alkyl), and —N(C$_1$-C$_4$ alkyl)$_2$ and any N in the heterocyclalkyl is substituted with a substituent selected from the group consisting of hydrogen, C$_1$-C$_4$ alkyl, and C$_3$-C$_6$ cycloalkyl;
or a salt thereof.

7. The compound according to claim 1 wherein
Q is a 5- to 10-membered heteroaryl having 1 or 2 heteroatoms selected from the group consisting of O, S, and N and wherein the carbons of the heteroaryl are optionally substituted with 1, 2 or 3 substituents independently selected from the group consisting of halogen, cyano, nitro, —OH, C$_1$-C$_4$ alkyl, C$_3$-C$_6$ cycloalkyl, C$_1$-C$_4$ halogenoalkyl, C$_1$-C$_4$ alkoxy, —NH$_2$, —NH(C$_1$-C$_4$ alkyl), and —N(C$_1$-C$_4$ alkyl)$_2$ and any N in the heteroaryl is optionally substituted with a substituent selected from the group consisting of hydrogen, C$_1$-C$_4$ alkyl, and C$_3$-C$_6$ cycloalkyl;
or a salt thereof.

8. The compound according to claim 1 wherein
Q is a 4- to 7-membered heterocycloalkyl having 1 or 2 heteroatoms selected from the group consisting of O, S, and N, wherein the heterocycloalkyl is optionally benzo-fused, wherein the carbons of the heterocycloalkyl or optionally benzo-fused heterocycloalkyl are optionally substituted with 1, 2, 3, or 4 substituents independently selected from the group consisting of halogen, cyano, nitro, hydroxy, oxo, C$_1$-C$_4$ alkyl, C$_3$-C$_6$ cycloalkyl, C$_1$-C$_4$ halogenoalkyl, C$_1$-C$_4$ alkoxy, —NH$_2$, —NH(C$_1$-C$_4$ alkyl), and —N(C$_1$-C$_4$ alkyl)$_2$ and any N in the heterocyclalkyl is optionally substituted with a substituent selected from the group consisting of hydrogen, C$_1$-C$_4$ alkyl, and C$_3$-C$_6$ cycloalkyl;
or a salt thereof.

9. The compound according to claim 1 wherein n is 1; or a salt thereof.

10. The compound according to claim 1 wherein Y$_1$ is CR$_8$R$_9$ and Y$_2$ is O; or a salt thereof.

11. The compound according to claim 1 wherein R$_4$ is selected from the group consisting of C$_1$-C$_4$ alkyl, C$_3$-C$_6$ cycloalkyl, —N(C$_1$-C$_4$ alkyl)$_2$, and 4- to 7-membered heterocycloalkyl; or a salt thereof.

12. The compound according to claim 1 wherein
G is

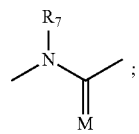

and
M is O;
or a salt thereof.

13. The compound according to claim 1 wherein
G is

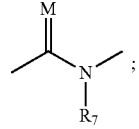

and
M is O;
or a salt thereof.

14. The compound of formula (I) according to claim 1, or a salt thereof, having formula (Ia-5),

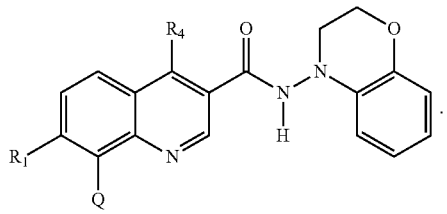

(Ia-5)

15. The compound of formula (Ia-5) according to claim 14, or a salt thereof, wherein $R_1$ is hydrogen, halogen, or cyano.

16. The compound of formula (Ia-5) according to claim 14, or a salt thereof, wherein $R_1$ is hydrogen or fluoro.

17. The compound of formula (Ia-5) according to claim 14, or a salt thereof, wherein $R_4$ is 4-morpholino or dimethylamino.

18. The compound of formula (Ia-5) according to claim 14, or a salt thereof, wherein Q is a 6- to 10-membered aryl optionally substituted with 1, 2, 3, 4, or 5 substituents independently selected from the group consisting of halogen, cyano, nitro, hydroxyl, $C_1$-$C_4$ alkyl, $C_1$-$C_4$ halogenoalkyl, $C_1$-$C_4$ alkoxy, $C_3$-$C_6$ cycloalkyl, —$NH_2$, —$NH(C_1$-$C_4$ alkyl), —$N(C_1$-$C_4$ alkyl)$_2$, —$NH(C_3$-$C_6$ cycloalkyl), —$N(C_1$-$C_4$ alkyl)($C_3$-$C_6$-cycloalkyl), —$NHSO_2(C_1$-$C_4$ alkyl), —$SC_1$-$C_4$ alkyl, —$S(O)C_1$-$C_4$ alkyl, —$SO_2C_1$-$C_4$ alkyl, —$S(O)C_1$-$C_4$-halogenoalkyl and —$SO_2C_1$-$C_4$ halogenoalkyl, wherein the 6- or 10 membered aryl is optionally fused with a 4- to 7-membered heterocycloalkyl having 1 or 2 heteroatoms selected from the group consisting of O, S, and N and wherein the carbons of the heterocycloalkyl are optionally substituted with 1, 2 or 3 substituents independently selected from the group consisting of halogen, cyano, nitro, hydroxyl, oxo, $C_1$-$C_4$ alkyl, $C_3$-$C_6$ cycloalkyl, $C_1$-$C_4$ halogenoalkyl, $C_1$-$C_4$ alkoxy, —$NH_2$, —$NH(C_1$-$C_4$ alkyl), and —$N(C_1$-$C_4$ alkyl)$_2$ and any N in the heterocycloalkyl is, valency permitting, substituted with a substituent selected from the group consisting of hydrogen, $C_1$-$C_4$ alkyl, and $C_3$-$C_6$ cycloalkyl.

19. The compound of formula (Ia-5) according to claim 14, or a salt thereof, wherein Q is selected from the group consisting of:

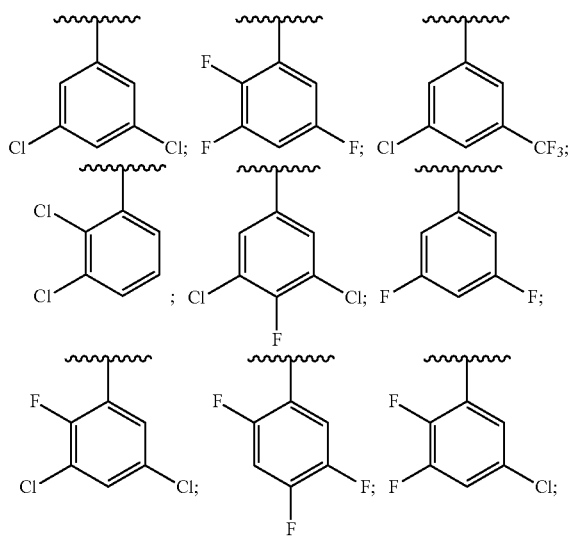

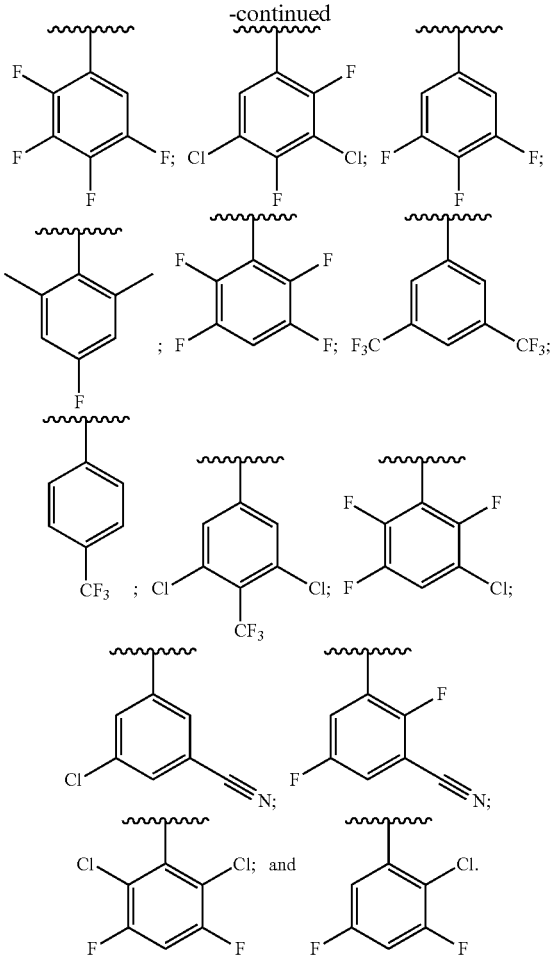

20. The compound of claim 1 selected from the group consisting of:

N-[8-(3,5-dichlorophenyl)-4-(dimethylamino)-3-quinolyl]-2,3-dihydro-1,4-benzoxazine-4-carboxamide; (Example 1.1)

8-(3,5-dichlorophenyl)-N-(2,3-dihydro-1,4-benzoxazin-4-yl)-4-(dimethylamino)-1,7-naphthyridine-3-carboxamide; (Example 2.1)

8-(3,5-dichlorophenyl)-N-(3,4-dihydro-2H-quinolin-1-yl)-4-(dimethylamino)-1,7-naphthyridine-3-carboxamide; (Example 2.2)

8-(3,5-dichlorophenyl)-N-(2,3-dihydro-1,4-benzoxazin-4-yl)-4-morpholino-1,7-naphthyridine-3-carboxamide; (Example 2.3)

8-(3,5-dichlorophenyl)-N-(2,3-dihydro-1,4-benzoxazin-4-yl)-4-(dimethylamino)-1,5-naphthyridine-3-carboxamide; (Example 3.1)

5-(3,5-dichlorophenyl)-N-(2,3-dihydro-1,4-benzoxazin-4-yl)-1-(dimethylamino)naphthalene-2-carboxamide; (Example 4.1) and 8-(3,5-dichlorophenyl)-N-(2,3-dihydro-4H-benzo[b][1,4]oxazin-4-yl)-4-(dimethylamino)quinoline-3-carboxamide; (Example 5.1)

or a salt of any of the foregoing compounds.

21. The compound of claim 1 selected from the group consisting of:

N-(2,3-dihydro-1,4-benzoxazin-4-yl)-4-morpholino-8-(2,3,5-trifluorophenyl)-1,7-naphthyridine-3-carboxamide; (Example 2.4)

N-(2,3-dihydro-1,4-benzoxazin-4-yl)-4-[methoxy(methyl)amino]-8-(2,3,5-trifluorophenyl)-1,7-naphthyridine-3-carboxamide; (Example 2.5)
8-[3-chloro-5-(trifluoromethyl)phenyl]-N-(2,3-dihydro-1,4-benzoxazin-4-yl)-4-morpholino-1,7-naphthyridine-3-carboxamide; (Example 2.6)
N-(2,3-dihydro-1,4-benzoxazin-4-yl)-4-morpholino-8-(2,3-dichlorophenyl)-1,7-naphthyridine-3-carboxamide; (Example 2.7)
8-(3,5-dichloro-4-fluoro-phenyl)-N-(2,3-dihydro-1,4-benzoxazin-4-yl)-4-morpholino-1,7-naphthyridine-3-carboxamide; (Example 2.8)
8-(5-chloro-3-pyridyl)-N-(2,3-dihydro-1,4-benzoxazin-4-yl)-4-morpholino-1,7-naphthyridine-3-carboxamide; (Example 2.9)
N-(2,3-dihydro-1,4-benzoxazin-4-yl)-4-thiomorpholino-8-(2,3,5-trifluorophenyl)-1,7-naphthyridine-3-carboxamide; (Example 2.10)
N-(2,3-dihydro-1,4-benzoxazin-4-yl)-4-(1,1-dioxo-1,4-thiazinan-4-yl)-8-(2,3,5-trifluorophenyl)-1,7-naphthyridine-3-carboxamide; (Example 2.11)
N-(2,3-dihydro-1,4-benzoxazin-4-yl)-4-morpholino-8-(3,4,5-trifluorophenyl)-1,7-naphthyridine-3-carboxamide; (Example 2.12)
8-(2,3-dichlorophenyl)-N-(2,3-dihydro-1,4-benzoxazin-4-yl)-4-(dimethylamino)-1,5-naphthyridine-3-carboxamide; (Example 3.2)
8-(3,5-dichlorophenyl)-N-(2,3-dihydro-1,4-benzoxazin-4-yl)-4-morpholino-1,5-naphthyridine-3-carboxamide; (Example 3.3)
N-(2,3-dihydro-1,4-benzoxazin-4-yl)-4-morpholino-8-(2,3,5-trifluorophenyl)-1,5-naphthyridine-3-carboxamide; (Example 3.4)
8-(2,3-dichlorophenyl)-N-(2,3-dihydro-1,4-benzoxazin-4-yl)-4-morpholino-quinoline-3-carboxamide; (Example 5.2)
8-(3,5-dichlorophenyl)-N-(2,3-dihydro-1,4-benzoxazin-4-yl)-4-morpholino-quinoline-3-carboxamide; (Example 5.3)
N-(2,3-dihydro-1,4-benzoxazin-4-yl)-7-fluoro-4-morpholino-8-(2,3,5-trifluorophenyl)quinoline-3-carboxamide; (Example 5.4)
8-(5-chloro-3-pyridyl)-N-(2,3-dihydro-1,4-benzoxazin-4-yl)-4-morpholino-quinoline-3-carboxamide; (Example 5.5)
N-(2,3-dihydro-1,4-benzoxazin-4-yl)-4-morpholino-8-(2,3,5-trifluorophenyl)quinoline-3-carboxamide; (Example 5.6)
8-(3,5-dichlorophenyl)-N-(2,3-dihydro-1,4-benzoxazin-4-yl)-7-fluoro-4-morpholino-quinoline-3-carboxamide; (Example 5.7)
8-(3,5-difluorophenyl)-N-(2,3-dihydro-1,4-benzoxazin-4-yl)-7-fluoro-4-morpholino-quinoline-3-carboxamide; (Example 5.8)
N-(2,3-dihydro-1,4-benzoxazin-4-yl)-4-morpholino-8-pyrimidin-5-yl-quinoline-3-carboxamide; (Example 5.9)
N-(2,3-dihydro-1,4-benzoxazin-4-yl)-4-thiomorpholino-8-(2,3,5-trifluorophenyl)quinoline-3-carboxamide; (Example 5.10)
8-[2-chloro-6-(trifluoromethyl)-4-pyridyl]-N-(2,3-dihydro-1,4-benzoxazin-4-yl)-4-morpholino-quinoline-3-carboxamide; (Example 5.11)
8-(2,6-dichloro-4-pyridyl)-N-(2,3-dihydro-1,4-benzoxazin-4-yl)-4-morpholino-quinoline-3-carboxamide; (Example 5.12)
8-(3,5-dichloro-2-fluoro-phenyl)-N-(2,3-dihydro-1,4-benzoxazin-4-yl)-4-morpholino-quinoline-3-carboxamide; (Example 5.13)
8-(5-chloro-2-fluoro-3-pyridyl)-N-(2,3-dihydro-1,4-benzoxazin-4-yl)-4-morpholino-quinoline-3-carboxamide; (Example 5.14)
N-(2,3-dihydro-1,4-benzoxazin-4-yl)-4-(1,1-dioxo-1,4-thiazinan-4-yl)-8-(2,3,5-trifluorophenyl)quinoline-3-carboxamide; (Example 5.15)
N-(2,3-dihydro-1,4-benzoxazin-4-yl)-4-morpholino-8-(2,4,5-trifluorophenyl)quinoline-3-carboxamide; (Example 5.16)
8-(6-chloropyrazin-2-yl)-N-(2,3-dihydro-1,4-benzoxazin-4-yl)-4-morpholino-quinoline-3-carboxamide; (Example 5.17)
8-(4,5-dichloro-3-pyridyl)-N-(2,3-dihydro-1,4-benzoxazin-4-yl)-4-morpholino-quinoline-3-carboxamide; (Example 5.18)
8-(5-chloro-2,3-difluoro-phenyl)-N-(2,3-dihydro-1,4-benzoxazin-4-yl)-4-morpholino-quinoline-3-carboxamide; (Example 5.19)
N-(2,3-dihydro-1,4-benzoxazin-4-yl)-4-morpholino-8-(2,3,4,5-tetrafluorophenyl)quinoline-3-carboxamide; (Example 5.20)
8-(4-chloro-5-fluoro-3-pyridyl)-N-(2,3-dihydro-1,4-benzoxazin-4-yl)-4-morpholino-quinoline-3-carboxamide; (Example 5.21)
8-[4-chloro-6-(trifluoromethyl)-2-pyridyl]-N-(2,3-dihydro-1,4-benzoxazin-4-yl)-4-morpholino-quinoline-3-carboxamide; (Example 5.22)
8-(3,5-dichloro-2,4-difluoro-phenyl)-N-(2,3-dihydro-1,4-benzoxazin-4-yl)-4-morpholino-quinoline-3-carboxamide; (Example 5.23)
N-indolin-1-yl-4-morpholino-8-(2,3,5-trifluorophenyl)quinoline-3-carboxamide; (Example 5.24)
8-(4,6-dichloro-2-pyridyl)-N-(2,3-dihydro-1,4-benzoxazin-4-yl)-4-morpholino-quinoline-3-carboxamide; (Example 5.25)
N-(2,3-dihydro-1,4-benzoxazin-4-yl)-8-(6-fluoropyrazin-2-yl)-4-morpholino-quinoline-3-carboxamide; (Example 5.26)
8-[2-chloro-6-(trifluoromethyl)pyrimidin-4-yl]-N-(2,3-dihydro-1,4-benzoxazin-4-yl)-4-morpholino-quinoline-3-carboxamide; (Example 5.27)
8-(6-chloro-5-fluoro-2-pyridyl)-N-(2,3-dihydro-1,4-benzoxazin-4-yl)-4-morpholino-quinoline-3-carboxamide; (Example 5.28)
8-(6-chloro-3-fluoro-2-pyridyl)-N-(2,3-dihydro-1,4-benzoxazin-4-yl)-4-morpholino-quinoline-3-carboxamide; (Example 5.29)
N-(2,3-dihydro-1,4-benzoxazin-4-yl)-8-(6-ethoxypyrazin-2-yl)-4-morpholino-quinoline-3-carboxamide; (Example 5.30)
4-(azetidin-1-yl)-N-(2,3-dihydro-1,4-benzoxazin-4-yl)-8-(2,3,5-trifluorophenyl)quinoline-3-carboxamide; (Example 5.31)
N-(2,3-dihydro-1,4-benzoxazin-4-yl)-4-pyrrolidin-1-yl-8-(2,3,5-trifluorophenyl)quinoline-3-carboxamide; (Example 5.32)
N-(2,3-dihydro-1,4-benzoxazin-4-yl)-4-[2-methoxyethyl(methyl)amino]-8-(2,3,5-trifluorophenyl)quinoline-3-carboxamide; (Example 5.33)
4-[bis(2-methoxyethyl)amino]-N-(2,3-dihydro-1,4-benzoxazin-4-yl)-8-(2,3,5-trifluorophenyl)quinoline-3-carboxamide; (Example 5.34)

7-cyano-8-(3,5-dichlorophenyl)-N-(2,3-dihydro-1,4-benzoxazin-4-yl)-4-morpholino-quinoline-3-carboxamide; (Example 5.35)

4-cyclopropyl-N-(2,3-dihydro-1,4-benzoxazin-4-yl)-8-(2,3,5-trifluorophenyl)quinoline-3-carboxamide; (Example 5.36)

N-(2,3-dihydro-1,4-benzoxazin-4-yl)-4-(3-fluoroazetidin-1-yl)-8-(2,3,5-trifluorophenyl)quinoline-3-carboxamide; (Example 5.37)

N-(2,3-dihydro-1,4-benzoxazin-4-yl)-4-(3-hydroxyazetidin-1-yl)-8-(2,3,5-trifluorophenyl)quinoline-3-carboxamide; (Example 5.38)

N-(2,3-dihydro-1,4-benzoxazin-4-yl)-4-oxazolidin-3-yl-8-(2,3,5-trifluorophenyl)quinoline-3-carboxamide; (Example 5.39)

N-(2,3-dihydro-1,4-benzoxazin-4-yl)-4-(2-oxa-6-azaspiro[3.3]heptan-6-yl)-8-(2,3,5-trifluorophenyl)quinoline-3-carboxamide; (Example 5.40)

N-(2,3-dihydro-1,4-benzoxazin-4-yl)-7-fluoro-4-morpholino-8-(3,4,5-trifluorophenyl)quinoline-3-carboxamide; (Example 5.41)

4-(3,5-dichlorophenyl)-N-(2,3-dihydro-1,4-benzoxazin-4-yl)-8-morpholino-pyrido[3,2-d]pyrimidine-7-carboxamide; (Example 6.1) and 8-(3,5-dichlorophenyl)-N-(2,3-dihydro-1,4-benzoxazin-4-yl)-4-morpholino-1,6-naphthyridine-3-carboxamide; (Example 7.1)

or a salt of any of the foregoing compounds.

22. The compound of claim 1 selected from the group consisting of:

N-(2,3-dihydro-1,4-benzoxazin-4-yl)-4-isoxazolidin-2-yl-8-(2,3,5-trifluorophenyl)quinoline-3-carboxamide; (Example 5.42)

N-(2,3-dihydro-1,4-benzoxazin-4-yl)-4-morpholino-8-[1-(2,2,2-trifluoroethyl)pyrazol-4-yl]quinoline-3-carboxamide; (Example 5.43)

8-(2,6-dichloropyrimidin-4-yl)-N-(2,3-dihydro-1,4-benzoxazin-4-yl)-4-morpholino-quinoline-3-carboxamide; (Example 5.44)

N-(2,3-dihydro-1,4-benzoxazin-4-yl)-4-tetrahydropyran-4-yl-8-(2,3,5-trifluorophenyl)quinoline-3-carboxamide; (Example 5.45)

8-(3,5-dichloro-2-fluoro-phenyl)-N-(2,3-dihydro-1,4-benzoxazin-4-yl)-7-fluoro-4-morpholino-quinoline-3-carboxamide; (Example 5.47)

8-(3,5-dichloro-2,4-difluoro-phenyl)-N-(2,3-dihydro-1,4-benzoxazin-4-yl)-7-fluoro-4-morpholino-quinoline-3-carboxamide; (Example 5.48)

N-(2,3-dihydro-1,4-benzoxazin-4-yl)-4-morpholino-8-(2,3,6-trifluoro-4-pyridyl)quinoline-3-carboxamide; (Example 5.49)

N-(2,3-dihydro-1,4-benzoxazin-4-yl)-8-(4-fluoro-2,6-dimethyl-phenyl)-4-morpholino-quinoline-3-carboxamide; (Example 5.50)

N-(2,3-dihydro-1,4-benzoxazin-4-yl)-8-[4-ethylsulfanyl-6-(trifluoromethyl)pyrimidin-2-yl]-4-morpholino-quinoline-3-carboxamide; (Example 5.51)

8-[4-benzyloxy-6-(trifluoromethyl)pyrimidin-2-yl]-N-(2,3-dihydro-1,4-benzoxazin-4-yl)-4-morpholino-quinoline-3-carboxamide; (Example 5.52)

[3-(2,3-dihydro-1,4-benzoxazin-4-ylcarbamoyl)-8-(2,3,5-trifluorophenyl)-4-quinolyl]boronic acid; (Example 5.53)

8-(3,5-dichloro-2,4-difluoro-phenyl)-7-fluoro-N-indolin-1-yl-4-morpholino-quinoline-3-carboxamide; (Example 5.54)

N-(2,3-dihydro-1,4-benzoxazin-4-yl)-4-(1-methoxyethyl)-8-(2,3,5-trifluorophenyl)quinoline-3-carboxamide; (Example 5.55)

8-(3,5-dichloro-2,4-difluoro-phenyl)-N-(2,3-dihydro-1,4-benzoxazin-4-yl)-4-(dimethylamino)-7-fluoro-quinoline-3-carboxamide; (Example 5.56)

N-(2,3-dihydro-1,4-benzoxazin-4-yl)-4-morpholino-8-(2,3,5,6-tetrafluorophenyl)quinoline-3-carboxamide; (Example 5.57)

4-cyclopropyl-8-(3,5-dichloro-2,4-difluoro-phenyl)-N-(2,3-dihydro-1,4-benzoxazin-4-yl)-7-fluoro-quinoline-3-carboxamide; (Example 5.58)

8-[3,5-bis(trifluoromethyl)phenyl]-N-(2,3-dihydro-1,4-benzoxazin-4-yl)-7-fluoro-4-morpholino-quinoline-3-carboxamide; (Example 5.59)

8-(5-chloro-2,3-difluoro-phenyl)-N-(2,3-dihydro-1,4-benzoxazin-4-yl)-7-fluoro-4-morpholino-quinoline-3-carboxamide; (Example 5.60)

8-[3-chloro-5-(trifluoromethyl)phenyl]-N-(2,3-dihydro-1,4-benzoxazin-4-yl)-7-fluoro-4-morpholino-quinoline-3-carboxamide; (Example 5.61)

8-(3,5-dichloro-2,4-difluoro-phenyl)-N-(2,3-dihydro-1,4-benzoxazin-4-yl)-7-fluoro-4-[methoxy(methyl)amino]quinoline-3-carboxamide; (Example 5.62)

N-(2,3-dihydro-1,4-benzoxazin-4-yl)-4-morpholino-8-[4-(trifluoromethyl)phenyl]quinoline-3-carboxamide; (Example 5.63)

8-[3,5-dichloro-4-(trifluoromethyl)phenyl]-N-(2,3-dihydro-1,4-benzoxazin-4-yl)-4-morpholino-quinoline-3-carboxamide; (Example 5.64)

8-(3-chloro-2,5,6-trifluoro-phenyl)-N-(2,3-dihydro-1,4-benzoxazin-4-yl)-7-fluoro-4-morpholino-quinoline-3-carboxamide; (Example 5.65)

8-(3-chloro-5-cyano-phenyl)-N-(2,3-dihydro-1,4-benzoxazin-4-yl)-4-morpholino-quinoline-3-carboxamide; (Example 5.66)

8-(3-cyano-2,5-difluoro-phenyl)-N-(2,3-dihydro-1,4-benzoxazin-4-yl)-4-morpholino-quinoline-3-carboxamide; (Example 5.67)

N-(2,3-dihydro-1,4-benzoxazin-4-yl)-4-(2,2,2-trifluoro-1-methyl-ethyl)-8-(2,3,5-trifluorophenyl)quinoline-3-carboxamide; (Example 5.68)

N-(2,3-dihydro-1,4-benzoxazin-4-yl)-2-methyl-4-morpholino-8-(2,3,5-trifluorophenyl)quinoline-3-carboxamide; (Example 8.1) and N-(2,3-dihydro-1,4-benzoxazin-4-yl)-4-morpholino-2-(trifluoromethyl)-8-(2,3,5-trifluorophenyl)quinoline-3-carboxamide; (Example 8.2)

or a salt of any of the foregoing compounds.

23. A composition comprising a compound of claim 1, or a salt thereof, and at least one acceptable carrier.

24. A product comprising a compound of claim 1, or a salt thereof, as a medicament.

25. A product comprising compound of claim 1, or a salt thereof, r manufacture of a medicament for treating endoparasites.

26. A product comprising a compound of claim 1, or a salt thereof, for manufacture of a medicament for treating heartworm.

27. A product comprising a compound of claim 1, or a salt thereof, for manufacture of a medicament for controlling heartworm.

28. A compound 4-[acetyl(methyl)amino]-N-(2,3-dihydro-1,4-benzoxazin-4-yl)-8-(2,3,5-trifluorophenyl) quinoline-3-carboxamide (Example 5.46), or a salt thereof.

* * * * *

UNITED STATES PATENT AND TRADEMARK OFFICE
CERTIFICATE OF CORRECTION

PATENT NO. : 12,448,391 B2  
APPLICATION NO. : 17/616436  
DATED : October 21, 2025  
INVENTOR(S) : Pierre Ducray et al.

Page 1 of 1

It is certified that error appears in the above-identified patent and that said Letters Patent is hereby corrected as shown below:

In the Claims

Claim 1, Column 107, Line 21, delete "X5 is selected from the group consisting of N and CR3;" and replace with -- X3 is selected from the group consisting of N and CR3; --

Claim 1, Column 107, Line 24, delete "X5 is selected from the group consisting of N and CR6;" and replace with -- X6 is selected from the group consisting of N and CR6; --

Claim 2, Column 111, Line 26, delete "X2 is CR2; X3 is CR3; X4 is CR4; X5 is CR5; and X5 is N; or" and replace with -- X2 is CR2; X3 is CR3; X4 is CR4; X5 is CR5; and X6 is N; or --

Claim 3, Column 111, Line 29, delete "X2 is CR2; X3 is CR3; X4 is CR4; X5 is N; and X5 is N; or" and replace with -- X2 is CR2; X3 is CR3; X4 is CR4; X5 is N; and X6 is N; or --

Claim 4, Column 111, Line 32, delete "X2 is CR2; X5 is CR3; X4 is CR4; X5 is N; and X5 is CR6; or" and replace with -- X2 is CR2; X3 is CR3; X4 is CR4; X5 is N; and X6 is CR6; or --

Signed and Sealed this  
Twenty-seventh Day of January, 2026

John A. Squires  
*Director of the United States Patent and Trademark Office*